(12) United States Patent
Hoffman

(10) Patent No.: US 7,152,045 B2
(45) Date of Patent: Dec. 19, 2006

(54) TOKENLESS IDENTIFICATION SYSTEM FOR AUTHORIZATION OF ELECTRONIC TRANSACTIONS AND ELECTRONIC TRANSMISSIONS

(75) Inventor: Ned Hoffman, Sebastopol, CA (US)

(73) Assignee: Indivos Corporation, San Francisco, CA (US)

( * ) Notice: Subject to any disclaimer, the term of this patent is extended or adjusted under 35 U.S.C. 154(b) by 816 days.

(21) Appl. No.: 10/241,374

(22) Filed: Sep. 10, 2002

(65) Prior Publication Data

US 2003/0105725 A1 Jun. 5, 2003

Related U.S. Application Data

(63) Continuation-in-part of application No. 09/639,948, filed on Aug. 17, 2000, which is a continuation-in-part of application No. 09/398,914, filed on Sep. 16, 1999, which is a continuation-in-part of application No. 09/244,784, filed on Feb. 5, 1999, now Pat. No. 6,012,039, which is a continuation-in-part of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345,523, filed on Nov. 28, 1994, now Pat. No. 5,615,277.

(51) Int. Cl.
*G06F 17/60* (2006.01)
*G06K 5/00* (2006.01)

(52) U.S. Cl. .............. 705/43; 705/44; 705/45; 705/50; 235/379; 235/380; 235/382

(58) Field of Classification Search ............ 705/43–45, 705/50; 235/379, 380, 382
See application file for complete search history.

(56) References Cited

U.S. PATENT DOCUMENTS 3,564,132 A 2/1971 Baker (Continued)

FOREIGN PATENT DOCUMENTS

EP 0581421 A1 2/1994

(Continued)

OTHER PUBLICATIONS

Mark Rechtin (Fingerprint Technology for Best ID System, Orange County Business Journal, May 14, 1990).*

(Continued)

*Primary Examiner*—Andrew J. Fischer
*Assistant Examiner*—Cristina Owen Sherr
(74) *Attorney, Agent, or Firm*—Marger Johnson & McCollom, P.C.

(57) ABSTRACT

A tokenless identification system and method for authorization of transactions and transmissions. The tokenless system and method are principally based on a correlative comparison of a unique biometrics sample, such as a finger print or voice recording, gathered directly from the person of an unknown user, with an authenticated biometrics sample of the same type obtained and stored previously. It can be networked to act as a full or partial intermediary between other independent computer systems, or may be the sole computer systems carrying out all necessary executions. It further contemplates the use of a private code that is returned to the user after the identification has been complete, authenticating and indicating to the user that the computer system was accessed. The identification system and method of additionally include emergency notification to permit an authorized user to alert authorities an access attempt is coerced.

11 Claims, 14 Drawing Sheets

U.S. PATENT DOCUMENTS

| | | | |
|---|---|---|---|
| 3,588,449 A | 6/1971 | Paterson | |
| 3,675,616 A | 7/1972 | Bourke, II et al. | |
| 3,705,384 A | 12/1972 | Wahlberg | |
| 3,718,908 A | 2/1973 | Bloomstein | |
| 3,798,603 A | 3/1974 | Walberg | |
| 3,833,885 A | 9/1974 | Gentile et al. | |
| 3,876,864 A | 4/1975 | Clark et al. | |
| 3,896,266 A | 7/1975 | Waterbury | |
| 3,914,579 A | 10/1975 | Shigemori et al. | |
| 3,937,925 A | 2/1976 | Boothroyd | |
| 3,943,335 A | 3/1976 | Kinker et al. | |
| 3,970,992 A | 7/1976 | Boothroyd et al. | |
| 4,025,758 A * | 5/1977 | Hatanaka et al. | 221/9 |
| 4,100,370 A | 7/1978 | Suzuki et al. | |
| 4,109,238 A | 8/1978 | Creekmore | |
| 4,187,498 A | 2/1980 | Creekmore | |
| 4,205,780 A | 6/1980 | Burns et al. | |
| 4,249,163 A | 2/1981 | Maurer et al. | |
| 4,264,808 A | 4/1981 | Owens et al. | |
| 4,317,957 A | 3/1982 | Sendrow | |
| 4,321,672 A | 3/1982 | Braun | 364/408 |
| 4,357,597 A | 11/1982 | Butler | |
| 4,390,968 A | 6/1983 | Hennessy | 364/900 |
| 4,404,649 A | 9/1983 | Nunley et al. | |
| 4,449,189 A | 5/1984 | Feix et al. | |
| 4,461,028 A | 7/1984 | Okubo | |
| 4,484,328 A | 11/1984 | Schlafly | 370/394 |
| 4,523,330 A | 6/1985 | Cain | |
| 4,580,040 A | 4/1986 | Granzow et al. | |
| 4,617,457 A | 10/1986 | Granzow et al. | |
| 4,641,239 A | 2/1987 | Takesako | |
| 4,669,487 A | 6/1987 | Frieling | |
| 4,672,377 A | 6/1987 | Murphy et al. | |
| 4,675,815 A | 6/1987 | Kuroki | 364/900 |
| 4,727,243 A | 2/1988 | Savar | |
| 4,729,128 A | 3/1988 | Grimes et al. | |
| 4,734,858 A | 3/1988 | Schlafly | 705/26 |
| 4,752,676 A | 6/1988 | Leonard et al. | |
| 4,799,156 A | 1/1989 | Shavit | 364/401 |
| 4,810,866 A | 3/1989 | Lord, Jr. | |
| 4,821,118 A | 4/1989 | Lafreniere | 358/108 |
| 4,837,422 A | 6/1989 | Dethloff et al. | 364/408 |
| 4,845,636 A | 7/1989 | Walker | |
| 4,916,435 A | 4/1990 | Fuller | |
| 4,922,419 A | 5/1990 | Ohashi et al. | |
| 4,926,480 A | 5/1990 | Chaum | 380/23 |
| 4,947,028 A | 8/1990 | Gorog | 235/380 |
| 4,961,142 A | 10/1990 | Elliott et al. | 364/408 |
| 4,975,969 A | 12/1990 | Tal | |
| 4,975,978 A | 12/1990 | Ando et al. | |
| 4,991,008 A | 2/1991 | Nama | |
| 4,993,068 A | 2/1991 | Piosenka et al. | 380/23 |
| 4,995,086 A * | 2/1991 | Lilley et al. | 382/124 |
| 4,998,279 A * | 3/1991 | Weiss | 380/23 |
| 5,023,782 A | 6/1991 | Lutz et al. | |
| 5,036,461 A * | 7/1991 | Elliott et al. | 705/44 |
| 5,040,226 A | 8/1991 | Elischer et al. | |
| 5,053,607 A | 10/1991 | Carlson et al. | |
| 5,054,089 A | 10/1991 | Uchida et al. | 382/4 |
| 5,056,147 A | 10/1991 | Truner et al. | |
| 5,095,194 A | 3/1992 | Barbanell | 235/380 |
| 5,109,427 A | 4/1992 | Yang | 382/4 |
| 5,109,428 A | 4/1992 | Igaki et al. | 382/5 |
| 5,144,680 A | 9/1992 | Kobayashi | 250/556 |
| 5,145,102 A | 9/1992 | Higuchi et al. | 382/4 |
| 5,146,102 A | 9/1992 | Higuchi et al. | 250/556 |
| 5,163,094 A | 11/1992 | Prokoski et al. | |
| 5,168,520 A | 12/1992 | Weiss | 380/23 |
| 5,177,342 A | 1/1993 | Adams | |
| 5,180,901 A | 1/1993 | Hiramatsu | 235/380 |
| 5,191,611 A | 3/1993 | Lang | 380/25 |
| 5,210,588 A * | 5/1993 | Lee | 356/71 |
| 5,210,797 A | 5/1993 | Usui et al. | 382/4 |
| 5,220,501 A | 6/1993 | Lawlor et al. | |
| 5,222,152 A * | 6/1993 | Fishbine et al. | 382/127 |
| 5,224,164 A | 6/1993 | Eisner | 380/44 |
| 5,224,173 A | 6/1993 | Kuhns et al. | |
| 5,229,764 A * | 7/1993 | Matchett et al. | 340/5.52 |
| 5,230,025 A * | 7/1993 | Fishbine et al. | 382/127 |
| 5,237,620 A | 8/1993 | Deaton et al. | |
| 5,239,583 A | 8/1993 | Parrillo | 380/23 |
| 5,241,606 A | 8/1993 | Horie | 382/4 |
| 5,251,259 A | 10/1993 | Mosley | 380/23 |
| 5,265,008 A | 11/1993 | Benton et al. | |
| 5,265,162 A | 11/1993 | Bush et al. | 380/24 |
| 5,274,695 A | 12/1993 | Green | 379/88 |
| 5,276,314 A | 1/1994 | Martino et al. | 235/380 |
| 5,280,527 A * | 1/1994 | Gullman et al. | 380/23 |
| 5,291,560 A | 3/1994 | Daugman | |
| 5,305,196 A | 4/1994 | Deaton et al. | |
| 5,321,242 A * | 6/1994 | Heath, Jr. | 235/382 |
| 5,325,442 A * | 6/1994 | Knapp | 382/124 |
| 5,335,288 A * | 8/1994 | Faulkner | 382/115 |
| 5,341,428 A | 8/1994 | Schatz | |
| 5,343,529 A * | 8/1994 | Goldfine et al. | 380/23 |
| 5,347,580 A | 9/1994 | Molva et al. | |
| 5,351,303 A * | 9/1994 | Willmore | 382/115 |
| 5,354,974 A | 10/1994 | Eisenberg | 235/379 |
| 5,359,669 A * | 10/1994 | Shanley et al. | 382/117 |
| 5,383,113 A | 1/1995 | Kight et al. | 705/40 |
| 5,386,103 A | 1/1995 | DeBan et al. | |
| 5,386,104 A | 1/1995 | Sime | 235/379 |
| 5,408,536 A | 4/1995 | Lemelson | |
| 5,412,190 A | 5/1995 | Josephson et al. | |
| 5,412,738 A | 5/1995 | Brunelli et al. | 382/115 |
| 5,448,471 A | 9/1995 | Deaton et al. | |
| 5,457,747 A * | 10/1995 | Drexler et al. | 705/50 |
| 5,465,303 A | 11/1995 | Levison et al. | 382/124 |
| 5,469,506 A | 11/1995 | Berson et al. | |
| 5,485,510 A | 1/1996 | Colbert | 379/145 |
| 5,499,288 A | 3/1996 | Hunt | 379/266 |
| 5,502,774 A | 3/1996 | Bellegarda et al. | |
| 5,506,691 A | 4/1996 | Bednar et al. | |
| 5,513,272 A | 4/1996 | Bogosian, Jr. | |
| 5,534,682 A | 7/1996 | Graef et al. | |
| 5,546,471 A | 8/1996 | Merjanian | |
| 5,546,523 A | 8/1996 | Gatto | 395/156 |
| 5,550,359 A | 8/1996 | Bennett | |
| 5,557,686 A | 9/1996 | Brown et al. | |
| 5,559,504 A | 9/1996 | Itsumi et al. | |
| 5,561,711 A | 10/1996 | Muller | 379/266 |
| 5,566,230 A | 10/1996 | Cairo | |
| 5,570,465 A | 10/1996 | Tsakanikas | |
| 5,581,630 A | 12/1996 | Bonneau, Jr. | |
| 5,592,377 A | 1/1997 | Lipkin | |
| 5,594,226 A | 1/1997 | Steger | |
| 5,594,806 A | 1/1997 | Colbert | |
| 5,600,114 A | 2/1997 | Dunlap et al. | |
| 5,602,933 A | 2/1997 | Blackwell et al. | |
| 5,604,802 A | 2/1997 | Holloway | 380/24 |
| 5,613,012 A | 3/1997 | Hoffman et al. | 382/115 |
| 5,615,277 A | 3/1997 | Hoffman | 382/115 |
| 5,636,282 A | 6/1997 | Holmquist | 380/25 |
| 5,649,117 A | 7/1997 | Landry | |
| 5,650,604 A | 7/1997 | Marcous et al. | |
| 5,663,546 A | 9/1997 | Cucinotta et al. | |
| 5,703,344 A | 12/1997 | Bezy et al. | |
| 5,719,950 A | 2/1998 | Osten et al. | 382/115 |
| 5,745,555 A * | 4/1998 | Mark | 379/95 |
| 5,757,917 A | 5/1998 | Rose et al. | |
| 5,764,789 A | 6/1998 | Pare, Jr. et al. | 382/115 |
| 5,774,663 A | 6/1998 | Randle et al. | |
| 5,790,668 A | 8/1998 | Tomko | 380/25 |
| 5,793,027 A | 8/1998 | Baik | |

| | | | |
|---|---|---|---|
| 5,802,199 A | 9/1998 | Pare, Jr. et al. | 382/115 |
| 5,805,719 A | 9/1998 | Pare, Jr. et al. | 382/115 |
| 5,809,116 A | 9/1998 | Cairo | |
| 5,815,555 A | 9/1998 | Cairo | |
| 5,826,241 A | 10/1998 | Stein et al. | 705/26 |
| 5,826,245 A | 10/1998 | Sandberg-Diment | 705/44 |
| 5,832,464 A | 11/1998 | Houvener et al. | |
| 5,838,812 A | 11/1998 | Pare, Jr. et al. | 705/44 |
| 5,870,723 A | 2/1999 | Pare, Jr. et al. | 705/39 |
| 5,875,236 A | 2/1999 | Jankowski et al. | |
| 5,892,824 A | 4/1999 | Beatson et al. | 380/25 |
| 5,897,625 A | 4/1999 | Gustin et al. | |
| 5,930,804 A | 7/1999 | Yu et al. | 707/104 |
| 5,940,811 A | 8/1999 | Norris | |
| 5,956,154 A | 9/1999 | Cairo | |
| 5,956,700 A | 9/1999 | Landry | 705/40 |
| 5,958,014 A | 9/1999 | Cave | |
| 6,011,858 A * | 1/2000 | Stock et al. | 340/5.53 |
| 6,012,039 A | 1/2000 | Hoffman et al. | 705/14 |
| 6,016,476 A | 1/2000 | Maes et al. | 705/1 |
| 6,023,688 A | 2/2000 | Ramachandran et al. | 705/44 |
| 6,028,950 A | 2/2000 | Merjanian | 382/126 |
| 6,029,195 A * | 2/2000 | Herz | 707/1 |
| 6,040,783 A | 3/2000 | Houvener et al. | 340/825.31 |
| 6,072,894 A * | 6/2000 | Payne | 382/118 |
| 6,081,792 A * | 6/2000 | Cucinotta et al. | 705/43 |
| 6,105,006 A * | 8/2000 | Davis et al. | 705/35 |
| 6,105,010 A | 8/2000 | Musgrave | 705/44 |
| 6,119,096 A * | 9/2000 | Mann et al. | 235/384 |
| 6,119,931 A * | 9/2000 | Novogrod | 235/379 |
| 6,182,076 B1 | 1/2001 | Yu et al. | 707/10 |
| 6,202,151 B1 | 3/2001 | Musgrave et al. | 713/186 |
| 6,233,618 B1 * | 5/2001 | Shannon | 713/182 |
| 6,256,737 B1 * | 7/2001 | Bianco et al. | 709/229 |
| 6,286,756 B1 * | 9/2001 | Stinson et al. | 235/379 |
| 6,310,966 B1 | 10/2001 | Dulude et al. | 382/115 |
| 2001/0000045 A1 | 3/2001 | Yu et al. | 707/9 |
| 2002/0109595 A1 | 8/2002 | Cairo | |

FOREIGN PATENT DOCUMENTS

| | | |
|---|---|---|
| EP | 0598469 A2 | 5/1994 |
| EP | 0651357 A1 | 3/1995 |
| EP | 0823701 A2 | 2/1998 |
| EP | 0878780 A2 | 11/1998 |
| WO | WO/95/13591 | 5/1995 |
| WO | WO 98/15924 * | 9/1997 |
| WO | 98/15924 | 4/1998 |
| WO | WO/98/25227 | 6/1998 |
| WO | WO 98/35298 | 8/1998 |
| WO | WO98/50875 | 11/1998 |

OTHER PUBLICATIONS

"A Neural Net that Knows Faces", http://www.byte.com/art/9502/sec10/art4.html, Feb. 1995, 1 page.*

Anderson et al., *Security Management,* American Society for Industrial Security v.37, n.11, 17-19 (Nov. 1993).

Radcliff, *When Data Warehouse become Open House,* Software Management, v.16 n.11 (Nov. 26, 1996).

Anonymous, *A Credit Union Points a Finger at Biometrics,* Bank Network News, v.15 n.16 (Jan. 13, 1997).

Hall, J., *Scanning Lets Fingerprints Do Talking,* Toronto Star, PA6 (May 15, 1997).

Scally, R., *CompUSA Tests Fingerprints to Help Secure Transactions,* Discount Store News, v.36 n.10 (May 19, 1997).

Anonymous, "No Longer On the Fringe? (While the total number of rent-to-own stores has dropped slightly in the last two years, there are still 7,500 of them)", Collections & Credit Risk, p. 53+, vol. 1, No. 7, Jul. 1996.

J.L. Griffin, "Cash Store Finds Blank in Joplin," Joplin Globe, p. 1E, Joplin, MO, Dec. 22, 1996.

Woods, Bob, "CyberWatch Security with Face Recognition," Newsbytes, Aug. 7, 1996, 1 page.

"TrueFace Products", http://www.MIROS.COM/Products.html, Wellesley, MA, downloaded Dec. 6, 1996, 1 page.

Judge, Paul, "A Gatekeeper That Takes You at Face Value", http://www.Businessweek.com/1996/36/b3491101.html, Nov. 25, 1996, 1 page.

"TrueFace Access System", http://www.MIROS.COM/access_system.htm, Wellesley, MA, downloaded Dec. 6, 1996, 1 page.

Harry Katzan, Jr., "Distributed Information Systems", Petrocelli Books, 1979, pp. 101-112 and 157-167.

Ruiz-Mezcua, Belén, et al., "Biometrics verification in a real environment," IEEE 0-7803-5247-5/99.

Higgins, GRL "Electronic Cash in a Global World," NatWest Development Team, National Westminster Bank PLC, 1996.

Walsh, Bob, "Internet security: A technical report," Texas Banking, V86n5 pp. 16-17, May 1997.

Gale Group, "Biometric Systems Open the Door," Mechanical engineering-CIME, Nov. 1990, p. 58.

Yamada, Ken, "ID at touch of a finger," Computer Reseller News, n. 713, pp. 93-95, Dec. 2, 1996.

Dennis, Sylvia, "LCI Intros SMARTpen Biometric Signature Authentication," Newsbytes News Network, May 24, 1999.

Holmes et al., *A Performance Evaluation of Biometric Identification Devices,* Sandia National Laboratories, Albuquerque, NM, Jun. 1991.

Jeff McKinney, "The Price of Convenience," Cincinnati Globe, p. E1, Cincinnati, OH, Jul. 14, 1996.

Programmer's Manual for TrueFace.TM. Version 2, Miro, Inc., Wellesley, MA, 1995.

"TrueFace CyberWatch", advertising brochure, Miros, Inc., Wellesley, MA, date unknown, 2 pages.

"Let Your Face Be Your Key", http.//www.MIROS.COM/, Wellesley, MA, downloaded Dec. 6, 1996, 1 page.

"TrueFace in the News", http://www.MIROS.COM/In_the_news.html, Wellesley, MA, downloaded Dec. 6, 1996, 2 pages.

"Facing a new era of data security", http://www.pcweek.com/archive/1334/pcwk0051.html, downloaded Dec. 6, 1996, 1 page.

"Face Recognition for Security Data", http://www.MIROS.COM/CyberWatch.html, Wellesley, MA, downloaded Dec. 6, 1996, 1 page.

"Customizing TrueFace", http://www.MIROS.COM/TrueFace_engine.html, Wellesley, MA, downloaded Dec. 6, 1996, 2 pages.

"The Ultimate in Personal ID", http://www.MIROS.COM/Face_apps.html., Wellesley, MA, downloaded Dec. 6, 1996, 3 pages.

"About Miros", http://www.MIROS.COM/About_Miros.htm., Wellesley, MA, downloaded Dec. 6, 1996, 1 page.

"Frequently Asked Questions", http://www.MIROS.COM/FAQ.htm, Wellesley, MA, downloaded Dec. 6, 1996, 3 pages.

"Service Center", advertising brochure, Mr. Payroll Corporation, Ft. Worth, Texas, date unknown, 1 page.

"AT&T Document Processing ATM(DP-ATM)", AT&T Global Information Solutions Company, 1994, 4 pages.

"Check-Control", advertising brochure by BMC Associates, Woodbury, New Jersey, date unknown, 1page.

Jeff McKinney, "The Price of Convenience", Cincinnati Enquirer, Jul. 1996, p. E1.

* cited by examiner

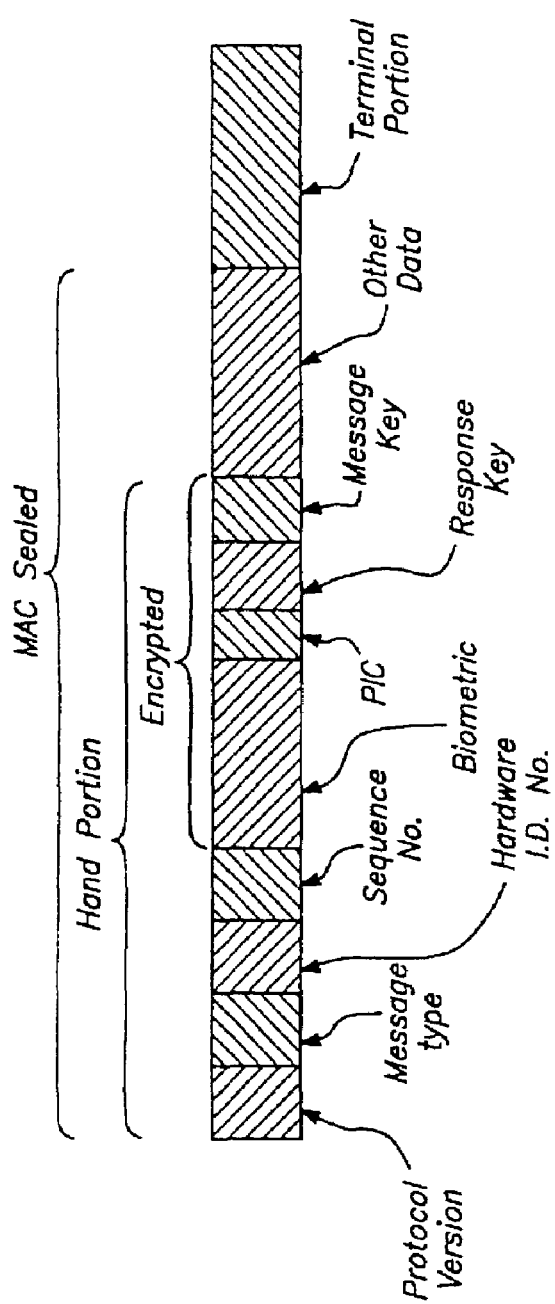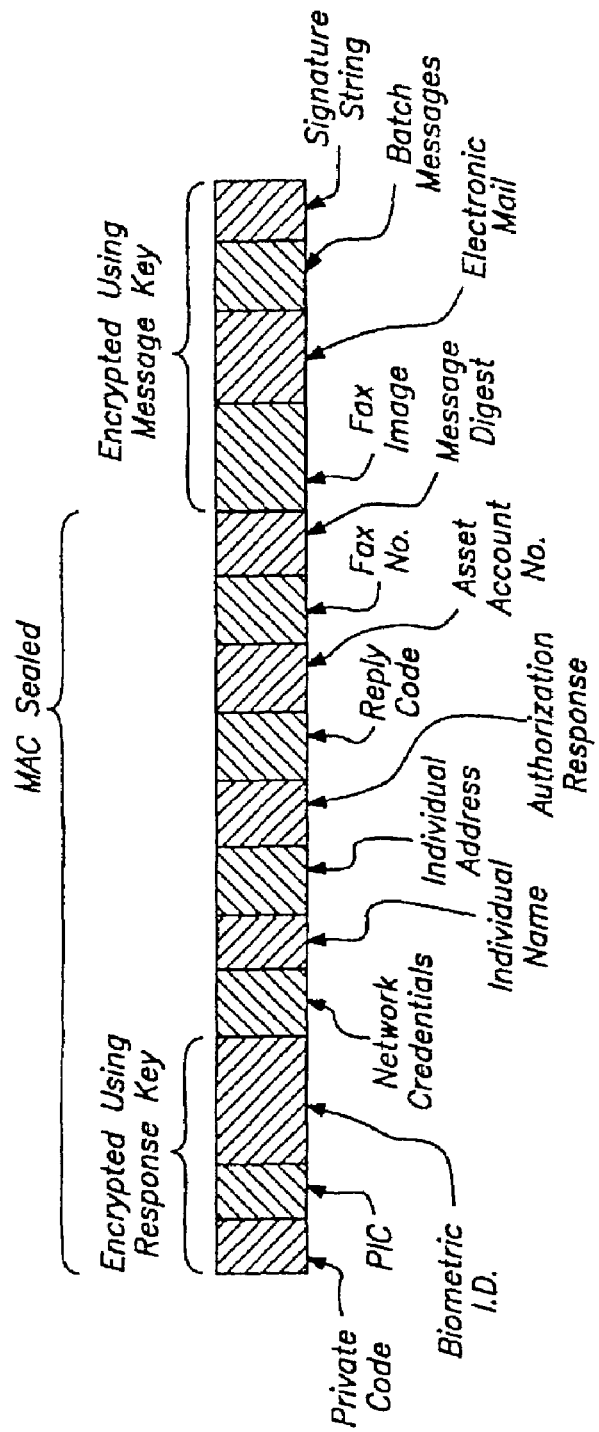
FIG. 5
FIG. 6

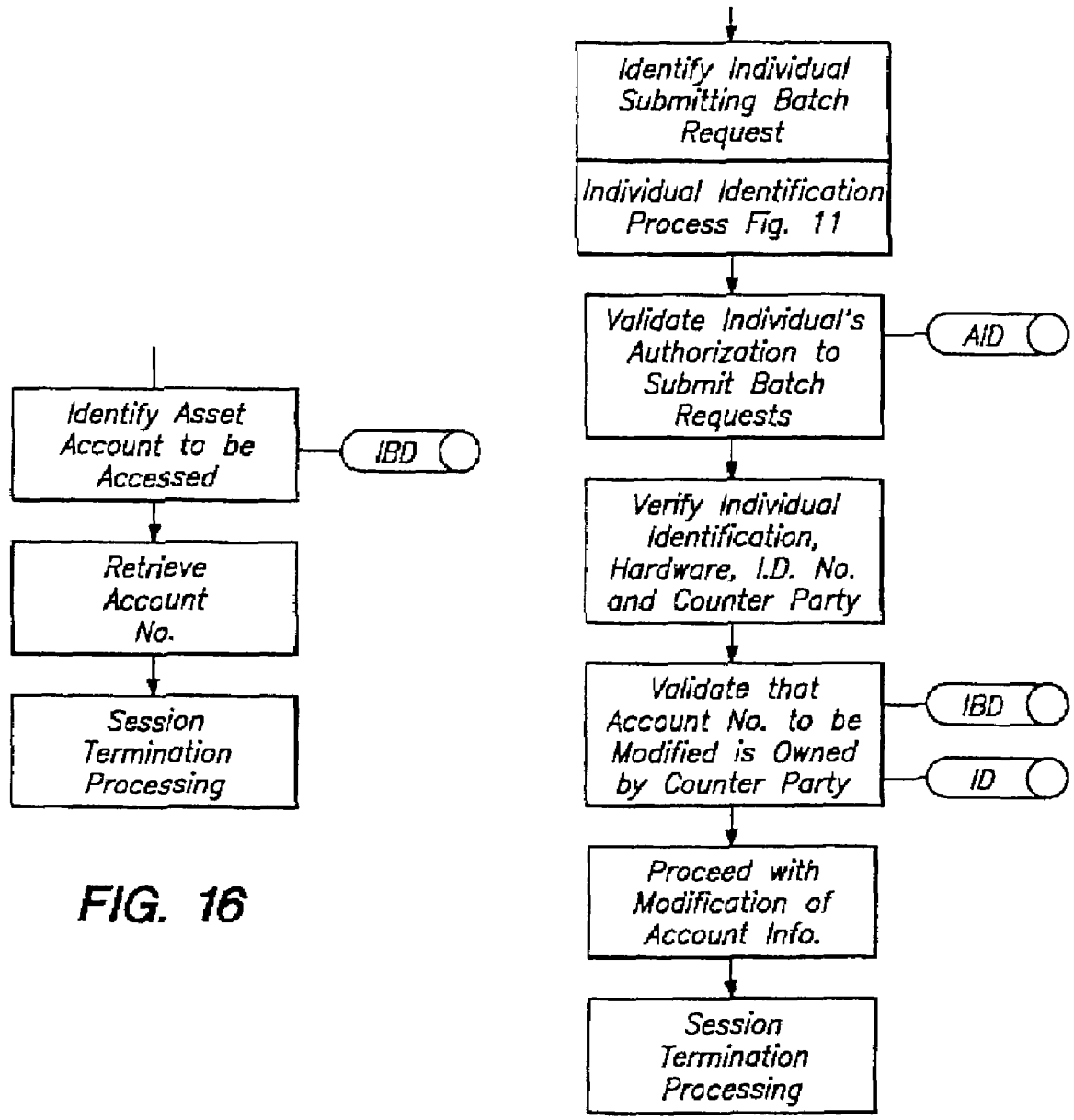

TOKENLESS IDENTIFICATION SYSTEM FOR AUTHORIZATION OF ELECTRONIC TRANSACTIONS AND ELECTRONIC TRANSMISSIONS

RELATED APPLICATION DATA

This application is a continuation-in-part of U.S. patent application Ser. No. 09/639,948 filed on Aug. 17, 2000, now pending, which is a continuation-in-part of U.S. patent application Ser. No. 09/398,914 filed Sep. 16, 1999, now pending, which is a continuation-in-part of U.S. patent application Ser. No. 09/244,784 filed Feb. 5, 1999, now U.S. Pat. No. 6,012,039, which is a continuation-in-part of U.S. patent application Ser. No. 08/705,399, filed Aug. 29, 1996, now U.S. Pat. No. 5,870,723, which is a continuation-in-part of U.S. patent application Ser. No. 08/442,895 filed May 17, 1995, now U.S. Pat. No. 5,613,012, which is a continuation-in-part of U.S. patent application Ser. No. 08/345,523, filed Nov. 28, 1994, now U.S. Pat. No. 5,615,277, all of which are commonly assigned and incorporated herein by reference.

BACKGROUND OF THE INVENTION

The use of tokens and credit cards in today's financial world is pervasive. A token would be any inanimate object which coffers a capability to the individual presenting the object. Remote access of every financial account is through the use of tokens or plastic cards. Whether buying groceries with debit cards or consumer goods with credit cards, at the heart of that transaction is a money transfer enabled by a token, which acts to identify an individual and the financial account he is accessing.

The reason for the migration from metal coins to plastic cards is simple and straightforward: access to money in this money transfer system is vastly safer and more convenient for both merchants and consumers than handling large quantities of coins and notes.

Unfortunately, current technology in combination with this convenient token-based money transfer system results in a system that is prone to theft and fraud.

As verification of user identity is based solely on data placed on the token, which can be easily reproduced and transferred between individuals, such security must rely on both the diligence and the luck of the authorized user and merchant in maintaining this information as proprietary. However, by their very nature, tokens do not have a very strong connection with the individual. Identification of the rightful owner of the token through the token is tenuous at best. This is easily demonstrated by the fact that individuals other than the rightful owners of the tokens have been using these tokens to defraud merchants and other consumer goods suppliers.

The mammoth expansion of the consumer credit industry during the 1980s brought with it large profits for issuers, and newfound convenience for consumers. However, as consumer credit became easier for consumers to acquire, it also became a target for criminals. Much as the mobility of the automobile led to a rash of bank robberies in the late 1920's and early 1930's, so too did the ubiquity of consumer credit lead to vastly increased opportunities for criminals.

Initially, the banking industry was willing to accept a certain amount of loss due to fraud, passing the cost on to the consumer. However, as criminals became more organized, more technically adept, and as credit retail stations began to be manned by people who were more and more poorly trained in credit card security matters, the rate of increase of fraud losses skyrocketed. The staggering statistics on fraud and cost of preventive steps, has forced the credit card companies in particular, to look for other solutions to the problem.

Fraud losses in the credit card industry stem from many different areas due to the highly vulnerable nature of the system, but they are mainly due to either lost, stolen, or counterfeit cards. Credit cards operate without the use of a personal identification code (PIC), therefore a lost credit card can be turned into cash if the card falls into the wrong hands. While theft of a token constitutes the majority of fraud in the system, the use of counterfeit credit cards has been on the rise. Counterfeit credit cards are manufactured by a more technically sophisticated criminal by acquiring a cardholder's valid account number and then producing a counterfeit card using that valid number. The counterfeiter encodes the magnetic strip, and embosses the counterfeit plastic card with the account number. The card is then presented to merchants and charged up to the rightful cardholder's account. Another form of loss is by a criminal merchant who surreptitiously obtains the cardholder's account number. Yet another type of fraud is committed by the authorized cardholder when the token is used for making purchases and thereafter a claim is made that the token was either lost or stolen. It is estimated that losses due to all types of fraud exceeds $950 million dollars annually.

Generally, debit cards are used in conjunction with a personal identification code (PIC). Counterfeiting a debit card is more difficult as the criminal must acquire not only the account number, but also the PIC, and then manufacture the card as in the credit card example. However, various strategies have been used to obtain PICs from unwary cardholders; these range from Trojan horse automated teller machines, or ATMs, in shopping malls that dispense cash but record the PIC, to merchant point of sale devices that also record the PIC, to individuals with binoculars that watch cardholders enter PICs at ATMs. The subsequently manufactured counterfeit debit cards are then used in various ATM machines until the unlucky account is emptied.

The financial industry is well aware of the trends in fraud expense, and is constantly taking steps to improve the security of the card. Thus fraud and theft of token have an indirect impact on the cost to the system.

Card blanks are manufactured under very tight security. Then they are individualized with the account number, expiration date, and are then mailed to the cardholder. Manufacturing and distributing the card alone costs the industry approximately one billion dollars annually. The standard card costs the financial industry $2 for each, but only $0.30 of this $2 is associated with actual manufacturing cost.

Over the last ten years, the industry has altered the tokens because of counterfeiting fraud, without any fundamental changes in the use of the credit transaction system. The remedy has been mostly administrative changes such as having customers call the issuer to activate their card. Other changes include addition of a hologram, a picture ID, or an improved signature area. These type of changes in particular, are an indication that the systems susceptibility to fraud is due to lack of true identification of the individual. It is estimated that this could double the manufacturing cost to two billion dollars annually.

In the near future, the banking industry expects to move to an even more expensive card, called a "smart card". Smart cards contain as much computing power as did some of the first home computers. Current cost projections for a first-generation smart card is estimated at approximately $3.50, not including distribution costs, which is significantly higher than the $0.30 plastic card blank.

This significant increase in cost has forced the industry to look for new ways of using the power in the smart card in addition to simple transaction authorization. It is envisioned that in addition to storing credit and debit account numbers, smart cards may also store phone numbers, frequent flyer miles, coupons obtained from stores, a transaction history, electronic cash usable at tollbooths and on public transit systems, as well as the customer's name, vital statistics, and perhaps even medical records. Clearly, the financial industry trend is to further establish use of tokens.

The side effect of increasing the capabilities of the smart card is centralization of functions. The flip side of increased functionality is increased vulnerability. Given the number of functions that the smart card will be performing, the loss or damage of this monster card will be excruciatingly inconvenient for the cardholder. Being without such a card will financially incapacitate the cardholder until it is replaced. Additionally, losing a card full of electronic cash will also result in a real financial loss as well. Furthermore, ability of counterfeiters to one day copy a smartcard is not addressed.

Unfortunately, because of the projected concentration of functions onto the smart card, the cardholder is left more vulnerable to the loss or destruction of the card itself. Thus, after spending vast sums of money, the resulting system will be more secure, but threatens to levy heavier and heavier penalties for destruction or loss of this card on the consumer.

The financial industry recognizes the security issues associated with smartcards, and efforts are currently underway to make each plastic card difficult to counterfeit. Billions of dollars will be spent in the next five years in attempts to make plastic ever more secure. To date, the consumer financial transaction industry has had a simple equation to balance: in order to reduce fraud, the cost of the card must increase.

In addition to and associated with the pervasiveness of electronic financial transactions, there is now the widespread use of electronic facsimiles, electronic mail messages and similar electronic communications. Similar to the problem of lack of proper identification of individuals for financial transactions is the problem of lack of proper identification of individuals for electronic transmissions. The ease and speed of electronic communication, and its low cost compared to conventional mail, has made it a method of choice for communication between individuals and businesses alike. This type of communication has expanded greatly and is expected to continue to expand. However, millions of electronic messages such as facsimiles and electronic mail (or "E-mail" or "email") messages are sent without knowing whether they arrive at their true destination or whether a certain individual actually sent or received that electronic message. Furthermore, there is no way to verify the identify the individual who sent or who received an electronic message.

Recently, various attempts have been made to overcome problems inherent in the token and code security system. One major focus has been to encrypt, variablize or otherwise modify the PIC to make it more difficult for an unauthorized user to carry out more than one transaction, largely by focusing on manipulation of the PIC to make such code more fraud resistant. A variety of approaches have been suggested, such as introducing an algorithm that varies the PIC in a predictable way known only to the user, thereby requiring a different PIC code for each subsequent accessing of an account. For example, the PIC code can be varied and made specific to the calendar day or date of the access attempt. In yet another approach, a time-variable element is introduced to generate a non-predictable personal identification code that is revealed only to an authorized user at the time of access. Although more resistant to fraud that systems incorporating non-variable codes, such an approach is not virtually fraud-proof because it still relies on data that is not uniquely and irreproducibly personal to the authorized user. Furthermore, such systems further inconvenience consumers that already have trouble remembering constant codes, much less variable ones. Examples of these approaches are disclosed in U.S. Pat. No. 4,837,422 to Dethloff et al.; U.S. Pat. No. 4,998,279 to Weiss; U.S. Pat. No. 5,168,520 to Weiss; U.S. Pat. No. 5,251,259 to Mosley; U.S. Pat. No. 5,239,538 to Parrillo; U.S. Pat. No. 5,276,314 to Martino et al.; and U.S. Pat. No. 5,343,529 to Goldfine et al. all of which are incorporated herein by reference.

More recently, some have turned their attention from the use of personal identification codes to the use of unique biometrics as the basis of identity verification, and ultimately computer access. In this approach, authenticated biometrics are recorded from a user of known identity and stored for future reference on a token. In every subsequent access attempt, the user is required to enter physically the requested biometrics, which are then compared to the authenticated biometrics on the token to determine if the two match in order to verify user identity. Because the biometrics are uniquely personal to the user and because the act of physically entering the biometrics are virtually irreproducible, a match is putative of actual identity, thereby decreasing the risk of fraud. Various biometrics have been suggested, such as finger prints, hand prints, voice prints, retinal images, handwriting samples and the like. However, because the biometrics are generally stored in electronic (and thus reproducible) form on a token and because the comparison and verification process is not isolated from the hardware and software directly used by the individual attempting access, a significant risk of fraudulent access still exists. Examples of this approach to system security are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore, all of which are incorporated herein by reference.

As will be appreciated from the foregoing discussion, a dynamic but unavoidable tension arises in attempting to design a security system that is highly fraud resistant, but nevertheless easy and convenient for the consumer to use. Unfortunately, none of the above-disclosed proposed improvements to the token and code system adequately address, much less attempt to balance, this tension. Such systems generally store the authenticated biometrics in electronic form directly on the token that can presumably be copied. Further, such systems do not adequately isolate the identity verification process from tampering by someone attempting to gain unauthorized access.

An example of token-based security system which relies on a biometrics of a user can be found in U.S. Pat. No. 5,280,527 to Gullman et al. In Gullman's system, the user must carry and present a credit card sized token (referred to as a biometrics security apparatus) containing a microchip in which is recorded characteristics of the authorized user's voice. In order to initiate the access procedure, the user must insert the token into a terminal such as an ATM, and then speak into the terminal to provide a biometrics input for comparison with an authenticated input stored in the microchip of the presented token. The process of identity verification is generally not isolated from potential tampering by one attempting unauthorized access. If a match is found, the remote terminal may then signal the host computer that access should be permitted, or may prompt the user for an additional code, such as a PIN (also stored on the token), before sending the necessary verification signal to the host computer.

Although Gullman's reliance of comparison of stored and input biometrics potentially reduces the risk of unauthorized access as compared to numeric codes, Gullman's use of the token as the repository for the authenticating data combined with Gullman's failure to isolate the identity verification process from the possibility of tampering greatly diminishes any improvement to fraud resistance resulting from the replacement of a numeric code with a biometrics. Further, the system remains somewhat cumbersome and inconvenient to use because it too requires the presentation of a token in order to initiate an access request.

Almost uniformly, patents that disclose token-based systems teach away from biometrics recognition without the use of tokens. Reasons cited for such teachings range from storage requirements for biometrics recognition systems to significant time lapses in identification of a large number of individuals, even for the most powerful computers.

In view of the foregoing, there has long been a need for a computer access system that is highly fraud-resistant, practical, and efficient for the user to operate and carry out electronic transactions and transmissions expeditiously.

There is also a need for a computer system that is completely tokenless and that is capable of verifying a user's personal identity, based solely upon a personal identification code and biometrics that is unique and physically personal to an authorized user, as opposed to verifying an individual's possession of any physical objects that can be freely transferred between different individuals. Such biometrics must be easily and non-intrusively obtained; must be easy and cost-effective to store and to analyze; and must not unduly invade the user's privacy rights.

A further need in computer access system design is user convenience. It is highly desirable for a consumer to able to access the system spontaneously, particularly when unexpected needs arise, with a minimum of effort. In particular, there is a need for a system that greatly reduces or eliminates the need to memorize numerous or cumbersome codes, and that eliminates the need to possess, carry, and present a proprietary object in order to initiate an access request.

Such systems must be simple to operate, accurate and reliable. There is also a need for a computer access system that can allow a user to access multiple accounts and procure all services authorized to the user, and carry out transactions in and between all financial accounts, make point of purchase payments, receive various services, etc.

There is further a great need for a computer access system that affords an authorized user the ability to alert authorities that a third party is coercing the user to request access without the third party being aware that an alert has been generated. There is also a need for a system that is nevertheless able to effect, unknown to the coercing third party, temporary restrictions on the types and amounts of transactions that can be undertaken once access is granted.

Furthermore, the computer system must be affordable and flexible enough to be operatively compatible with existing networks having a variety of electronic transaction and transmission devices and system configurations.

Finally, there is a need for secured sending and receipt of electronic mail messages and electronic facsimiles, where content of the electronic message is protected from disclosure to unauthorized individuals, and the identity of the sender or recipient can be obtained with a high degree of certainty.

SUMMARY OF THE INVENTION

The present invention satisfies these needs by providing an improved identification system for determining an individual's identity from a comparison of an individual's biometrics sample and personal identification code gathered during a bid step with biometrics sample and personal identification code for that individual gathered during a registration step and stored at a remote site wherein there is a data processing center. The invention comprises a computer network host system with means for comparing the entered biometrics sample and personal identification code, and is equipped with various data bases and memory modules. Furthermore, the invention is provided with biometrics and personal identification code input apparatus and terminals for entering data to provide information for execution of the requested transactions and transmissions by the host system once the identity of the individual is determined. The invention is also provided with means for connecting the host system with the terminal and the biometrics input apparatus.

The computer also has means for execution of various transactions and transmission in addition to traditional storing of and modification of data. Additionally, the computer can output the evaluation of the biometrics-PIC ("personal identification code") comparison, and the determination of an identification evaluation, or status of any execution of transactions or transmissions. Furthermore, the computer system notifies and authenticates to the individual being identified that the computer system was accessed, by returning to the individual a private code which was previously selected by that individual during the registration step.

Preferably, the computer system is protected from electronic eavesdropping and electronic intrusion and viruses. Further, the devices used by the computer for gathering biometric samples and personal identification codes would comprise: a) at least one biometric input device for gathering biometric samples, which would have a hardware and a software component; b) at least one terminal device that is functionally partially or fully integrated with the biometric input means for input of and appending ancillary information; c) at least one data entry device for input of a personal identification code whereby this data entry device is integrated either with the biometric input device or the terminal device; and, d) a means for interconnecting the biometric input device, data entry device and the terminal. The terminal device also has at least one display device for displaying data and information. For additional security the computer system uniquely identifies the biometric input apparatus, and the counter party or merchant through a counter party or merchant identification code relating to the terminal that is connected to the biometric input device. It is also preferred that the biometric input apparatus be secured from physical and electronic tampering, and that in case of physical breach of the device, means be employed to physically and/or electronically destroy components within the apparatus and/or erase critical data from the device's memory modules.

In addition, the biometric input apparatus would have a hardware component comprising: a) at least one computing module for data processing; b) erasable and non-erasable memory modules for storage of data and software; c) a biometric scanner device for input of biometric data; d) a data entry device for entering data; e) a digital communications port; f) a device for prevention of electronic eavesdropping.

In order to protect the integrity and confidentiality of electronic data sent between the biometric input apparatus, the terminal, and the computer network, it is preferred that the data be encrypted and sealed.

The host computer network is also connected to and is able to communicate with other independent computer systems, databases, facsimile machines, and other computer networks through conventional means.

The method of the present invention includes voluntarily identifying an individual without the use of any tokens by means of examination of at least one biometrics sample provided by that the individual and a personal identification code also provided by that individual. During a registration step, the individual is to register with the system an authenticated biometric sample, a personal identification code and a private code. Thereafter, during a bid step the biometrics sample and personal identification code of the individual is gathered and compared to the ones registered during the registration step. A match of the personal identification codes and biometrics sample will result in the positive identification of the individual. In order to authenticate to the identified individual that the real computer system was accessed, the individual's private code, which was collected at the registration step, is returned to the individual.

It is preferred that the method of the invention include a method for examining the biometrics samples during registration and comparing such biometrics with a collection of biometrics samples from individuals who have been designated as having previously attempted to perpetrate or who have actually perpetrated fraud upon the system.

In a preferred embodiment, the invention includes a method for notifying authorities of the presence of exigent circumstances or that the authorized user is under duress.

It is also preferred that a method of encryption and sealing of data be used to protect the data, including the digitized biometrics sample, from being revealed accidentally or unveiled from criminal elements during transmission.

It is also preferred that the method include steps for the individual to choose various financial accounts, and choose various modes of electronic transmissions.

It is also preferred that the method include a method for archiving of data and electronic transmissions, and retrieval of the archived data using a tracking code.

It is furthermore preferred that any document, such as a facsimile or an electronic mail message be uniquely checksummed using algorithm for future identification of the document.

Yet another method of the invention is to be able to rapidly identify an individual from an examination of his biometrics sample and personal identification code by storing several dissimilar biometrics samples from different individuals in an electronic basket that is identified by one personal identification code.

In one embodiment of the invention, the computer system can allow individuals to select their own personal identification code (or "PIC") from a group of PICs selected by the remote data processing center. This is performed in a method whereby once the individual's biometric is gathered, the data processing center selects several PICs at random which may be conducive to being memorized. The data processing center then conducts a comparison of the biometric gathered with those already in those PIC baskets or groups. In the event the new registrant's biometric is to similar to any previously registered biometric which has been allotted to any one of those randomly selected PIC groups, then that PIC is rejected by the database for use by the new individual and an alternative PIC is selected for another such biometric comparison. Once the data processing center has generated several PIC options without a confusingly similar biometric, those PICs are presented to the new registrant from which the individual may select one PIC.

In one embodiment of the invention, there is a method for rapid search of at least one first previously stored biometric sample from a first individual, using a personal identification code-basket that is capable of containing at least one algorithmically unique second biometric sample that is from at least one second individual, and which is identified by said personal identification code-basket, comprising, firstly, a storage step further comprising: a) the selection of a private code by a first individual; b) the selection of a personal identification code by said first individual; c) the entering a biometric sample from said first individual; d) locating the personal identification code-basket identified by the personal identification code selected by said first individual; e) comparison of the biometric sample taken from said first individual with any previously stored biometric samples in said selected personal identification code-basket to make sure that the biometric sample entered by said first individual is algorithmically unique from the previously stored at least one biometric sample provided by at least one second individual, and; f) storage of the entered biometric sample from said first individual in the selected personal identification code-basket if said sample is algorithmically unique from the at least one previously stored biometric sample from said at least one second individual. There is also a bid step further comprising: a) entering said selected personal identification code by said first individual, and; b) entering a biometric sample by said first individual. There is also a comparison step comprising: a) finding the personal identification code-basket that is identified by said personal identification code entered by said first individual, and; b) comparison of the entered biometric sample from said first individual with said at least one stored biometric sample from said at least one second individual in said entered personal identification code-basket for producing either a successful or failed identification result. There could also be: a) an execution step wherein a command is processed and executed to produce a determination; b) an output step wherein said identification result or said determination is externalized and displayed, and; c) a presentation step wherein on successful identification of said first individual, said private code is presented to said first individual.

According to one embodiment of the invention, the host system is positioned in series between the individual being identified and other computer networks that are to be accessed, thereby acting as an interface. It will be appreciated that in this embodiment, the user tenders an access request directly to the host computer system of the invention, which is operationally interactive with other independent secured computer systems such as VISANET. The computer system would therefore maintain authenticated biometrics data samples for all authorized users of each secured computer system that it services. These data would be cross-referenced by each authorized user. Thus, after identity verification is completed, the security system provides to the user a listing of systems that he is authorized to access, and prompts the user to select the desired network. Thereafter, the requested execution step and information regarding the transaction is forwarded to the selected independent computer network similar to the type of communications sent today between merchants and credit card companies.

In a second embodiment the host system may also carry out the functions of the other independent computer systems such as debiting or crediting a financial account. In this system, the computer system of the invention carries out the functions requested by the individual without use of external, independent computer networks.

According to a further embodiment of the invention, a means is provided for alerting predesignated authorities during an access attempt during which the user has been coerced by a third party to request access to the host computer system. In such an embodiment, an authorized user would have a number of codes, most of which would be recognized by the computer system as the standard access codes, and others which would be recognized as emergency codes. The comparison means of the computer system of the invention would be configured to accept and recognize at least one code per authorized user, and to activate the emergency alert means whenever the code entered by the user matched an emergency code. At the same time, the determination of an authorized identity for the user would result in the user being afforded access to the requested secured computer system perhaps on an access level that has been predetermined to be restricted or perhaps resulting in the display of misleading data (i.e., "false screens"), thereby preventing the coercing third party from knowing that an emergency notification had been entered by the user. The emergency code would be entered as a part of or simultaneously with the user's personal identification code or by selecting an emergency account index during the access of the computer system. In either case, the well-being of the user requesting access might be jeopardized if the coercing party discovered that the user was attempting to notify authorities. Thus, it is critical that the access procedure continue uninterruptedly and that access be granted to an authorized user so that the coercing party believes that everything is proceeding normally. Although these features can be incorporated into the invention's host computer network, it is also possible that an independent computer network can also carry out the same or modified versions of the above-mentioned features.

The present invention is clearly advantageous over the prior art in a number of ways. First, it is extremely easy and efficient for the user, particularly where the user is accessing financial accounts, because it eliminates the need to carry and present any tokens in order to access one's accounts. The present invention eliminates all the inconveniences associated with carrying, safeguarding and locating any desired tokens. Further, because tokens are often specific to a particular computer system that further requires remembering a secret code assigned to the particular token, this invention eliminates all such tokens and thereby significantly reduces the amount of memorization and diligence increasingly required of consumers by providing access to all assets using only one personal identification code. Thus, in a single, tokenless transaction, the consumer can efficiently and securely conduct virtually any commercial exchange or electronic message, from withdrawing cash from a bank account, to authorization his agreement to the terms of a contract, to making a purchase directly from television, to paying local property taxes. The consumer is now uniquely empowered, by means of this invention, to conveniently conduct his personal and/or professional electronic transmissions and transactions at any time without dependence upon tokens which may be stolen, lost or damaged.

The invention is clearly advantageous from a convenience standpoint to retailers and financial institutions by making purchases and other financial transactions less cumbersome and more spontaneous. The paper work of financial transactions is significantly reduced as compared to current systems, such as credit card purchase wherein separate receipts are generated for use by the credit card company, the merchant and the consumer. Such electronic transactions also save merchants and banks considerable time and expense by greatly reducing operational costs. Because the system of the invention is designed to provide a consumer with simultaneous direct access to all of his financial accounts, the need for transactions involving money, checks, commercial paper and the like will be greatly reduced, thereby reducing the cost of equipment and staff required to collect and account for such transactions. Further, the substantial manufacturing and distributing costs of issuing and reissuing credit cards, ATM cards, calling cards and the like will be eliminated, thereby providing further economic savings to merchants, banks, and ultimately to consumers. In fact, the system of the invention will likely spur economic growth since all of a consumer's electronic financial resources will be available at the mere input of his fingerprint or other biometrics.

The invention is markedly advantageous and superior to existing systems in being highly fraud resistant. As discussed above, present computer systems are inherently unreliable because they base determination of a user's identity on the physical presentation of a unique manufactured object along with, in some cases, information that the user knows. Unfortunately, both the token and information can be transferred to another, through loss, theft or by voluntary action of the authorized user. Thus, unless the loss or unintended transfer of these items is realized and reported by the authorized user, anyone possessing such items will be recognized by existing security systems as the authorized user to whom that token and information is assigned.

By contrast, the present invention virtually eliminates the risk of granting access to non-authorized users by determining user identity from an analysis of one or more of a user's unique, biometrics characteristics. Even in the very rare circumstance of coercion, where an authorized individual is coerced by a coercing party to access his accounts, the system anticipates an emergency account index, whereby the authorized user can alert authorities of the transgression without the knowledge of the coercing party.

The invention further enhances fraud resistance by maiming authenticating data and carrying out the identity verification operations at a point in the system that is operationally isolated from the user requesting access, thereby preventing the user from acquiring copies of the authenticating data or from tampering with the verification process. Such a system is clearly superior to existing token-based systems wherein authenticating information, such as personal codes, is stored on and can be recovered from the token, and wherein the actual identity determination is potentially in operational contact with the user during the access process.

It is an object of the invention therefore to provide a computer access identification system that eliminates the need for a user to possess and present a physical object, such as a token, in order to initiate a system access request.

It is another object of the invention to provide a computer access identification system that is capable of verifying a user's identity, as opposed to verifying possession of proprietary objects and information.

It is yet another object of the invention to verify user identity based upon one or more unique characteristics physically personal to the user.

Yet another object of the invention is to provide a system of secured access that is practical, convenient, and easy use.

Still another object of the invention is to provide a system of secured access to a computer system that is highly resistant to fraudulent access attempts by non-authorized users.

Yet another object of the invention is to provide a computer access identification system that enables a user to notify authorities that a particular access request is being coerced by a third party without giving notice to said third party of the notification.

There is also a need for a computer access identification system that automatically restricts a user's transactional capabilities on the computer system according a desired configuration provided by the user.

These and other advantages of the invention will become more fully apparent when the following detailed description of the invention is read in conjunction with the accompanying drawings.

BRIEF DESCRIPTION OF THE DRAWINGS

FIG. 5 is a representational diagram of the request packet and the mandatory and optional data it contains;

FIG. 6 is a representational diagram of the response packet and the mandatory and optional data it contains;

FIG. 16 is a flow chart of the overall operation of ATM account access execution at the DPC;

FIG. 17 is a flow chart of the overall operation of issuer batch modification execution at the DPC;

DETAILED DESCRIPTION

As noted, the main objective of this invention is to provide a tokenless, secure, reliable, safe, and consistent, apparatus and method, for identifying individuals for the purpose of performing financial transactions and non-financial transmissions, which can accommodate large numbers of users. It is the essence of this invention that consumers have the ability to conduct these transactions without the use of any tokens, credit cards, badges or identification cards including drivers licenses. In order to be functional it is important that the system operate at speeds required for completing financial transactions such as credit card purchases and ATM services, from multiple banks and credit accounts. The system must be secure, such that individuals records and their biometrics information remain confidential and safe, both within the computer system that identifies the individual and authorizes transactions, or during transfer of data between the computer system and remote sites with which the computer system communicates. Furthermore, the system must be reliable in that errors in identification and authorization must not hamper or make use of the system cumbersome. Since only the use of biometrics are contemplated for identification of individuals, the system must also have security measures to either reduce access, even to the authorized user, or notify authorities in emergency cases. It is appreciated that the system must be able to handle a large number of users, and accommodate storage and transfer of large amounts of data, such as bio-characteristic information, commensurate with speeds at which financial transactions are carried on today.

Figure 1:
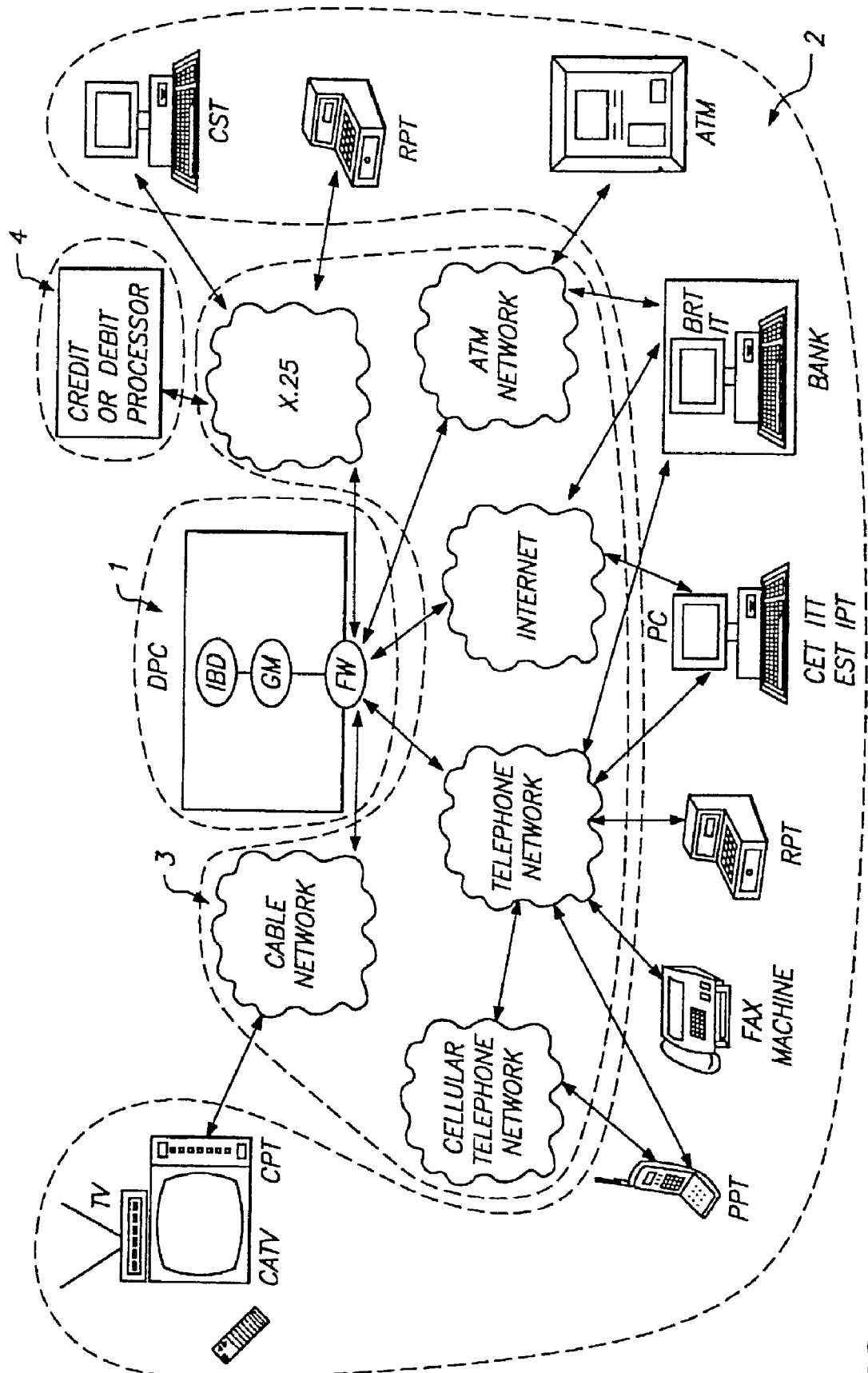
FIG. 1 is a diagram of the system of the present invention.
Figure 2:
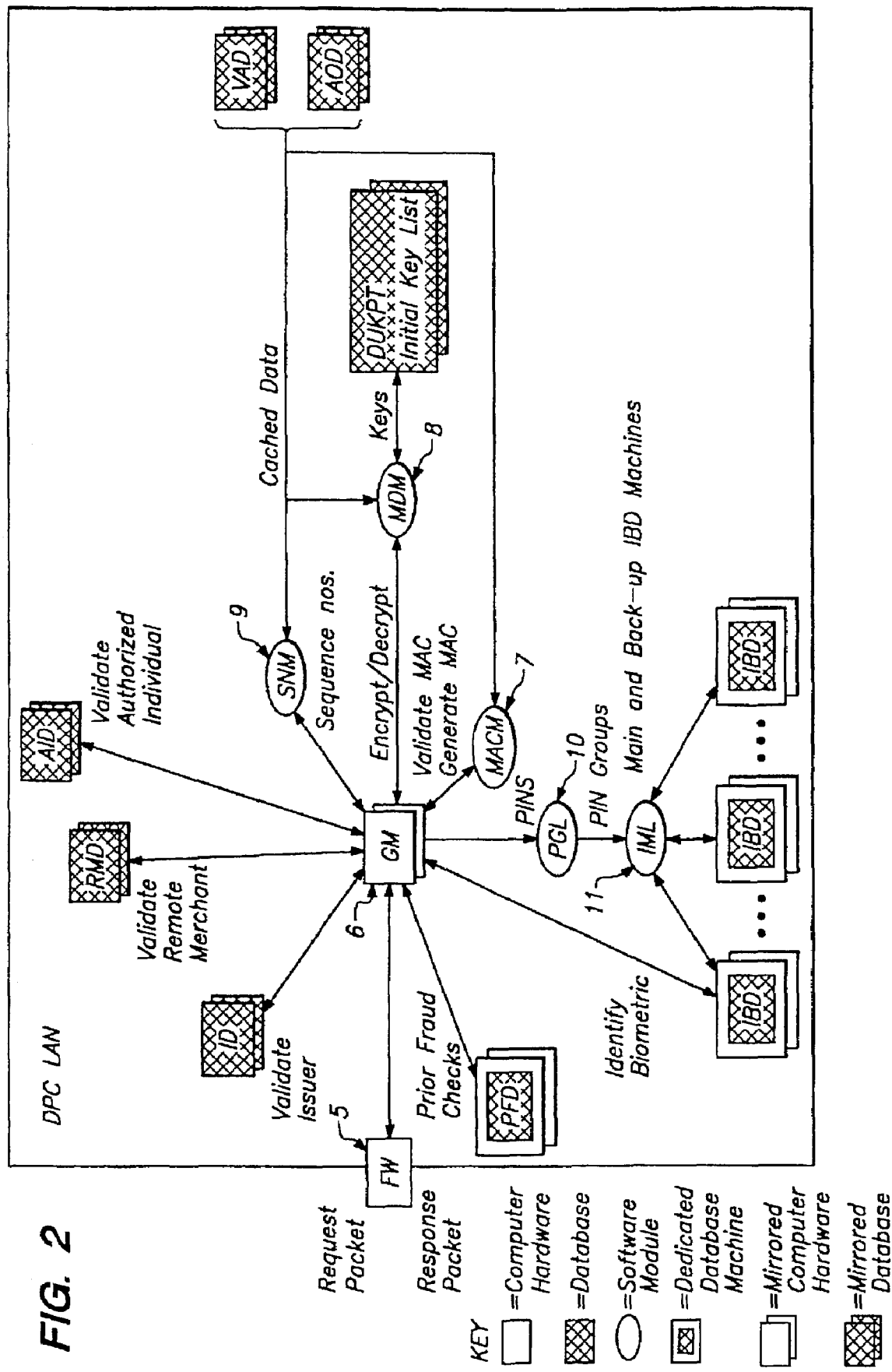
FIG. 2 is a diagram of the Data Processing Center (DPC) and its internal data bases and execution modules.
Figure 3:
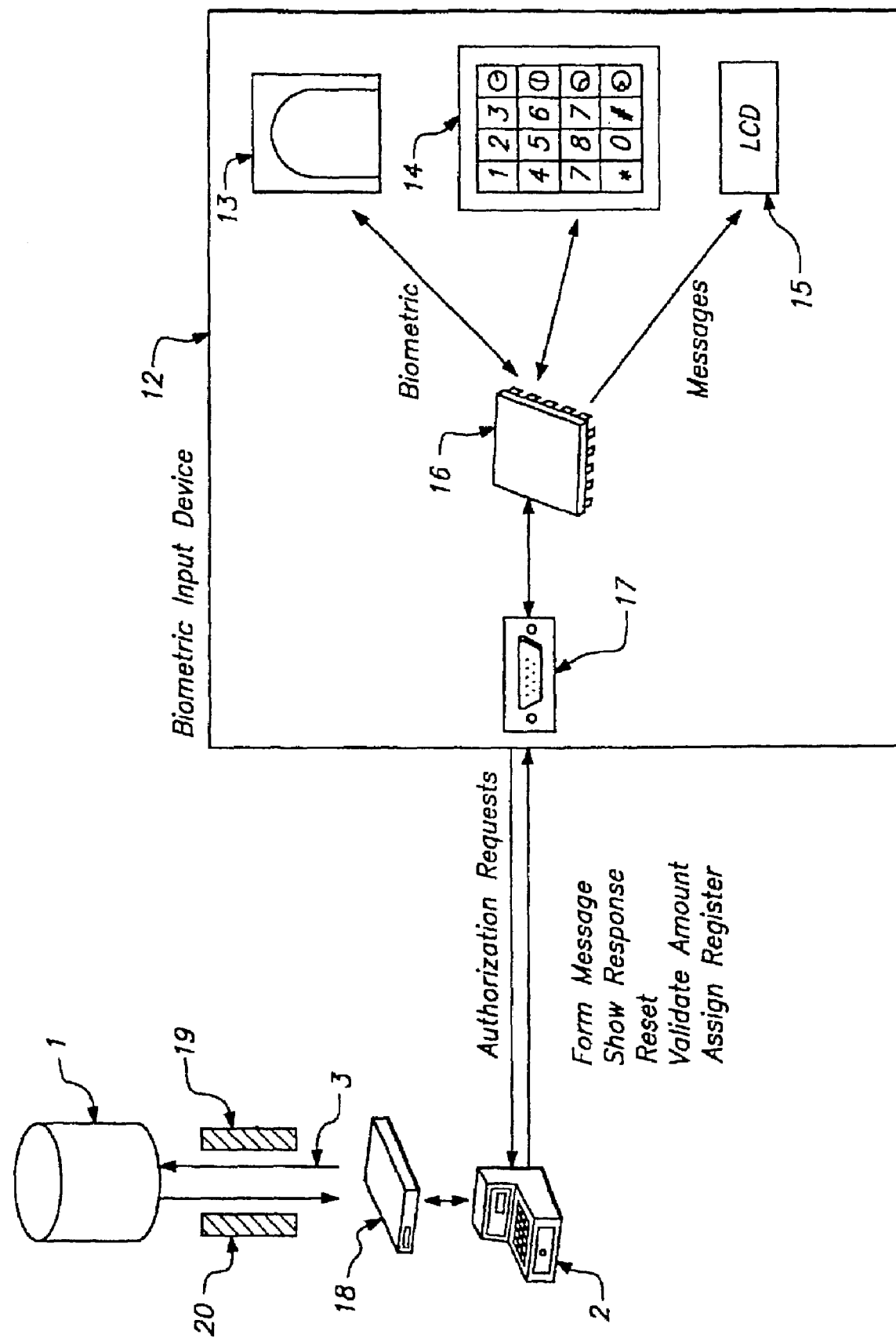
FIG. 3 is a diagram of the retail point of sale terminal, the biometrics input apparatus and its components, and the interconnections between them.
Figure 4:
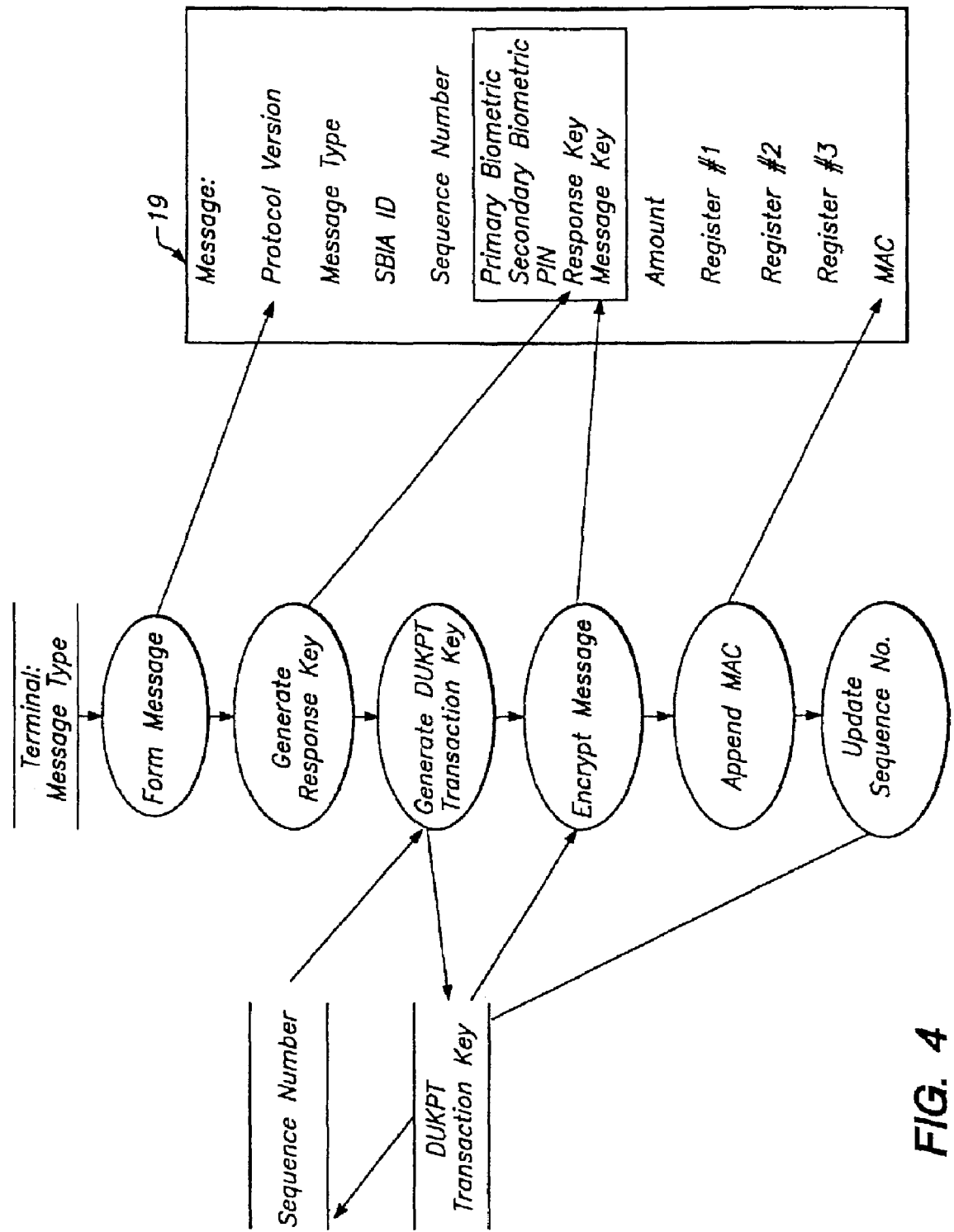
FIG. 4 is a flow chart of the operation of the biometrics input apparatus and the terminal for generating a request packet.
Figure 9:
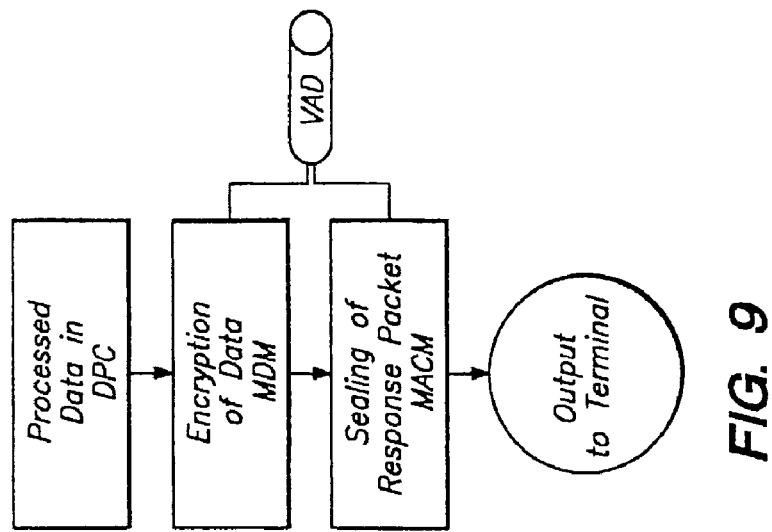
FIG. 9 is a flow chart depicting the data encryption and sealing process at the DPC.
Figure 8:
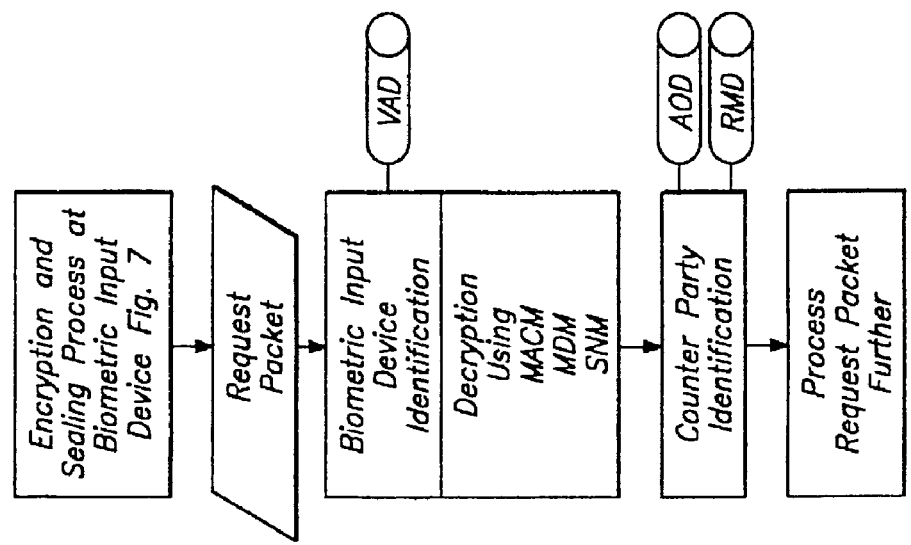
FIG. 8 is a flow chart depicting the data decryption and counter party identification process at the DPC.
Figure 7:
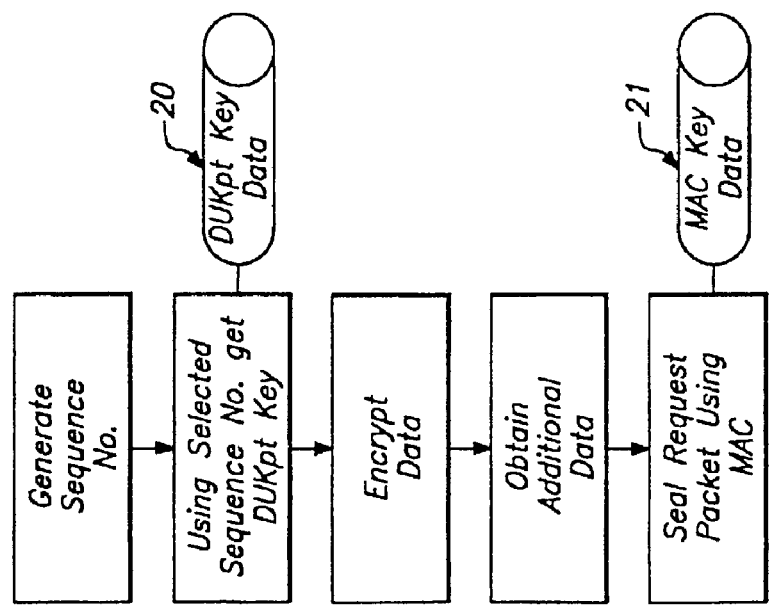
FIG. 7 is a flow chart depicting the data encryption and sealing process at the biometrics input device.
Figure 10:
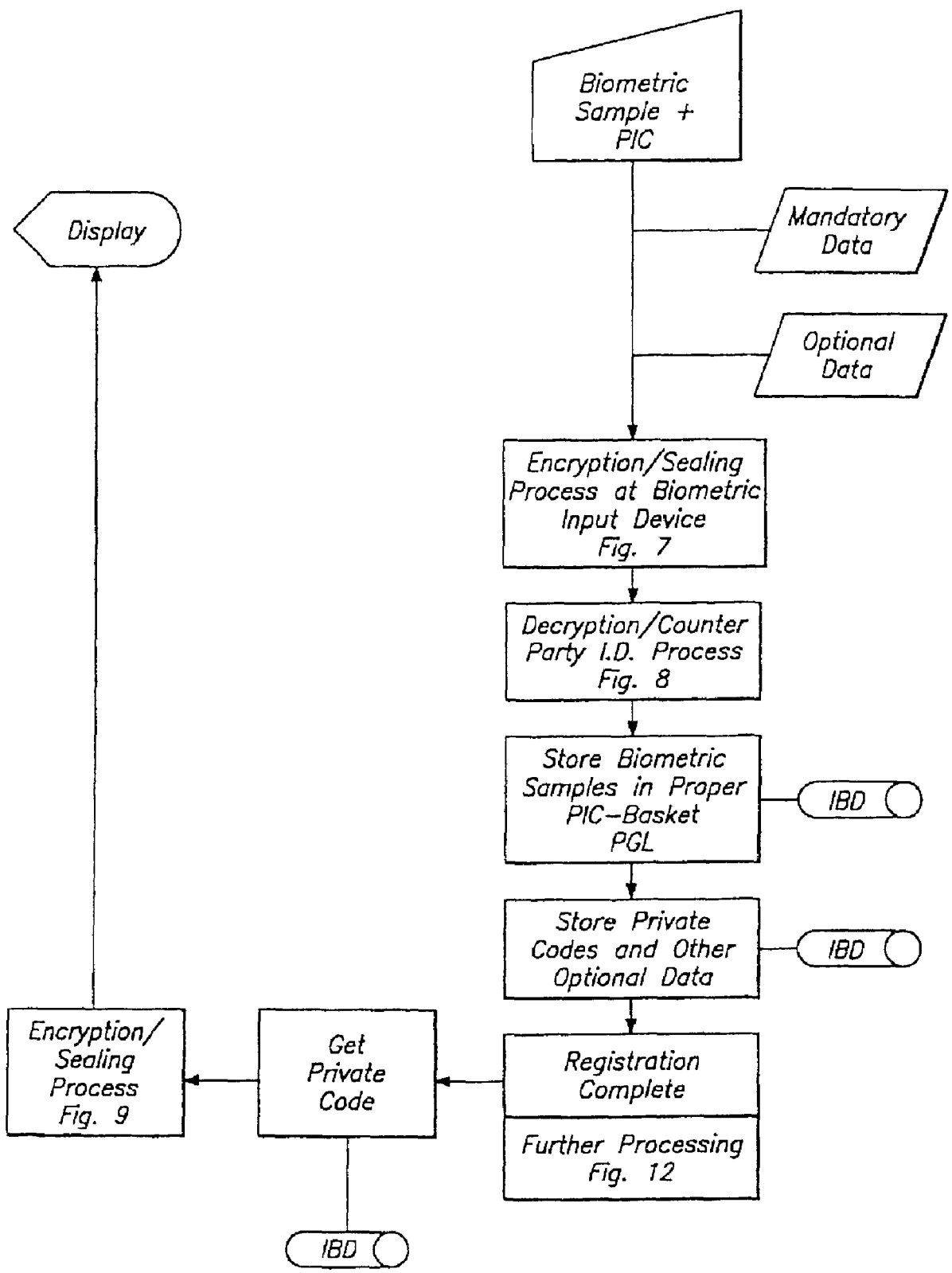
FIG. 10 is a flow chart representing the registration of an individual during the registration process.
Figure 11:
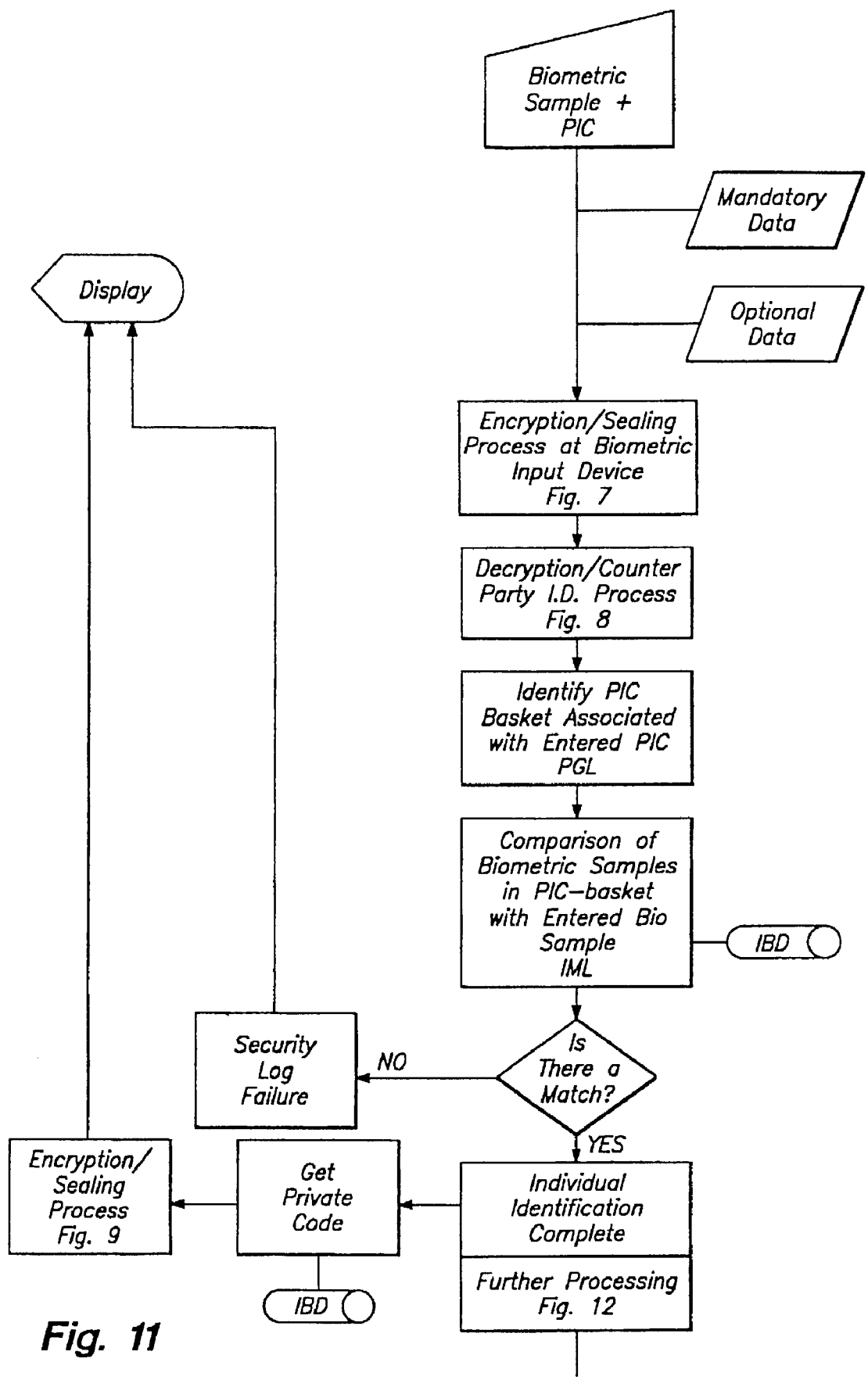
FIG. 11 is a flow chart representing the process of identification of the individual and returning a private code to the individual.
Figure 13:
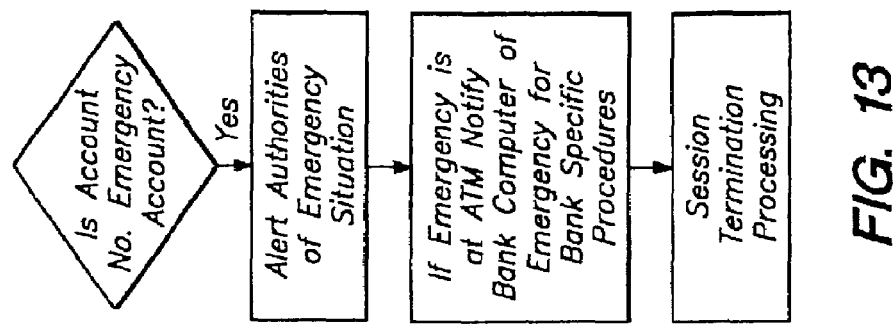
FIG. 13 is a flow chart of the emergency request and response process at the DPC.
Figure 12:
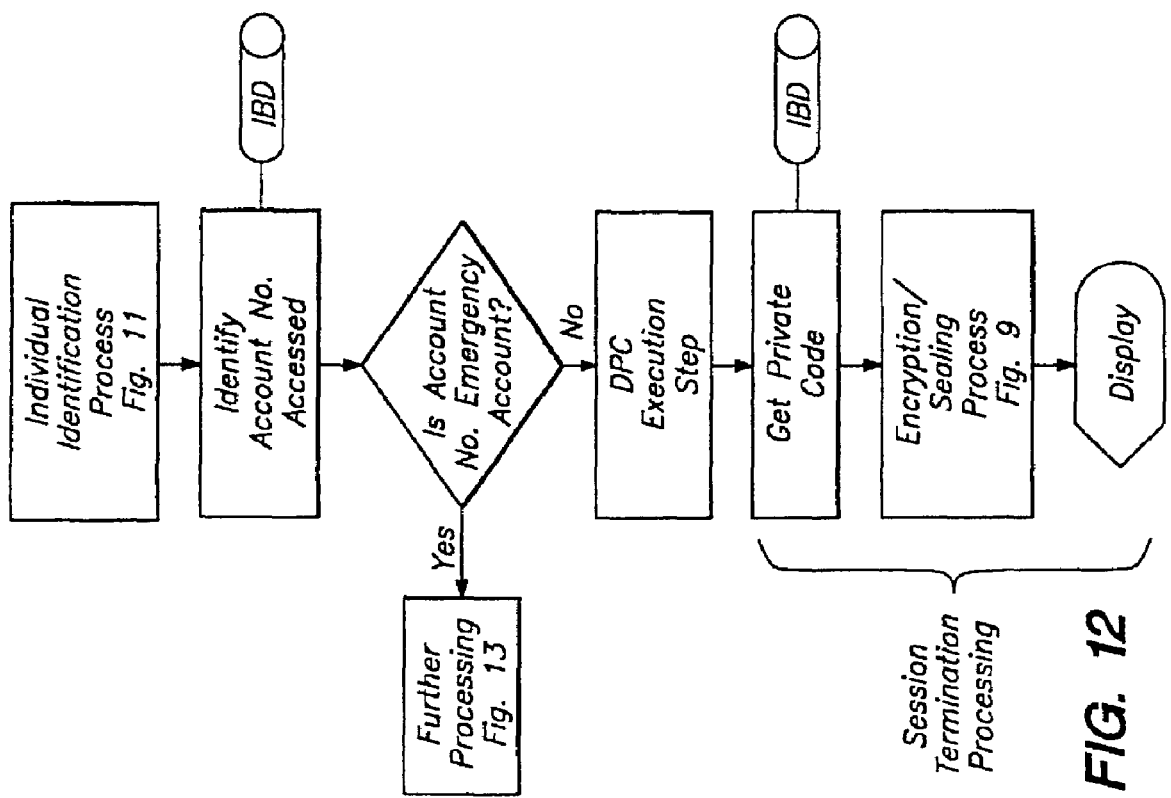
FIG. 12 is a flow chart of the skeleton of the processes that occur at the DPC and an execution step.
Figure 15:
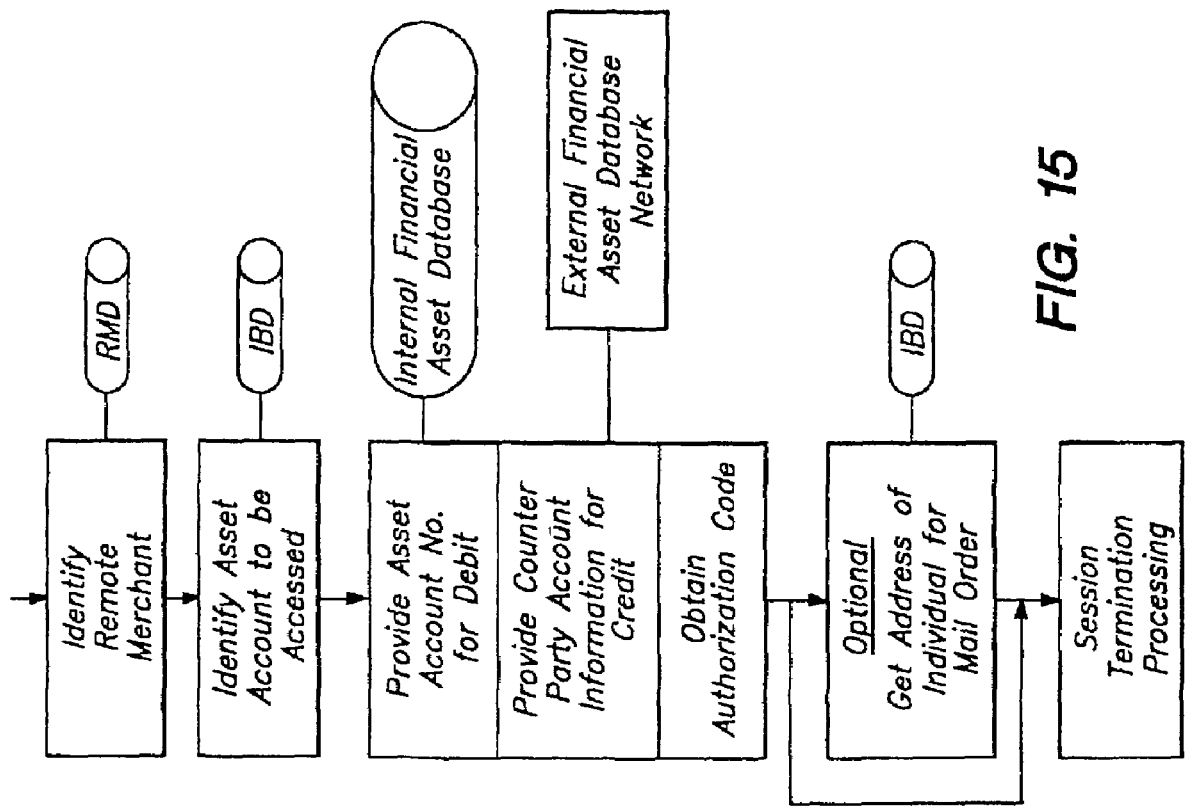
FIG. 15 is a flow chart of the overall operation of remote transaction authorization execution step at the DPC.
Figure 14:
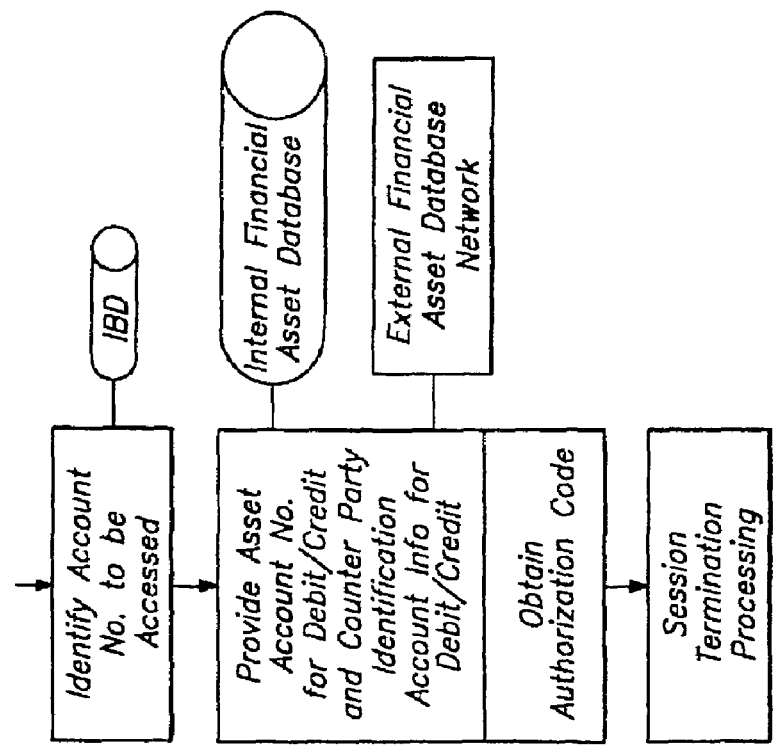
FIG. 14 is a flow chart of the overall operation of retail transaction authorization execution at the DPC.
Figure 19:
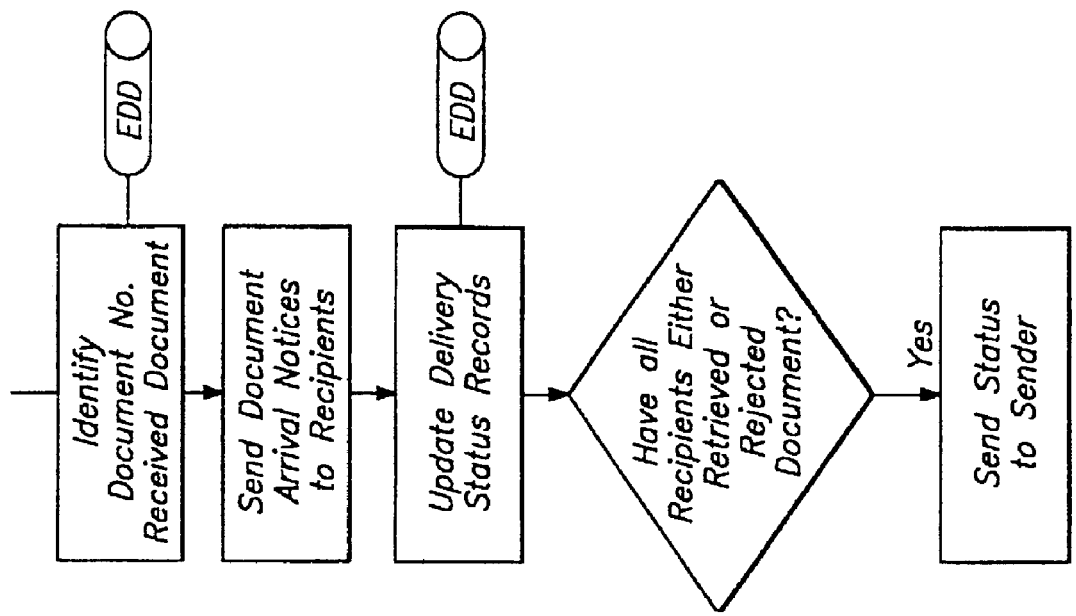
FIG. 19 is a flow chart of the overall operation of secure fax data and electronic document data execution at the DPC.
Figure 18:
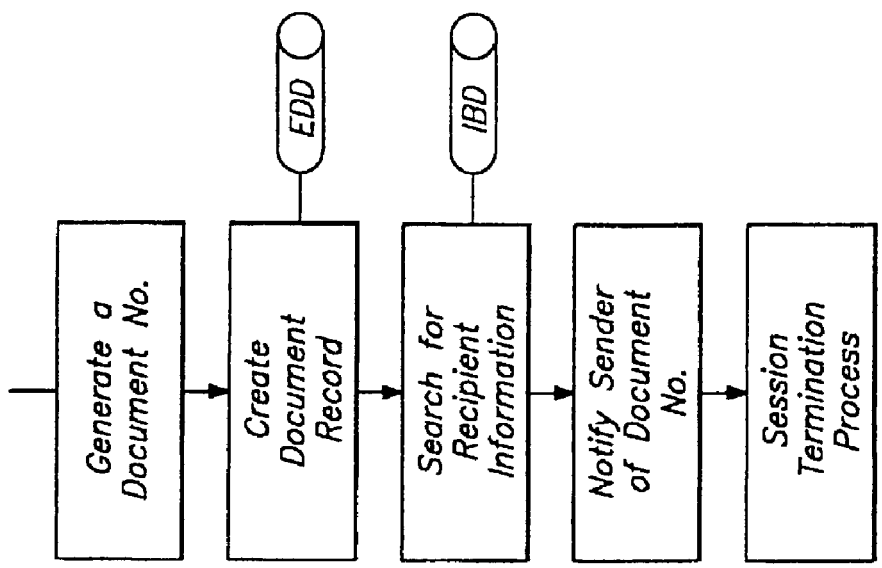
FIG. 18 is a flow chart of the overall operation of secure fax submit and electronic document submit execution at the DPC.
Figure 20A:
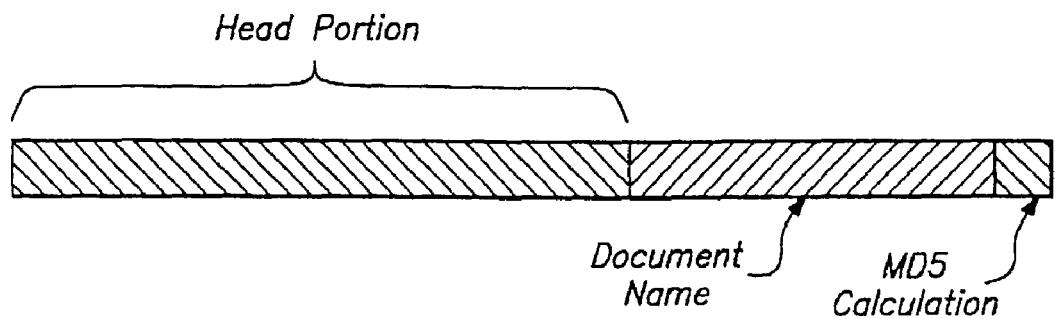
FIG. 20A is a representational diagram of the electronic signature request packet.
Figure 20B:
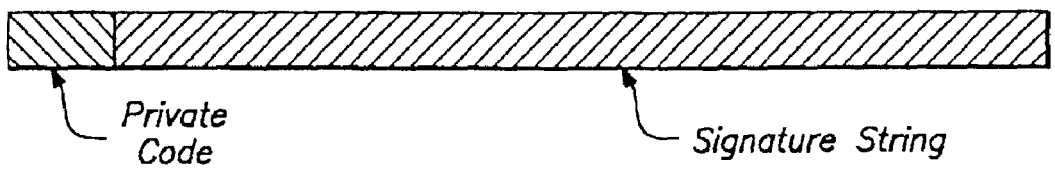
FIG. 20B is a representational diagram of the electronic signature response packet.
Figure 20C:
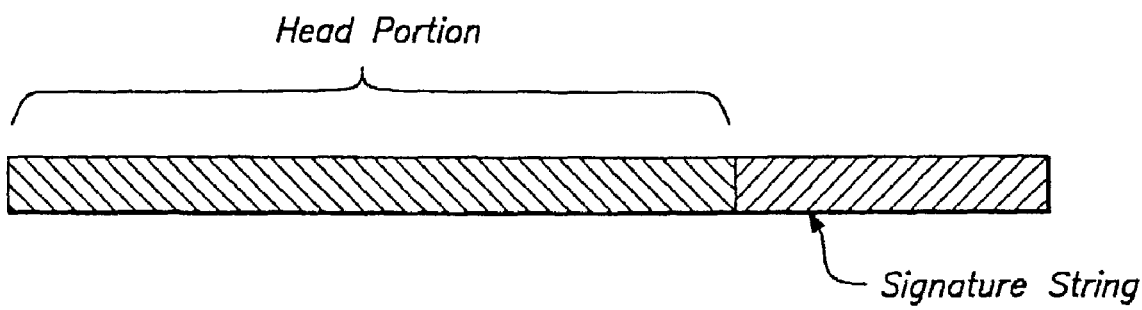
FIG. 20C is a representational diagram of the electronic signature verification request packet.
Figure 20D:
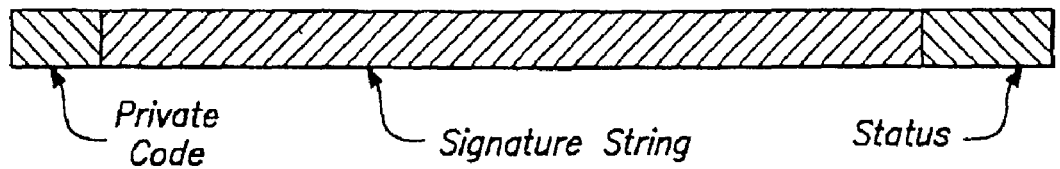
FIG. 20D is a representational diagram of the electronic signature verification request packet.
Figure 22:
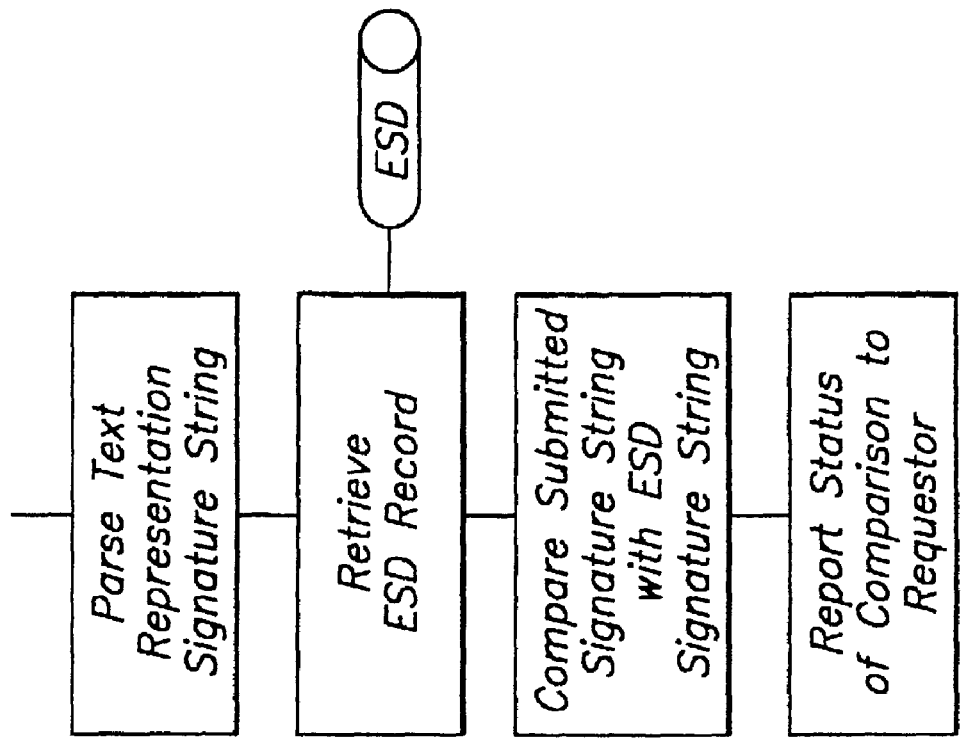
FIG. 22 is a flow chart of the overall operation of electronic signature verification execution at the DPC.
Figure 21:
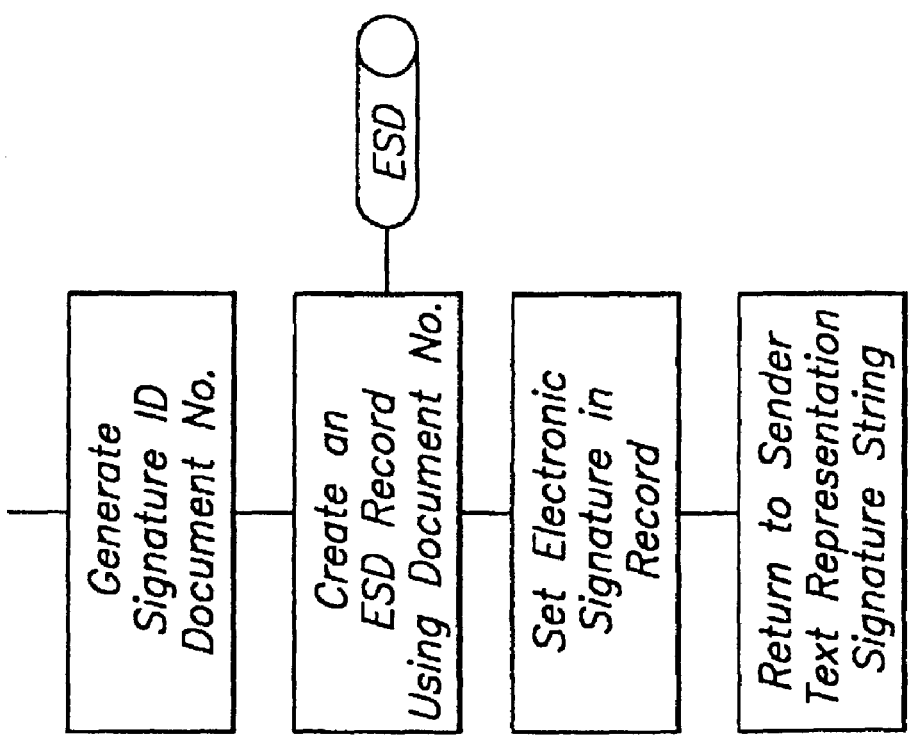
FIG. 21 is a flow chart of the overall operation of electronic signature execution at the DPC.

Turning now to the figures, the overall configuration of the invention and its components are shown in FIG. 1. Essentially a Data Processing Center (DPC) 1 is connected to various terminals 2 through various type of communication means 3 which can be one of several types. The DPC is also connected and communicates with independent computer networks 4. The DPC contains several data bases and software execution modules as shown in FIG. 1. In a preferred embodiment of the invention, the data bases are backed up or "mirrored" for safety reasons. The Firewall Machine 5 is responsible for prevention of electronic intrusion of the system while the Gateway Machine 6 is responsible for carrying out all requests from the user, including adding, deleting and otherwise modifying all data bases. The Gateway Machine is also responsible for decryption and de-packaging of data that has arrived from the terminals using the MACM module 7, MDM module 8, and the SNM module 9. The PGL module 10, and the IML module 11 are used to locate the proper personal identification code and biometrics sample basket. FIG. 3 depicts an example of a terminal and the biometrics input device 11, which has a biometrics scanner 13, data entry means such as a key pad or PIN pad 14, and a display panel 15. The biometrics scanner can be any one of finger print scanner, voice recognition, palm print scanner, retinal scanner or the like, although the fingerprint scanner will be used as an example. The biometrics input device is further equipped with computing modules 16, device drivers, and erasable and non-erasable memory modules. The biometrics input device communicates with the terminal through preferably a serial port 17. The terminal 1 communicates through a conventional modem 18 with the DPC 1 through request packets 19 and response packets 10 using one of the interconnecting means in FIG. 1 such as cable network cellular telephone networks, telephone networks, Internet, ATM network, or X.25. FIG. 4 shows a representational diagram of the request packet 19 and its method of generation by the biometrics input device software. FIG. 5 and FIG. 6 show a representational diagram of the request packet and response packet with optional and mandatory data segments. Furthermore, it is shown which parts of the packets are encrypted and which ones are sealed. FIG. 7 is a block diagram of the overall process for data encryption and sealing showing the use of DUKPT key data 20 for encryption of data before appending additional data before sealing the request packet with a Message Authentication Code Key (MAC) 21. FIG. 8 and FIG. 9 show the decryption and encryption process at the DPC. FIG. 12 through 19 and 11 through 12 are block diagrams of selected examples of execution steps carried on at the DPC.

Description of the drawings, diagrams, flow charts and the description of the invention, including hardware components, software components, execution modules, data bases, connection means, the data transferred between them, and the method of the invention is described in detail as follows.

1.1. Biometric Input Apparatus (BIA)

1.1.1. Introduction

The BIA is a combination of hardware and software whose job is to gather, encode, and encrypt biometric input for use in individual identification. All actions of the BIA are directed by an outside controlling entity called a terminal, which issues commands and receives results over the BIA's serial line.

BIA hardware comes in four basic versions: standard, wireless, integrated phone/cable television (or "CATV")/ fax, and ATM. Each BIA hardware variant addresses a particular need in the marketplace, and because of the differences in construction, each variant has a different level of security.

BIA software comes in seven basic versions: personal computer (or "PC"), retail, ATM, registration, internal, issuer, and integrated remote. Each software load provides a different, use-specific command set. For instance, the registration software load does not accept requests to form retail transaction messages. Likewise, the retail software command set cannot send individual registration messages. To provide another layer of security, the DPC knows what software package is loaded into each BIA; any attempts by an BIA to send a message that it is normally not able to send is rejected, and treated as a major security violation.

The ability of the invention to detect and combat merchant-based fraud relies on the fact that the BIA's external interface is strictly limited, that the construction of the BIA makes it extremely difficult to tamper with the contents, that each BIA has its unique encryption codes that are known only to the DPC, and that each BIA is only allowed to perform operations limited to its designated function. Each biometric input means has a hardware identification code previously registered with the DPC, which makes the biometric input means uniquely identifiable to the DPC in each subsequent transmission from that biometric input device.

The BIA is constructed with the assumption that the controlling terminal is a source for fraud and deception. Terminals range from software applications running on personal computers to dedicated hardware/software systems developed for a particular use such as a retail point of sale. Regardless of the particular model, no BIA reveals unencrypted biometric information. BIA models without display means (such as LCD, LED, or quartz screens) must reveal selected information (such as individual private codes) to the terminal for display, and as a result those particular terminal-BIA combinations are considered to be less secure.

Depending on the task at hand, BIA models are either partially or fully integrated with the terminal. Partially integrated devices are physically separate from the terminal, and they include wireless and standard retail point of sale BIAs. Fully integrated devices are contained within the physical enclosure of the terminal itself, for instance, an ATM, or a telephone.

No BIA ever discloses any secret encryption codes to any external source.

1.1.2. BIA Models

Particular BIA hardware models have different configurations. They are introduced in brief here:

BIA

Standard model has computing module (i.e., multichip modules), biometric scanner (i.e., single fingerprint scanner), display means (i.e., LCD screen), communications port (i.e., serial port), data entry means (i.e., a manual data entry key board or PIC pad) encased in tamper-resistant case, and electronic detection means (i.e., RF shielding).

BIA/Wireless

Standard model, but serial line replaced with spread-spectrum wireless communications module using external antenna. Used in restaurant point of sale.

BIA/ATM

Has heavy-duty scanner and serial port, along with a multichip module. The fact that the LCD is part of the terminal and not the BIA means lower security because it must reveal the private code to the terminal. Used in ATMs.

BIA/Catv

Has light-duty scanner, otherwise like ATM. Used in telephones, CATV remotes, and fax machines. Weakest security, both because the LCD and PIC pad are pan of the terminal not the BIA, and because of the low-cost nature of the market.

1.1.3. BIA Command Set Messages

Each BIA software command set provides a different set of operations. They are introduced briefly here:

BIA/ATM

Account Access

BIA/Catv

Remote Transaction Authorization

BIA/Fax

Secure Fax Submit

Secure Fax Data

Secure Fax Tracking

Secure Fax Retrieve

Secure Fax Reject

Secure Fax Archive

Secure Fax Contract Accept

Secure Fax Contract Reject

Electronic Document Archive Retrieve
BIA/Internal
Individual Identification
BIA/Issuer
Issuer Batch
BIA/PC
Electronic Document Submit
Electronic Document Data
Electronic Document Tracking
Electronic Document Retrieve
Electronic Document Reject
Electronic Document Archive
Electronic Document Archive Retrieve
Electronic Signature Submission
Electronic Signature Check
Remote Transaction Authorization
Network Credential
Secured Connection
BIA/Registration
Individual Identification
Biometric Registration
BIA/Retail
Transaction Authorization 1.1.4. BIA Hardware: Standard Model The Standard BIA hardware is a multichip module combined with a single-print scanner, an LCD screen, a serial port, and a PIC pad encased in a hard tamper-resistant case that makes attempts to penetrate obvious while also providing RF shielding for the contents.

The following components are amalgamated into a multichip module, called the BIA Multichip Module (a process for encapsulating several processors in one physical shell, well known in the industry), constructed to protect the communications pathways between the devices from easy wiretapping.

Serial processor
PIC pad processor
LCD screen processor
CCD scanner A/D processor
High-speed DSP processor containing both flash and mask ROM
General purpose microprocessor
Standard RAM
EEPROM The following software packages and data are stored in mask ROM. Mask ROM is cheaper than other types of read only memory, but it is easily reverse engineered, and is not electronically erasable. As such we only place the noncritical commonly available code here. (Mask ROM is well known in the industry).

MAC calculation library
DUKPT Key Management library
DES (with CBC) Encryption library
Base-64 (8-bit to printable ASCII) converter library
Public Key Encryption library
Embedded Operating System
Serial line device driver
LCD device driver
PIC pad device driver
Scanner device driver
Unique hardware identification code
Multi-Language profiles The following standard data and software packages are stored in flash ROM. Flash ROM is more expensive, but it is much more difficult to reverse engineer, and most importantly, it is electronically erasable. All of the more critical information is stored here. Flash ROM is used in an attempt to increase the difficulty of duplicating an BIA. (Flash ROM is well known in the industry).

Unique DUKPT Future Key Table
Unique 112-bit MAC Key
DSP biometric quality determination algorithm
DSP biometric encoding algorithm
Random number generator algorithm
Command function table The message sequence number, incremented each time a message is sent from the BIA, is stored in the EEPROM. EEPROM can be erased many times, but is also nonvolatile—its contents remain valid across power interruptions. (EEPROM is well known in the industry).

The following data is stored in RAM. RAM is temporary in nature, and is lost whenever power is lost.

Encoded Biometric Register
PIC Register
Account Index Code Register
Title Index Code Register
Amount Register
Document Name Register
PIC-Block Key
Message Key
Response Key
Shared Session Key
Private Session Key
8 General Registers
stack and heap space Each multichip module contains a "write-once" memory location that is irreversibly set following the initialization of the flash ROM. Whenever an attempt is made to download software to the flash ROM, this memory location is checked; if it is already been set, then the BIA refuses to load. This way, critical software and data keys may only be downloaded once into the device, at the time of manufacture.

All registers and keys are explicitly zeroed when a transaction is canceled. Once a transaction is completed, registers are cleared as well. Once a "form message" command is executed, biometric, PIC, and account index code registers are also cleared, along with any encryption keys that aren't required for subsequent use.

It is important that the software not keep copies of registers or keys in stack variables (known in the industry).

The following associated hardware components comprise the standard BIA hardware module.

BIA Multichip module
CCD single-print scanner
capacitance detector plate (known in the industry)
lighted PIC keypad
2-line 40-column LCD screen
RF shielding
tamper-resistant case
serial connection (up to 57.6 kb)
breech detection hardware (known in the industry)
optional thermite charge attached to Multichip module (known in the industry)

All temporary storage and internal hardware and software used to calculate these values are secured, which means they resist any attempts to determine their current values, or their means of functioning. This feature is essential for the security of the invention, just as it is critical that the "wiretapping" of an BIA and specifically the gathering of a Biometric-PIC Block for fraudulent means is made as difficult as possible.

The multichip module and the components are, where practical, physically connected to each other without exposed wiring being present.

The enclosure protecting the electronic components of the BIA is welded shut during manufacture; it cannot be opened under any circumstances without significant damage to the case. Upon detecting any opening (or damage) of the enclosure, the BIA performs an emergency electronic zero of any and all keys residing in flash ROM, followed by all of the software libraries. Specific breech detection methods are kept confidential and proprietary.

In addition to protecting the contents, the case also shields the internal operations from RF signal detectors.

Supersecure versions of the BIA exist whereby breech detection methods are connected to a mechanism that physically destroys the multichip module as well as the detection methods themselves.

1.1.5. BIA Hardware: Wireless Model

The Wireless version of BIA hardware is identical to the Standard model in construction, except that it exports a spread-spectrum wireless communications module using an external antenna instead of an external serial port.

This version is designed to be used in restaurants, where transactions are authorized at the customer's convenience.

In the following descriptions, items which are added to the standard set are signified by the + character, while items that are removed from the standard set are signified by the − character.

Multichip Module:
−Document Name Register
−Shared Session Key
−Private Session Key
−Message Key
Components:
−Serial port
+External antenna
+Spread-spectrum wireless serial module (known in the industry)

1.1.6. BIA Hardware: ATM Model

The ATM version of BIA hardware is a multichip module combined with a heavy-duty single-pit scanner and a serial port. The components are encased in a tamper-resistant case that makes attempts to penetrate obvious while also providing RF shielding for the contents.

This version is designed to be retrofitted into ATM locations. As such, the scanner pad is a heavy-duty sensor pad, and the entire construction makes use of the existing screens and keypads present in the ATM itself.

In the following descriptions, items which are added to the standard set are signified by the + character, while items that are removed from the standard set are signified by the − character.

Multichip Module:
−Amount Register
−Document Name Register
−Shared Session Key
−Private Session Key
−Message Key
Components:
−lighted PIC keypad
−2-line 40-column LCD screen Note that since the ATM has no LCD screen or PIC keypad, it really has no need of those device drivers in the mask ROM.

1.1.7. BIA Hardware: Phone/CATV Model

The Phone/CATV version of BIA hardware is a multichip module combined with a single-print scanner and a serial port. The module is physically attached to the scanner, and the whole is encased in plastic in order to make tampering more difficult. Some mount of RF shielding is provided for the components.

This version is designed to be integrated with telephones, television remote controls, and fax machines. As a result, it makes use of the existing keypads and LCD or television screens to enter or display values. It also uses the communication facilities of the host terminal. For example, the fax machine uses the built-in fax modem and the television remote uses the CATV cable network.

This hardware model is (in comparison with other models) relatively insecure, as it is intended that these devices cost as little as possible, be lightweight, and integrate easily with existing low-cost devices.

Of course, higher-security versions with more complete enclosures are possible and encouraged.

In the following descriptions, items which are added to the standard set are signified by the + character, while items that are removed from the standard set are signified by the − character.

Multichip Module:
−Document Name Register
−Shared Session Key
−Private Session Key
−Message Key
Components:
−lighted PIC keypad
−2-line 40-column LCD screen 1.2. BIA Software 1.2.1. BIA Software Command Interface:

The external interface to the BIA is much like a standard modem; commands are sent to it from a controlling terminal using the external serial line. When a command completes, a response code is sent from the BIA to the terminal.

Each BIA software load supports a different set of operations. For instance, a retail load supports only transaction authorizations, while a registration load supports individual identification and biometric registration.

All BIA data fields are in printable ASCII, with fields separated by field separator (or "fs") control character, and records separated by newlines. Encrypted fields are binary converted to 64-bit ASCII using the base-64 conversion library (all known in the industry).

Some commands are not available in some configurations. For instance, the ATM BIA cannot "Get PIC", since there is no attached PIC pad. Instead, the ATM BIA supports a "Set PIC" command.

Response Codes:

Out of time:

The time allotted for the command has expired. A message to that effect will be displayed on the LCD screen, if available. When time expires for a given command, the BIA acts as if the cancel button was pushed.

Canceled:

The "cancel" button has been pushed, and the entire operation has been canceled. This has the side effect of clearing all information which was gathered. A message to that effect will be displayed on the LCD screen, if available.

Ok:

The command was successful.

Other:

Each command may have specific other response codes which are valid only for it. These response codes will generally have text accompanying the code, which will be displayed on the LCD screen if it is available.

Message:

This indicates that the command is ongoing, but that the BIA wants to send a message to the terminal with an interim result message. The result is also displayed on the LCD, if available. This facility is used for prompts, as well as status messages.

Commands:

In the argument list of the commands below, the <> characters surround individual arguments, [] characters surround optional arguments, and the .vertline. character indicates that a given argument may be comprised of one of the choices presented.

Set Language <language-name>

This command selects from one of a number of different languages encoded within the BIA for prompting for user input.

Get Biometric <time>[primary.vertline.secondary]

This command requests the BIA to activate its scanner to get biometric input from the individual, storing it into the Encoded Biometric Register.

First, the message "Please place finger on lighted panel" is displayed on the LCD panel and returned to the terminal. The scanner pad is illuminated, prompting the individual to enter his biometric.

A <time> value of zero means that there is no limit to the time for biometric scan input.

When in scanning mode, a fingerprint scan is taken and given a preliminary analysis by the print quality algorithm. If the scan is not good enough, the BIA continues to take new scans until <time> seconds pass. As time passes and snapshots of the print are taken and analyzed, messages are posted to the LCD screen and sent to the terminal based on the problems detected by the print quality software. If no print of appropriate quality is forthcoming, the BIA returns an error code of time expired, displaying a message to that effect on the LCD.

Once the print quality algorithm affirms the quality of the print scan, the print's minutiae are then extracted by the print encoding algorithm. Only a subset of the minutiae are selected at random, with care taken to retain enough sufficient for identification. These minutiae are then ordered randomly, and are placed in the Encoded Biometric Register. Then the BIA responds with the success result code.

If the [primary.vertline.secondary] is specified (only available in the biometric registration command set) then the entire minutiae set is selected, not just the smaller subset. Likewise, primary/secondary biometric selection ends up placing the encoded biometric into the appropriate register.

Whether or not the operation succeeds, as soon as scanning has terminated, the light indicating that scanning is in progress is turned off It is very important that the same biometric input yields different encodings, so as to complicate the task of anyone attempting to discover the encryption codes of a captured BIA. This is accomplished by the selection of a random subset and random ordering of the encoded biometric.

Get PIC <time>

This command requests the BIA to fill the PIC Register by reading from the keypad.

First, the message "Please enter your PIC, then press <enter>" is displayed on the LCD display and sent to the terminal, the appropriate keypad lights are turned on, and then keypad scanning begins.

Scanning terminates when either <time> number of seconds runs out, or when the individual hits the "enter" key.

Note that the individual digits of the PIC are not displayed on the LCD panel, but for each digit the individual types, a star "*" appears to give the individual feedback. When the "correction" key is pressed, the last digit entered is erased, allowing the individual to fix input mistakes.

When PIC input terminates, the keypad lights turns off.

If successful, the command returns OK.

Get Account Index Code <time>

First, the message "Now enter your account index code, then press <enter>" is displayed on the LCD and sent to the terminal. This prompts the individual to enter his account index code. When each key is pressed, that value appears on the LCD panel. The correction button can be pressed to erase one of the values. When the "enter" button is pressed, the Account index code register is set.

During input, the appropriate keypad keys are lit, and when input is concluded, the keypad lights are turned off.

If successful, the command returns OK.

Get Title Index Code <time>

First, the message "Please enter your title index code, then press <enter>" is displayed on the LCD and sent to the terminal. This prompts the individual to enter his title index code. When each key is pressed, that value appears on the LCD panel. The correction button can be pressed to erase one of the values. When the "enter" button is pressed, the Title Index Code register is set.

During input, the appropriate keypad keys are lit, and when input is concluded, the keypad lights are turned off.

If successful, the command returns OK.

Validate Amount <amount> <time>

The Validate Amount command sends the message "Amount <amount> OK?" to the terminal, and displays it on the LCD screen. If the individual confirms the amount by hitting the "yes" (or enter) button, the Amount Register is set to <amount>. The <amount> value must be a valid number, with no control characters or spaces, etc. During prompting, the yes, no, and cancel buttons are lit. Once prompting is complete, all the lights are turned off.

If the individual enters "no", then the transaction is canceled.

Enter Amount <time>

The Enter Amount command sends the message "Enter amount" to the terminal, and also displays it on the LCD screen as well. The individual must then enter the dollar amount himself. Each character entered is displayed on the LCD screen. All appropriate buttons are lit. If the enter button is hit, the Amount Register is set to be the value entered on the keyboard. Once entry is complete, all the lights are turned off.

Validate Document <name> <time>

The Validate Document command sends the message "Document <name> OK?" to the terminal, and displays it on the LCD screen as well. If the individual confirms the document by hitting the "yes" (or enter) button, the Document Name Register is set to <name>. The <name> must be printable ASCII, with no control characters, and no leading or trailing spaces. During prompting, the yes, no, and cancel buttons are lit. Once prompting is complete, all the lights are turned off.

If the individual enters "no", the transaction is canceled.

Assign Register <register> <text>

The assign register command sets the designated General <register> to have the value <text>. This is used to set information such as the merchant code, the product information, and so on.

Get Message Key

The Get Message Key command causes the BIA to generate a 56-bit random key to be used by the controlling hardware to encrypt any message body that the controlling device wishes to add to the message. That generated key is returned by the BIA in hexadecimal format (known in the industry). The message key are then added to the biometric-PIC block.

Form Message <type=identification.vertline.transaction.vertline.account access . . . >

The form message command instructs the BIA to output a message containing all the information it has gathered. It also checks to make sure that all the registers appropriate to that specific message <type> have been set. If all required registers are not set, the BIA returns with an error. The specific command set software will determine which messages can be formed by that BIA model; all others will be rejected.

Each message includes a transmission code consisting of the BIA's unique hardware identification code and an incrementing sequence number. The transmission code allows the DPC to identify the sending BIA and to detect resubmission attacks.

The BIA uses the DUKPT key management system to select the biometric-PIC block encryption 56-bit DES key from the Future Key Table. This key is then used to encrypt the Biometric-PIC Block using cipher block chaining (CBC). In addition, a response DES key is also generated randomly, and is used by the DPC to encrypt the portions of the response that need to be encrypted.

Note: splitting the response key from the biometric-PIC block key is very important, since each encryption key must be used only within the context of its own responsibilities. That way, if someone were to break the key encoding the private code, it would not result in the disclosure of the biometric-PIC.

The Biometric-PIC block consists of the following fields:
300-byte authorization biometric
4–12 digit PIC
56-bit response key
[optional 56-bit message key]

Note that the message key is only present if the controlling terminal has requested a message key for this message. It is up to the controlling terminal to encrypt any message body attached to the transaction authorization request using the message key.

Once all encryption is complete, the BIA outputs the body of the appropriate request message (such as a Transaction Authorization Request message), terminated by and protected with the Message Authentication Code (MAC).

The MAC field is calculated using the BIA's secret 112-bit DES MAC key, and covers all message fields from first to last. The MAC assures the DPC that nothing in the message has changed effectively sealing the message, while still allowing the plaintext fields to be inspected by the controlling terminal.

When the Form Message command is done, the BIA sends the message "I'm talking to DPC Central" to the terminal as well as displaying it on the LCD screen, indicating that work is proceeding on the request.

The command returns OK in addition to returning the entire formed message upon completion of the command.

Show Response <encrypted response> <time>

The Show Response command instructs the BIA to use its current Response Key to decrypt the private code from the system.

After decryption, a chime sounds, and the private code is displayed on the LCD screen for <time> seconds. At no time does this command transmit the decrypted private code to the controlling terminal.

Validate Private <encrypted validation> <time>

This command is used by a terminal during a secure network communications session to ask the individual to validate a message from an outside source. The message comes encrypted and in two parts: the challenge, and the response.

Upon receipt of a Validate Private command, the BIA displays the text of the challenge message as in "OK <challenge>?" on the LCD screen, but does not send this to the terminal. When the individual validates the challenge, the response is encrypted by the BIA using the Private Session Key, and then returned to the terminal along with the OK response code. If the individual does not validate the challenge, then the BIA returns with a "failed" response code, along with the text "transaction canceled at your request," which is also displayed on the LCD screen.

Note that the terminal is never allowed to see the plaintext of either the challenge or the response.

Reset

The Reset command instructs the BIA to clear all temporary registers, the LCD screen, all temporary Key registers, and to turn off all keypad lights that may be on.

Set PIC <value>

This command assigns the BIA's PIC Register to be <value>.

Note that allowing a non-secured device to provide the PIC is a potential security problem, because non-secured devices are much more vulnerable to wiretapping or replacement.

Set Account index code <value>

This command assigns the BIA's Account index code Register to be <value>.

Note that allowing a non-secured device to provide the account index code is a potential security problem, because non-secured devices are much more vulnerable to wiretapping or replacement.

Set Title Index Code <value>

This command assigns the BIA's Title Index Code Register to be <value>.

Note that allowing a non-secured device to provide the Title Index Code is a potential security problem, because non-secured devices are much more vulnerable to wiretapping or replacement.

Set Amount <value>

This command assigns the BIA's Amount Register to be <value>.

Decrypt Response <encrypted response message>

The Decrypt Response command instructs the BIA to use it's current Response Key to decrypt the encrypted portion of the response message. Once decrypted, the response is returned to the controlling device, presumably for display on the ATM terminal's LED screen.

Note that providing this decryption ability is a security problem, as once the plaintext leaves the BIA, the terminal has the ability to do with it what it will.

1.2.2. BIA Software: Support Libraries

The BIA software is supported by several different software libraries. Some of them are standard, generally available libraries, but some have special requirements in the context of the BIA.

1.2.2.1. Random Number Generator

Since the BIA is constantly selecting random DES keys for use in the message body and message response encryption, it is important that the keys selected be unpredictable keys. If the random number generator is based on time of day, or on some other externally-predictable mechanism, then the encryption keys will be much more easily guessed by an adversary that happens to know the algorithm. In order to assure the security of the encryption techniques used in the BIA, it is assumed that both the random number generator algorithm as well as the encryption algorithms are both publicly known.

A standard random number algorithm for generating DES keys is defined in ANSI X9.17, appendix C (known in the industry).

1.2.2.2. DSP Biometric Encoding Algorithms

The biometric encoding algorithm is a proprietary algorithm for locating the minutiae that are formed by ridge endings and bifurcations on human fingertips. A complete list of minutiae is stored in the DPC as a reference, while only a partial list is required by the algorithm when performing a comparison between an identification candidate and a registered individual.

During both biometric registration as well as identification, the encoding algorithm ensures that enough minutiae are found before ending the biometric input step.

1.2.2.3. Operating System and Device Driven

The BIA is a realtime computing environment, and as such requires a realtime embedded operating system to run it. The operating system is responsible for taking interrupts from devices and scheduling tasks.

Each device driver is responsible for the interface between the operating system and the specific hardware, such as the PIC pad device driver, or the CCD Scanner device driver. Hardware is the source for events such as "PIC pad key pressed", or "CCD Scanner scan complete". The device driver handles such interrupts, interprets the events, and then takes action on the events.

1.2.2.4. DES Encryption Library

There are any number of DES implementations publicly available. DES implementations provide a secret key-based encryption from plaintext to ciphertext, and decryption from ciphertext to plaintext, using 56-bit secret keys.

1.2.2.5. Public Key Encryption Library

Public Key encryption support libraries are available from Public Key Partners, holders of the RSA public key patent (known in the industry). Public Key cryptosystems are asymmetric encryption systems that allow communication to take place without requiring a costly exchange of secret keys. To use a public key encryption system, a public key is used to encrypt a DES key, and then the DES key is used to encrypt a message. The BIA uses public key cryptosystems to provide for the secure exchange of secret keys.

Unfortunately, public key systems are significantly less well tested than secret-key systems, and as such there is an overall lower level of confidence in such algorithms. As a result, the invention uses public key cryptography for communications security and short-lived credential exchange, and not long-term storage of secrets. Both the end-user individual and the bank are identified by the DPC to create the network credential. The network credential includes the end-user individual's identification as well as the context of the connection (i.e., the TCP/IP source and destination ports).

1.2.2.6. DUKPT Key Management Library

The derived unique key per transaction key (DUKPT) management library is used to create future DES keys given an initial key and a message sequence number. Future keys are stored in a Future Key Table. Once used, a given key is cleared from the table. Initial keys are only used to generate the initial future key table. Therefore the initial key is not stored by the BIA.

The use of DUKPT is designed to create a key management mechanism that provided a different DES key for each transaction, without leaving behind the trace of the initial key. The implications of this are that even successful capture and dissection of a given future key table does not reveal messages that were previously sent, a very important goal when the effective lifetime of the information transmitted is decades. DUKPT is fully specified in ANSI X9.24 (known in the industry).

DUKPT was originally developed to support PIC encryption mechanisms for debit card transactions. In this environment, it was critical to protect all transactions. An assumption is made that a criminal records encrypted transactions for a six month period, and then captures and successfully extracts the encryption code from the PIC pad. The criminal could then manufacture one new counterfeit debit card for each message that had been transmitted over that six month period. Under DUKPT, however, the criminal's theft and dissection would not allow him to decrypt previous messages (although new messages would still be decryptable if the criminal were to replace the PIC pad subsequent to dissection).

In the biometric-PIC situation, the criminal has an even harder time, as even if messages are decrypted, turning a digital biometric-PIC into a physical fingerprint is much harder than turning an account number-PIC into a plastic card, which is one of the significant benefits of the tokenless system.

Still, if a criminal can decrypt, he can encrypt, which might allow him to electronically submit a biometric-PIC to the system to authorize a fraudulent transaction. While this is quite difficult, it is still best to restrict the options available to the criminal as much as possible, hence the use of DUKPT.

1.3. BIA Software Command Sets 1.3.1. BIA Software: Retail Command Set

The BIA/Retail software interface exports an interface that allows specific retail point of sale terminals to interact with the system.

The BIA/Retail interface is designed to allow the terminal to perform the following operation:

Transaction Authorization

In order to implement those operations, the BIA/Retail provides the following command set:

Set Language <language-name>
Get Biometric <time>
Get PIC <time>
Assign Register <register> <value>
Get Account index code <time>
Validate Amount <mount> <time>
Enter Amount <time>
Form Message <type>
Show Response <encrypted response> <time>
Reset 1.3.2. BIA Software: CATV (Integrated Remote) Command Set The BIA/CATV software interface exports a command set that allows terminals integrated with a Phone/CATV BIAs to interact with the system. The following operation is supported:

Remote Transaction Authorization

In order to implement that operation, the BIA/CATV provides the following command set:

Get Biometric <time>
Set PIC <text>
Assign Register <register> <text>
Set Account index code <text>

Form Message <type>
Decrypt Response <encrypted response message>
Reset 1.3.3. BIA Software: Integrated FAX Command Set The BIA/Fax software interface exports a command set that allows terminals integrated with a fax BIA to interact with the system. The following operations are supported:
Secure Fax Submit
Secure Fax Data
Secure Fax Tracking
Secure Fax Retrieve
Secure Fax Reject
Secure Fax Archive
Secure Fax Contract Accept
Secure Fax Contract Reject
Electronic Document Archive Retrieve In order to implement these operations, the BIA/Fax provides the following command set:
Get Biometric <time>
Set PIC <text>
Set Title Index Code <text>
Assign Register <register> <value>
Get Message Key
Form Message <type>
Decrypt Response <encrypted response message>
Reset 1.3.4. BIA Software: Registration Command Set The BIA/Reg software interface exports an interface that allows general purpose computers to interact with the system to identify and register individuals. The following operations are supported:
Individual Identification
Biometric Registration In order to support those operations, the BIA/Reg provides the following command set:
Set Language <language-name>
Get Biometric <time> [primary|secondary]
Get PIC <time>
Assign Register <register> <text>
Get Message Key
Form Message <type>
Show Response <encrypted response> <time>
Reset 1.3.5. BIA Software: PC Command Set The BIA/PC software interface exports a command set that allows general purpose computers to send, receive, and sign electronic documents, conduct transactions across the network, and provide biometric-derived credentials to sites on the network. The following operations are supported:
Electronic Document Submit
Electronic Document Data
Electronic Document Tracking
Electronic Document Retrieve
Electronic Document Reject
Electronic Document Archive
Electronic Document Archive Retrieve
Electronic Signature Submission
Electronic Signature Check
Remote Transaction Authorization
Network Credential
Secured Connection In order to support those operations, the BIA/PC provides the following command set:
Set Language <language-name>
Get Biometric <time>
Get PIC <time>
Get Account index code <time>
Validate Amount <mount> <time>
Enter Amount <time>
Validate Document <name> <time>
Assign Register <register> <text>
Get Message Key
Form Message <type>
Show Response <encrypted response> <time>
Validate Private <encrypted validation> <time>
Reset 1.3.6. BIA Software: Issuer Command Set The BIA/Iss software interface exports an interface that allows general purpose computers to interact with the system to authenticate and submit batch change requests. The following operation is supported:
Issuer Batch In order to implement this operation, the BIA/Iss provides the following command set:
Set Language <language-name>
Get Biometric <time> [primary|secondary]
Get PIC <time>
Assign Register <register> <value>
Get Message Key
Form Message <type>
Show Response <encrypted response> <time>
Reset 1.3.7. BIA Software: Internal Command Set The BIA/Int exports a command set that allows general purpose computers to interact with the system to identify individuals. The following operation is supported:
Individual Identification In order to implement this operation, the BIA/Int provides the following command set:
Set Language <language-name>
Get Biometric <time>
Get PIC <time>
Assign Register <register> <value>
Get Message Key
Form Message <type>
Show Response <encrypted response> <time>
Reset 1.3.8. BIA Software: ATM Command Set The BIA/ATM software interface exports a command set that allows ATMs to identify individuals. The following operation is supported:
Account Access In order to implement this operation, the BIA/ATM provides the following command set:
Get Biometric <time>
Set PIC <text>
Set Account index code <text>
Assign Register <register> <value>
Form Message <type>
Decrypt Response <encrypted response message>
Reset 1.4. Terminals 1.4.1. Introduction The terminal is the device that controls the BIA and connects to the DPC via modem, X.25 connection, or Internet connection—methods well-known to the industry. Terminals come in different shapes and sizes, and require different versions of the BIA to perform their tasks. Any electronic device, which issues commands to and receives results from the biometric input device, can be a terminal.

Some terminals are application programs that run on a general purpose microcomputer, while other terminals are combinations of special purpose hardware and software.

While the terminal is critical for the functioning of the system as a whole, the system itself places no trust in the terminal whatsoever. Whenever a terminal provides information to the system, the system always validates it in some manner, either through presentation to the individual for confirmation, or by cross-checking through other previously registered information.

While terminals are able to read some pans of BIA messages in order to validate that the data was processed properly by the BIA, terminals cannot read biometric identification information including the biometric, the PIC, encryption keys, or account index codes.

Specific BIAs export some security functionality to the terminal, such as PIC entry, and private code display. As a result, such devices are regarded as somewhat less secure than their entirely self-contained counterparts, and as such have consequently lower security ratings.

There are many different terminal types; each is connected to a specific model BIA. Each terminal is described in brief below:

ATM (Automated Teller Machinery)

Integrated BIA/ATM with ATM software load provides biometric-PIC access to ATM cash dispensers.

BRT (Biometric Registration Terminal)

Standard BIA with Registration software load attached to a microcomputer provides banks with the ability to register new individuals with the system along with their financial asset accounts and other personal information.

CET (Certified Email Terminal)

Standard BIA with PC software load attached to a microcomputer provides individuals with the ability send, receive, archive, reject, and track certified email messages.

CPT (Cable-TV Point of Sale Terminal)

BIA/catv with CATV software load attached to the CATV broadband provides individuals with biometric-television (or "TV") remotes with the ability to authorize television shopping purchases.

CST (Customer Service Terminal)

Standard BIA with Internal software load attached to a microcomputer system authorizes employees to construct database requests for the purposes of customer service.

EST (Electronic Signature Terminal)

Standard BIA with personal computer software load attached to a microcomputer provides individuals with the ability to construct and verify electronic signatures on documents.

IPT (Internet Point of Sale Terminal)

Standard BIA with personal computer software load attached to a microcomputer provides individuals with internet connections the ability to purchase products from a merchant that is connected to the Internet.

IT (Issuer Terminal)

Standard BIA with Issuer software load attached to a microcomputer provides banks with the ability to send batched changes of asset accounts to the DPC.

ITT (Internet Teller Terminal)

Standard BIA with personal computer software load attached to a microcomputer with an internet connection provides individuals with the ability to perform transactions with their favorite Internet Bank.

PPT (Phone Point of Sale Terminal)

BIA/catv with CATV software load integrated with a telephone provides individuals with the ability to authorize transactions over the telephone.

RPT (Retail Point of Sale Terminal)

Standard BIA with Retail software load attached to an X.25 network or using a modem allows an individual to purchase items using transaction authorizations in a store.

SFT (Secure Fax Terminal)

BIA/catv with Fax software load integrated with a fax machine provides individuals with the ability to send, receive, reject archive, and track secured fax messages.

1.4.2. Terminal: Retail Point of Sale Terminal 1.4.2.1. Purpose

The purpose of the RPT is to allow individuals to purchase items at a store without having to use either cash, check, or a debit or credit card.

The RPT uses a BIA/Retail to authorize financial transactions from an individual to a merchant. In addition to being used to accept biometric-PIC authorizations, the RPT provides standard debit and credit card scanning functions as well.

Note that only the biometric-related transactions are described in detail here. It is assumed that the RPT will also consist of standard credit and debit magnetic stripe card readers, as well as optional smart card readers too.

1.4.2.2. Construction

Each RPT is connected to the DPC by a modem, an X.25 network connection, an ISDN connection, or similar mechanism. The RPT may also be connected to other devices, such as an electronic cash register, from which it obtains the mount of the transaction and the merchant code.

The RPT consists of:

an BIA/Retail an inexpensive microprocessor 9.6 kb modem/X.25 network interface hardware merchant identification code number in non-volatile RAM a DTC serial port for connecting to the BIA magnetic stripe card reader (known in the industry)

ECR (electronic cash register) connection port optional smart card reader (known in the industry)

1.4.2.3. Identification

Two entities need to be identified for the DPC to respond positively to an BIA transaction authorization request: the individual, and the merchant.

The individual is identified by the biometric-PIC, and the merchant is identified by the DPC, which cross-checks the merchant code contained in the BIA's VAD record with the merchant code added to the transaction request by the RPT.

1.4.2.4. Operation

First, the merchant enters the value of the transaction into his electronic cash register. Then, the individual enters his biometric-PIC, his account index code, and then validates the mount. The RPT then adds the product information and the merchant code to the BIA, instructs the BIA to construct the transaction, and then sends the transaction to the DPC through its network connection (modem, X.25, etc).

When the DPC receives this message, it validates the biometric-PIC, obtains the account number using the index code, and cross-checks the merchant code in the message with the registered owner of the BIA. If everything checks out, the DPC forms and sends a credit/debit transaction to execute the exchange. The response from the credit/debit network is added to the private code to form the transaction response message, which the DPC then sends back to the RPT. The RPT examines the response to see whether or not the authorization succeeded, and then forwards the response to the BIA, which then displays the individual's private code, concluding the transaction.

1.4.2.5. Security

Messages between the RPT and the DPC are secured by encryption and MAC calculation from the BIA. The MAC allows the RPT to review the unencrypted parts of the message, but the RPT cannot change them. Encryption prevents the encrypted pan of the message from being disclosed to the RPT.

Each retail BIA must be registered to a merchant. This helps to discourage BIA theft. Furthermore, because the RPT adds the merchant code onto each message, replacing a merchant's BIA with a different BIA is detected by the cross-check performed at the DPC.

1.4.3. Terminal: Internet Point of Sale Terminal
1.4.3.1. Purpose

The purpose of an Internet Point of sale Terminal (IPT) is to authorize credit and debit financial transactions from an individual at a computer to a merchant, both of whom are on the Internet.

Note that the Internet simply represents a general purpose network where a merchant, the DPC, and the IPT can all connect to each other in real time. As a result, this mechanism would work exactly the same on any other general purpose network.

1.4.3.2. Construction

The IPT consists of:

an BIA/PC a microcomputer an Internet Shopper software application an Internet (or other network) connection

1.4.3.3. Identification

In addition to identifying the individual, the IPT must also identify the remote merchant who is the counterparty to the transaction. The merchant must also identify both the DPC and the IPT.

The Internet Shopper program stores the hostname (or other form of net name) of the merchant from which the purchase is taking place in order to verify the merchant's identity. Since the merchant registers all of his legitimate internet hosts with the DPC, this allows the DPC to cross-check the merchant code with the merchant code stored under that hostname to verify the merchant's identity.

1.4.3.4. Operation

First, the IPT connects to the merchant using the Internet. Once a connection is established, the IPT secures it by generating and then sending a Session Key to the merchant. In order to assure that the session key is protected from disclosure, it is encrypted with the merchant's Public Key using Public Key Encryption. When the merchant receives this encrypted Session Key, he decrypts it using his Private Key. This process is called securing a connection through a Public Key Encrypted secret key exchange.

Once connected, the IPT downloads the merchant code, and both price and product information from the merchant. Once the individual is ready to make a purchase, he selects the merchandise he wishes to buy. Then, the individual enters the biometric-PIC using the BIA/PC, the IPT sends the merchant code, the product identification information, and the amount to the BIA, and instructs it to construct a Remote Transaction Authorization request. Then the IPT sends the request to the merchant via the secure channel.

The merchant is connected to the DPC via the same sort of secure connection that the IPT has with the merchant, namely, using Public Key Encryption to send a secure session key. Unlike the IPT-merchant connection, however, merchant-DPC session keys are good for an entire day, not for just one connection.

The merchant connects to the DPC, securing the connection using the session key, forwarding the transaction to the DPC for validation. The DPC validates the biometric-PIC, cross-checks the merchant code contained in the request with the merchant code stored under the hostname that was sent in the request, and then sends a transaction to the credit/debit network. Once the credit/debit network responds, the DPC constructs a reply message including the credit/debit authorization, an encrypted private code, and the address of the individual, and sends that message back to the merchant.

Once the merchant receives the reply, it copies the individual's mailing address out of the reply, makes note of the authorization code, and forwards the reply message to the IPT.

The IPT hands the reply to the BIA, which decrypts the private code and displays it on the LCD screen, indicating that the DPC recognized the individual. The IPT also shows the result of the transaction as well, be it success or failure.

1.4.3.5. Security

Since the system in general assumes that an adversary inhabiting the network can hijack network connections at any point, an parties must have secure communications during their realtime interactions. The main concern isn't disclosure of information, but rather insertion or redirection of messages.

The whole system of Public Key Encryption relies on having a trusted source for the Public Keys. These trusted sources are called Certifying Authorities, and we assume that such a source will be available on the Internet in the near future.

1.4.4. Terminal: Internet Teller Terminal
1.4.4.1. Purpose

The Internet Teller Terminal (ITT) is used to identify individuals for internet banking sessions. The DPC, the bank's computer system, and the individual are all connected to the Internet.

There are two main tasks. The first is providing a secure communications channel from the ITT to an internet bank. The second is providing unimpeachable identity credentials to the internet bank. Once both are accomplished, the ITT can provide a secure internet banking session. In addition, the BIA's challenge-response verification capability is used to provide additional security for all high-value and/or irregular transactions.

1.4.4.2. Construction

The ITT consists of:

an BIA (standard PC model)

a microcomputer an Internet Teller software application an Internet connection

The ITT accepts biometric identification using an BIA/PC connected to the microcomputer serving as the individual's Internet terminal.

1.4.4.3. Identification

Both the individual and the bank are identified by the DPC to create the network credential. The network credential includes the individual's identification as well as the context of the connection (i.e., the TCP/IP source and destination ports).

The DPC identifies the bank by cross-checking the code that the bank sends to the ITT with the bank's hostname that the ITT sends to the DPC.

1.4.4.4. Operation

First, the ITT connects to the internet bank, making sure that the bank has the computing resources required to handle a new session for the individual. If the bank has sufficient resources, it sends back the bank identification code to the ITT.

Once connected, the ITT instructs the BIA to obtain the biometric-PIC and the account index code from the individual. Then the ITT adds both the bank's hostname as well as the bank code. Using all this information, the BIA is then asked to form a network credential request message which the ITT sends to the DPC via the Internet.

When the DPC receives this message, it validates the biometric-PIC, obtains the account number using the index code, and makes sure that the bank code from the message matches the bank code stored under the bank's hostname in the Remote Merchant database. The DPC also checks to make sure that the account number returned by the index code belongs to the bank as well. If all checks out, then the DPC creates a network credential using the individual's account identification, the time of day, and the bank code. The DPC signs this credential using Public Key Encryption and the DPC's Private Key. The DPC retrieves the bank's public key, and the individual's private code, and with the credential forms the network credential response message. The response message is encrypted using the BIA response key, and is then sent back to the ITT.

When the ITT receives the response, it hands the response message to the BIA. The BIA decrypts and then displays the individual's private code on the LCD screen. The bank's public key is stored in the Public Key register. Two random session keys are generated by the BIA. The first key, called the Shared Session Key, is revealed in plaintext to the ITT. The ITT uses this shared session key to secure the connection with the bank.

The other session key, called the Private Session Key, is not shared with the ITT. It is used for the BIA's challenge-response mechanism, a mechanism that allows the bank to obtain specific validation for non-routine transactions straight from the individual, without involving the (untrustworthy) ITT.

After receiving the Shared Session Key, the ITT asks the BIA to form a Secure Connection Request message, which includes both session keys and the network credential, and are all encrypted with the bank's public key. The ITT then sends the Secure Connection Request message to the bank.

When the bank receives the request message, it decrypts the message using its own Private Key. Then, it decrypts the actual network credential using the DPC's public key. If the network credential is valid and has not expired (a credential times out after a certain number of minutes), the individual is authorized, and the conversation continues, with the session key used to ensure security.

Whenever the individual performs any non-routine or high-value transactions, the bank may wish to ask the individual to validate those transactions for extra security. To do so, the bank sends a challenge-response message encrypted with the Private Session Key to the ITT, which forwards that challenge-response message to the BIA. The BIA decrypts the message, displays the challenge (usually of the form "Transfer of $2031.23 to Rick Adams OK?"), and when the individual validates by hitting the OK button, the BIA re-encrypts the response with the Private Session Key and sends that message to the ITT, which forwards it to the bank, validating the transaction.

1.4.4.5. Security

The system makes use of public key cryptography to both provide credentials and to secure communications between the ITT and the bank.

For this mechanism to function properly, the bank must know the DPC's public key, and the DPC must know the bank's public key. It is critical to the security of the system that both parties keep the respective public keys secure from unauthorized modification. Note that public keys are readable by anyone, they just cannot be modifiable by anyone. Of course, any session or secret keys must be kept secure from observation, and those secret keys must be destroyed after the session has ended.

The extra validation step for non-routine transactions is necessary because of the relative difficulty involved in securing personal computer applications on the Internet due to viruses, hackers, and individual ignorance. Banks should probably restrict routine money transfers available to ITT's to include only money transfers to well-known institutions, such as utility companies, major credit card vendors, and so on.

1.4.5. Terminal: Electronic Signature 1.4.5.1. Purpose

The electronic signature terminal (EST) is used by individuals to generate electronic signatures that cannot be forged for electronic documents. The EST either allows individuals to sign electronic documents, or verifies electronic signatures already on such documents.

1.4.5.2. Construction

The EST consists of:

an BIA/PC a microcomputer a message digest encoder algorithm a modem, an X.25 connection, or an Internet connection an electronic signature software application The EST uses an BIA/PC attached to a microcomputer, with events controlled by an electronic signature software application.

1.4.5.3. Identification

To create a digital signature without using some sort of public/private keyed token, three things need to be done. First, the document to be signed needs to be uniquely identified, the time of day needs to be recorded, and the individual performing the signature needs to be identified. This links the document, the individual, and the time, creating a unique time stamped electronic signature.

1.4.5.4. Operation

First the document to be signed is processed by a message digest encoding algorithm that generates a message digest code. One such algorithm is the MD5 algorithm by RSA, which is well known in the industry. By their nature, message digest algorithms are specifically designed so that it is almost impossible to come up with another document that generates the same message digest code.

Then, the individual enters his biometric-PIC using the BIA, the message digest code is handed to the BIA, the name of the document is added, and the resulting Digital Signature request message is sent to the DPC for authorization and storage.

When the DPC receives the request, it performs a biometric identity check, and once the individual is verified, it collects the message digest encoding, the individual's biometric account number, the current time of day, the name of the document, and the identification of the BIA that gathered the signature, and stores them all in the Electronic Signatures Database (ESD). The DPC then constructs a signature code text string that consists of the ESD record number, the date, the time, and the name of the signer, and sends this signature code along with the individual's private code back to the EST.

To check an electronic signature, the document is sent through the MD5 algorithm (known in the industry), and the resulting value together with the electronic signature codes are given to the BIA along with the requesting individual's biometric-PIC, and the message is sent to the DPC. The DPC checks each signature for validity, and responds as appropriate.

1.4.5.5. Security

The BIA doesn't encrypt any of the data relating to electronic signatures, so document titles along with specific MD5 values are sent in plaintext. The same situation holds true for signature validations.

Thus while signatures cannot be forged, some of the details (including document names) are vulnerable to interception.

1.4.6. Terminal: Certified Email Terminal 1.4.6.1. Purpose

The purpose of the Certified Email Terminal (CET) is to provide individuals a way of delivering electronic messages to other individuals in the system while providing for identification of sender, verification of both receipt and recipient, and assuring confidentiality of message delivery.

The CET uses a BIA/PC to identify both the sender and the recipient. Security is established by encrypting the message, and then by encrypting the message key using the sender's BIA during the upload, and then decrypting the message key using the recipient's BIA during the download.

1.4.6.2. Construction

Both the transmitter and the recipient CET consists of:
a BIA
a microcomputer
a modem, an X.25 connection, or an Internet connection
the ability to receive email
a certified electronic mail application A CET is actually a microcomputer with an electronic mail application and a network connection which invokes the BIA to generate biometric-PIC authorizations to send and receive certified electronic mail.

1.4.6.3. Identification

In order to guarantee delivery of the message, both sender and recipients must be identified.

The sender identifies himself using his biometric-PIC when he uploads the message to the DPC. Each recipient the sender wishes to send the document to is identified either by biometric account identification number, or by fax number, and extension. In order for a recipient to download the message, he identifies himself using his biometric-PIC. This procedure resembles a person-to-person telephone call.

Message delivery starts with an individual uploading a document or message, and identifying himself using his biometric-PIC. The individual then verifies the name of the document, and the email message is encrypted and uploaded.

Once a message is uploaded, the sender receives a message identification code that can be used to request the current delivery status of the document to each of the recipients.

The DPC sends an electronic mail message to each recipient, notifying them when a certified message has arrived.

Once the recipient receives the notification, the recipient may at his leisure either choose to accept or refuse that message or a group of messages by submitting his biometric-PIC and having it validated by the DPC.

Once successfully transmitted to all recipients, a document is removed after a predetermined period, generally 24 hours. Individuals wishing to archive the document, along with an indication of all of the individuals to whom the message was sent may submit message archival requests prior to the deletion of the message.

1.4.6.5. Security

In order to effect the secure aspect of the transmission, the document is protected from disclosure en route. The CET accomplishes this using the 56-bit Message Key generated by the BIA. Since the BIA takes responsibility for encrypting the Message Key as part of the biometric-PIC, the encryption key is securely sent to the DPC.

When an individual downloads the message, the message key is sent encrypted along with the private code, to allow the recipient to decrypt the message. Note that it is fine to have all recipients have this message key, as they all receive the same message.

As with the ITT, individuals must take care to secure their CET application software from surreptitious modification, as a modified CET can send any document it wishes to once the individual validates the document name.

1.4.7. Terminal: Secure Fax Terminal 1.4.7.1. Purpose

The purpose of the secure fax terminal (SFT) is to provide individuals a way of delivering fax messages to other individuals in the system while providing for identification of sender, verification of both receipt and recipient, and assuring confidentiality of message delivery.

Each SFT uses an integrated BIA/catv to identify both the sender and the recipient. Communications security is accomplished through encryption, 1.4.7.2. Construction Both the transmitter and the recipient SFT consists of:
an BIA/catv
a fax machine
optional ISDN modem A SFT is a fax machine connected to the DPC via a modem. The system treats faxes as just another type of certified electronic mail.

1.4.7.3. Identification

There are several different levels of security for secure faxes, but in the most secure version, the identity of the sender and all recipients is verified.

The sender identifies himself using his biometric-PIC and title index code when he sends his message to the DPC. To pick up the fax, each recipient listed identifies himself, again using biometric-PIC and title index code.

In addition, the receiving site is identified by phone number. This phone number is registered with the DPC. For secured-confidential faxes, each recipient is identified with the phone number and the extension.

1.4.7.4. Operation

There are five basic types of faxes that an SFT can send.

I. Unsecured Faxes

Unsecured faxes are equivalent to a standard fax. The sender enters the phone number of the recipient site, and sends the fax. In this case, the sender remains unidentified, and the fax is sent to a given phone number in the hopes that it will be delivered to the proper recipient. An SFT marks the top line on all such unsecured faxes prominently as being "UNSECURED". All faxes received from non-SFT fax machines are always marked as being unsecured.

II. Sender-Secured Faxes

In a sender-secured fax, the sender selects the "sender-secured" mode on the fax machine, enters their biometric-PIC followed by their title index code. The fax machine then connects to the DPC, and sends the biometric-PIC information. Once the DPC verifies the individual's identity, the individual then sends the fax by feeding the document into the fax scanner. In this case, the fax is actually sent to the DPC, which stores the fax digitally. Once the entire fax arrives at the DPC, the DPC commences sending the fax to each destination, labeling each page with the name, title, and company of the sender, along with the banner of "SENDER-SECURED" at the top of each page.

III. Secured Fax

In a secured fax, the sender selects the "secured" mode on the fax machine, enters their biometric-PIC followed by their title index code, and then enters the phone numbers of the recipients. Once the system verifies the sender's identity and each of the recipients phone numbers, the individual then sends the fax by feeding the document into the fax scanner. The fax is then sent to the DPC, which stores the fax digitally. Once the entire fax arrives at the DPC, the DPC sends a small cover page to the destination indicating the pending secured fax, the sender's title and identity, as well as the number of pages waiting, along with a tracking code. This tracking code is automatically entered into the memory of the recipient's fax machine.

To retrieve the fax, any employee of the recipient company can select the "retrieve fax" button on his fax machine, select which pending fax to retrieve by using the tracking code, and then enter biometric-PIC. If the fax is unwanted, the individual may press the "reject fax" button, though he must still identify himself to the system in order to do this. Once validated as a member of the company, the fax is then downloaded to the recipient's fax machine. Each page has "SECURED" on the top of each page, along with the sender's identity and title information.

IV. Secured Confidential Fax

In a secured-confidential fax, the sender selects the "secured-confidential" mode on the fax machine, enters his biometric-PIC followed by his title and index code, and then enters the phone number and system extension of each recipient. Once the DPC verifies the sender's identity and each of the recipients phone numbers and extensions, the individual then sends the fax by feeding the document into the fax scanner. The fax is sent to the DPC, which stores the fax digitally. Once the entire fax arrives at the DPC, the DPC sends a small cover page to each destination indicating the pending secured-confidential fax, the sender's title and identity, the recipient's title and identity, as well as the number of pages waiting, along with a tracking code. This tracking code is automatically entered into the memory of the recipient's fax. However, the only individual that can retrieve the fax is the individual whose extension code is indicated.

This individual selects the "retrieve fax" button, selects the pending fax to retrieve, and then enters his biometric-PIC. Once validated as the recipient, the fax is then downloaded to the recipient's fax machine. Each page has "SECURED-CONFIDENTIAL" on the top of each page, along with the sender's title and identity information.

V. Secured Confidential Contract Fax

This fax is processed identically to the secured-confidential fax in terms of the actual delivery of the fax to the recipients, except that the fax is titled "contract" instead of secured-confidential. In addition, the DPC automatically archives contract faxes. Any recipient may accept or reject the contract through the SFT subsequent to receiving the contract fax. Hence with the option, the DPC performs the role of an electronic notary.

Any fax that is sent to the system and then forwarded to the recipient may be sent to any number of recipients without tying up the sending fax machine. Additionally, the tracking number of any fax sent is entered into the memory of the fax machine; a status report on any ongoing fax can be generated at the sending machine by selecting the "status" button and then selecting the particular fax pending tracking code. The DPC issues a report that is immediately sent to the sending fax machine detailing the state of the sending for each recipient.

With any secured or secured-confidential fax, an option exists for either the sender or one of the recipients to archive the fax (along with the specifics as to who sent and received the fax) for future reference. To this end, any secured fax is retained for some time period (i.e., 24 hours) following successful delivery. An archival tracking code is returned to the individual whenever an archive is requested. This archival code is used to retrieve faxes and fax status reports archived with the system.

Archived faxes are placed on read-only secondary storage after some time period (i.e., 24 hours). Retrieving an archived fax requires human intervention, and may take up to 24 hours to perform.

1.4.7.5. Security

The SFT system works hard to assure the recipient of the sender's identity, and it works just as hard to assure the sender that the recipient actually acknowledged receipt of the document.

In order to protect against interception of the communications between the sender and recipient, the fax terminal encrypts the fax using the Message Key facility provided by the BIA Since the BIA takes responsibility for encrypting the Message Key as part of the biometric-PIC, the encryption key is securely sent to the DPC.

When an individual receives a secured fax of any type, the message key is sent encrypted along with the private code, to allow the recipient to decrypt the message. Note that it is fine to have all recipients have this message key, as they all receive the same message.

1.4.7.6. Notes

Sending secured faxes is very similar to sending electronic mail, and reuses much of the same software.

It is possible to construct fax terminals that do not have integral BIA/fax devices but that have a port suitable for attaching an external BIA/pc and software appropriate for using the BIA.

1.4.8. Terminal: Biometric Registration Terminal 1.4.8.1. Purpose

The purpose of the Biometric Registration Terminal (BRT) is to register new individuals including their biometric-PIC, mailing address, private code, electronic mail addresses, a list of titles and title index codes used to send and receive electronic messages and faxes, and a list of financial asset accounts and account index codes that they can access, all using their biometric-PIC.

The objective of the enrollment process is to obtain personal information from an individual at the location of a responsible institution where that information can be validated. This includes, but is not limited to retail banking outlets, and corporate personnel departments. Each participating responsible institution has one BRT that is used by a group of employees who have been authorized to perform registrations. Each employee is accountable for each individual registered.

1.4.8.2. Construction an microcomputer and screen, keyboard, mouse an BIA/Keg 9.6 kb modem/X.25 network connection (known in the industry)

a biometric registration software application

The BRT uses an attached BIA/Reg for biometric entry, and is connected to the system by a 9.6 kb modem or an X.25 network connection (known in the industry). Biometric registration terminals are located in places that are physically secure such as retail banking outlets.

1.4.8.3. Identification

Three entities need to be identified for the DPC to respond positively to an BIA/Reg registration request: the registering employee, the institution, and the BIA/Reg. The employee must have been authorized to register individuals for that institution.

The institution and the BIA are identified by cross-checking the owner of the BIA with the institution code set by the BRT. The employee identifies himself to the system by entering his biometric-PIC upon starting the registration application.

The institution uses its standard customer identification procedure (signature cards, employee records, personal information, etc) before registering the individual on the system. It is important for the institution to verify individual identity as assiduously as possible, since the registering individual will be empowered to transfer money from those accounts at will, and/or send electronic messages using the name of the company.

1.4.8.4. Operation

During registration, the individual enters both a primary and secondary biometric. The individual must use both index fingers; if the individual is missing index fingers, the next inner-most finger may be used. Requiring specific fingers to be used allows the prior fraud check to work.

The individual is encouraged to select a primary and a secondary finger; the primary finger is given preference during the DPC identity check, so the individual should present the most-often used finger as the primary. Of course, the DPC could choose to alter the designation of primary and secondary biometrics based on operations if it turns out to be important to do so.

As a part of the biometric encoding process, the BIA/R determines if the individual has entered "a good print." Note that there are some individuals whose jobs result in the accidental removal of their fingerprints, such as individuals who work with abrasives or acids. Unfortunately, these individuals cannot use the system. They are detected at this stage in the process and informed that they cannot participate.

The individual selects a PIC of from four to twelve digits from a series of PIC options provided by the system's central database. However, the PIG must be validated by the system. This involves two checks: one, that the number of other individuals using the same PIG aren't too great (since the PIC is used to reduce the number of individuals checked by the biometric comparison algorithm), and that the individual being registered isn't too "close", biometrically speaking, with other individuals within the same PIC group. If either happens, the enrollment is rejected, an error message is returned to the BRT, and the individual is instructed to request a different PIG. The system may optionally return with an "identical match" error condition, which indicates that the individual already has a record in the system under that PIC.

A PIC of 0 allows the system to assign a PIC to the individual.

The individual constructs a confidential private code consisting of a word or phrase. If the individual does not wish to construct one, a private code will be constructed randomly by the terminal.

The individual may also arrange their financial asset code list. This list describes which account index code points at which account (i.e. 1 for debit, 2 for credit, 3 for emergency debit, etc). Note that this can only occur if the registering institution is a bank, and only if the accounts are owned by that particular banking institution.

Even after registration, an individual is not actually able to perform operations using the system until a prior fraud check is completed. This generally takes a few minutes, but during times of high load, it takes up to several hours. Only if the system finds no instance of prior fraud is the individual's account activated.

1.4.8.5. Security

If an individual is found to have defrauded the system even once, the DPC institutes a database-wide involuntary biometric database search for the criminal. Several of these are performed each night, so individuals who are particularly wanted by the system are winnowed out of the database by using a time consuming process during conditions of light activity.

The employees performing the registration operation identify themselves using biometric-PIC only when initially activating the registration system. This is a convenience for the employee, but a possible security problem for the system, as unattended or "temporarily borrowed" BRTs could be the source for fraud. As a result, the registration application exits after a predetermined period of no activity.

1.4.9. Terminal: Customer Service 1.4.9.1. Purpose

The purpose of the customer service terminal (CST) is to provide internal DPC support personnel access to the various aspects of the system databases. Support people need to answer inquiries by individuals, issuers, institutions, and merchants that are having trouble with the system.

1.4.9.2. Construction

The CST consists of:
a microcomputer
an BIA/Int
ethernet/token ring/FDDI network interface
a database examination and modification application Each CST is connected to the system via a high speed local area network connection such as token ring, ethernet, fiber (FDDI), etc. Each CST has the capability to query each of the databases, and display the results of these queries. However, the CST only displays fields and records based on the privilege of the individual terminal user. For instance, a standard customer service employee won't be able to see the encryption code for a given BIA's VDB record, though they can see which merchant or individual currently owns that BIA.

1.4.9.3. Identification

For the CST to allow access to the database, the individual and the BIA must be identified by the system. In addition, the individual's privilege level must also be determined, so that the database can restrict access appropriately.

1.4.9.4. Operation

An individual using a CST starts a session by providing identification by entering their biometric-PIC. The BIA constructs an Identification Request message, and send it to the DPC for verification. Once the system verifies the individual, the CST application can operate normally, though limited by the individual's previously assigned DPC privilege level.

1.4.9.5. Security

For security purposes, the DPC will terminate a connection to the CST application after a predetermined idle time period.

It is important that the database application cannot be modified in any manner; either deliberately, or through an unintentional introduction of a virus. To that end, individual CSTs do not have any floppy drives or other removable media. Furthermore, read access to the database application executable is strictly limited to those with a need to know.

In order to protect the communications between the CST and the database from surreptitious modification or disclosure, the CST encrypts all traffic between the CST and the database. To do this, the CST generates a session key that is sent to the server during the login session with the system. This session key is used to encrypt and decrypt all communications with the DPC that occur during the period.

Even assuming secure communications and no modified database applications, the DPC makes certain that DPC data fields that are not accessible to the individual operating the CST are not sent to the CST's database application. Likewise, at no time do any CST personnel have access to or permission to modify individual biometric information.

The DPC and the support center can be co-located, or because of the fairly tight security surrounding the CST itself, the support center can be split off on its own.

1.4.10. Terminal: Issuer Terminal 1.4.10.1. Purpose

The purpose of the issuer terminal is to allow employees at issuing banks to submit batch asset account modification operations to the DPC in a secure and identifiable manner.

1.4.10.2. Construction

The IT consists of:
a microcomputer
a modem, X.25 network, or Internet connection to the system
an BIA/Iss
a network connection to the bank's internal network The Issuer Terminal uses an issuer BIA to authorize mass additions and deletions of financial asset information.

1.4.10.3. Identification

In this operation, the bank must be identified, a properly-authorized bank employee must be identified, and all of the individuals whose asset accounts are being added or removed must also be identified.

The bank is responsible for identifying the individuals who wish to add their accounts at that bank to their asset account fist. As in biometric registration, this is done by the bank using signature cards and personal information. The DPC identifies the bank by cross-checking the issuer code submitted by the IT with the issuer code registered in the VAD record of the BIA/Iss. A biometric-PIC is used to identify the bank employee actually submitting the batch.

1.4.10.4. Operation

In order to add a financial asset account, an individual gives his biometric identification number to the bank (the identification number is given to the individual during the initial biometric registration step) along with the accounts that are to be added. After the individual is properly identified, this identification code and account list are forwarded to the IT for subsequent batch submission to the system.

Whenever deemed appropriate by the bank, an authorized individual at the bank instructs the IT to upload the batched account additions/deletions to the DPC. To do this, the authorized individual enters his biometric-PIC, the IT adds a session key, adds the bank's issuer code, and from that the BIA/Iss constructs an Issuer Batch Request message that the IT then forwards to the DPC. The IT encrypts the batch using the message code, and then sends that as well.

When the system receives the Issuer Batch Request, it validates that the BIA is an BIA/Iss, that the BIA/Iss is registered to the bank claimed by the issuer code, and that the individual identified in the biometric-PIC is allowed to submit batch requests to the DPC for that bank. If so, the DPC processes all the requests, keeping track of errors as required. Once done, the DPC returns the individual's private code, along with an encrypted batch containing any errors that occurred during processing.

1.4.10.5. Security

Securing this transaction is critical for the security of the system. A criminal intent on fraud need only find a way to add other people's accounts to his biometric identification code and can then commit fraud at will. Eventually the criminal is caught, and purified from the database, but only alter other people's accounts are drained by the criminal.

Encryption guarantees that the transmission between bank and DPC cannot be intercepted, and thus account numbers are protected in transit.

Cross-checking the bank with the BIA/Iss means that both the IT and the BIA must be compromised to submit false add/delete messages to the DPC. Thus, the bank must ensure that the IT is physically secure, and that only authorized individuals are allowed to access it.

Requiring an individual to submit the batch provides for a responsible human to be "in the loop" whose job it is to make sure that proper bank security measures have been followed in the construction and submission of the batch.

1.4.11. Terminal: Automated Teller Machinery 1.4.11.1. Purpose

The purpose of the biometric ATM is to provide individuals access to cash and other ATM functions without having to use an Interbank card. It does this by submitting a biometric-PIC and an account index code and retrieving a bank account number. For users of the system, this replaces the Interbank card (known in the industry)+PIC mechanism as a method for identifying the account and authorizing the individual. It is assumed that all ATMs still continue to accept Interbank cards.

1.4.11.2. Construction a standard ATM
an integrated BIA/ATM (scanner only)
a connection to the DPC The biometric ATM uses an integrated BIA/ATM to identify individuals and allow them access to financial assets using a biometric-PIC and an account index. An BIA/ATM is installed into the ATM, making use of the ATM's current PIC pad for PIC and account index code entry. The ATM is connected to the system using X.25 or modem.

The BIA/ATM is structured in such a way as to make integration with an existing ATM network as simple as possible. This results in a compromise between security and ease of integration.

1.4.11.3. Identification

Three entities need to be identified for the DPC to respond properly to an BIA/ATM account request: the individual, the bank, and the BIA/ATM.

The bank is identified by cross-checking the ATM's stored bank code with the BIA/ATM's bank code. The BIA/ATM is identified by successfully locating the BIA/ATM in the VAD, and the individual is identified through the standard biometric-PIC.

1.4.11.4. Operation

To access an ATM, an individual enters their biometric-PIC into the BIA along with the account index code. The BIA forms an account access request message, which is then sent to the DPC by the ATM. The DPC validates the biometric-PIC as well as the emergency account index code, and then sends the resulting asset account number along with the private code back to the ATM.

The ATM asks the BIA to decrypt the response, and then displays the private code on the ATM's display screen. The ATM also examines the response to see whether or not the individual is performing a standard account access, or a "duress" account access. If a duress account access is indicated, the ATM may provide false or misleading information as to the amounts available to the individual; the specifics of this behavior will vary from ATM to ATM. However, no ATM will ever provide any indication to the individual that a duress transaction is in progress.

1.4.11.5. Security

Messages between the ATM and the DPC are secured by encryption and MAC calculation from the BIA. The MAC means that the ATM cannot change the contents of the message without being detected, and encryption prevents the encrypted part of the message from being disclosed.

Because the BIA/ATM has no LCD or no PIC pad attached, it requires the ATM to provide all the text prompts and to gather all the input from the individual. This is less secure than if the BIA were performing the operation, but as ATMs are generally physically robust, it can probably be called a wash.

1.4.11.6. Notes

It is between the bank and the individual to specify the behavior of an ATM when the individual indicates he is performing a transaction under duress. A particular bank may choose to limit access, or alter balance information, or a false screen may be displayed. A false screen is a display of data which has been intentionally predetermined to be inaccurate such that a coercing party will not illegally obtain accurate data about an individual's financial assets. It is beyond the scope of the invention to specify the precise behavior of an ATM under these circumstances.

1.4.12. Terminal: Phone Point of Sale Terminal 1.4.12.1. Purpose

The purpose of the phone point of sale terminal (PPT) is to authorize credit or debit financial transactions from an individual using a specially-equipped telephone to make a purchase from a merchant.

1.4.12.2. Construction

The PPT consists of:

an BIA/catv a rapid-connect digital modem [see the Voice View patent (known in the industry)]

a telephone (keypad, earpiece, microphone)

a microprocessor a DSP (digital signal processor)

a standard telephone line

The PPT accepts biometric identification using an BIA/catv connected to and integrated with a cordless, cellular, or standard telephone.

1.4.12.3. Identification

In order for the DPC to authorize a transaction, both the individual and the merchant must be identified.

To identify an individual, biometric-PIC identification is used.

To identify a phone-order merchant, the merchant and all his phone numbers that individuals will call are registered with the DPC. Thus when an individual submits an authorization, he also submits the phone number he called, which is then cross-checked with the merchant's listed phone numbers.

1.4.12.4. Operation

Individuals call merchants that are selling their wares through paper catalogs, newspapers, magazines, or other basic print media mechanisms. The PPT uses a special modem that shares the telephone voice line to exchange digital information with the merchant.

Each time the individual makes a phone call, the PPT keeps track of the phone number that was typed by the user, in case the individual decides to make a purchase. A DSP is used to detect dialtone, ring, connection, and so on, in order to tell what the actual phone number entered was, as distinct from extensions, or the navigation of phone message systems, and so on.

Once a call is placed to a merchant, the salesman for the merchant digitally downloads all the relevant information to the PPT including product, price, and the merchant code. Note that when in operation, the modem disconnects the speaker.

When the product information is downloaded, the PPT then prompts the individual for the biometric-PIC, the account index code, and then asks the individual to validate the purchase mount. Then the phone number and the merchant code are added, and the message is encrypted. The rapid-connect modem is again engaged to send the authorization information to the merchant.

When the merchant receives the authorization information, the merchant verifies that the price and product information are correct, and then forwards the transaction to the DPC using a secured communications channel using either the Internet or some other general purpose network. The connection to the DPC is secured using Public Key Encryption and a secret key exchange.

Upon receiving and decrypting a phone authorization, the DPC checks the phone number against the merchant code, validates the biometric-PIC, and then sends the transaction to the credit/debit network for authorization. If authorization succeeds, the DPC appends the buyer's address to the response message and sends the response to the merchant.

The merchant receives the response from the DPC, copies the mailing address, and forwards the message to the individual again via a brief session with the rapid-connect modem. When the transmission to the IPT is complete, a chime sounds, the modem disconnects, and the individual's private code (decrypted by the BIA) is displayed on the LCD screen. The merchant's sales rep confirms that the individual's mailing address is valid; if so, the call is terminated and the transaction is complete.

1.4.12.5. Security

One of the security concerns about phone transactions is the security of the phone system itself. Apart from the biometric identification, the central problem is making sure that the number the individual called actually reaches the merchant in question.

Note that the communications link between the PPT and the merchant isn't secured, so a purchase authorization from an individual to a merchant could be intercepted. However, no financial benefit would result from this, so it is not deemed to be important.

The security of a PPT is relatively low by necessity of price, weight, and because of the problems inherent in splitting the responsibility of PIC entry and private code decryption and presentation.

1.4.13. Terminal: Cable-TV Point of Sale 1.4.13.1. Purpose

The purpose of the CATV point of sale terminal (CPT) is to authorize credit or debit financial transactions from an individual in front of his television (or "TV") set to a merchant who is presenting objects for sale on television.

1.4.13.2. Construction

The CPT consists of:

a BIA/catv a television remote control with integrated BIA/catv a Cable-TV digital signal decoder a Cable-TV remote control reader an on-screen display mechanism access to a Cable-TV broadband two-way communications channel The CPT accepts biometric identification using an BIA/catv that is integrated with the television's remote control device. The remote control communicates with a television top box that itself communicates with the broadband cable television network. The terminal consists of the television remote logic that communicates with the BIA, as well as the television top box that communicates over the cable broadband network.

1.4.13.3. Identification

In this transaction, the merchant and the individual must both be identified to execute the transaction.

The individual is identified by the biometric-PIC.

The merchant is identified by a merchant credential, created by the CATV broadcaster at the time the product is shown on television. Each product broadcast has a merchant-product credential consisting of a merchant code, a time, a duration, and a price which is signed using Public Key Encryption and the CATV network broadcaster's private key. This merchant-product credential can only be generated by the network broadcaster.

1.4.13.4. Operation

As a television advertisement, an infomercial, or a home shopping channel displays a product, the Cable television network also broadcasts simultaneous digital information that describes a short description, price, as well as the merchant-product credential. This digital information is processed and temporarily stored by the CPT, ready to be accessed by the individual when a decision to purchase is made.

To buy something that is currently being displayed, the individual selects the on-screen display function of the special television Remote, which instructs the CPT to display text information on the screen regarding the currently viewed product.

The individual is first prompted for the number of the items he wishes to buy through the on-screen display. Then he is prompted to enter his Biometric-PIC, and his account index code. Once he verifies that the final purchase price is okay, the product, price, merchant code, merchant-product credential, and channel number along with the Biometric-PIC are used to construct a Remote Transaction Authorization request message. The request is sent to the merchant for authorization by way of the Cable-television broadband two-way communications channel.

Note that each merchant that desires to sell products in this manner must have the ability to receive order information using the broadband Cable television network.

Upon receipt of the authorization request, the merchant submits it to the DPC using a secured Internet connection or an X.25 connection.

If the DPC authorizes the transaction, it constructs an authorization response that includes the current mailing address of the individual in addition to the authorization code, and the encrypted private code. Once the merchant receives the authorization, he copies the authorization and the mailing address, and then forwards the authorization back to the CPT, who then displays the private code to the individual, terminating the transaction.

1.4.13.5. Security

This architecture does not allow criminals to replay messages intercepted from the CableTV broadband, but they are able to read parts of them. If this is not desirable, then the messages may be encrypted using an optional CATV Center's public key, or other "link level" encryption between the CATV set-top box (known in the industry) and the CATV local office.

To secure a connection between a merchant and the DPC, the connection uses a session key changed daily that has been previously exchanged using a public key encryption key exchange system.

1.5. System Description: Data Processing Center 1.5.1. Introduction

The Data Processing Center (DPC) handles financial transaction authorizations and individual registration as its main responsibilities. In addition, the DPC provides storage and retrieval for secure faxes, electronic documents, and electronic signatures.

Each DPC site is made up of a number of computers and databases connected together over a LAN (known in the industry) as illustrated in the DPC Overview Figure (number**). Multiple identical DPC sites ensure reliable service in the face of disaster or serious hardware failure at any single DPC site. Furthermore, each DPC site has electrical power backup and multiple redundancy in all of its critical hardware and database systems.

DPC components fall into three categories: hardware, software, and databases. Below is a short description, by category, of each component. More detailed descriptions appear in the following sections.

1.5.1.1. Hardware

FW Firewall Machine: the entry point of the DPC site.

GM Gateway Machine: the system coordinator and message processor.

DPCLAN DPC Local Area Network: connects the DPC sites 1.5.1.2. Databases

IBD Individual Biometric Database: identifies individuals from their biometric and PIC code.

PFD Prior Fraud Database: lists individuals who have defrauded the system and can check if a biometric matches any of these individuals.

VAD Valid Apparatus Database: stores information required to validate and decrypt BIA messages.

AOD Apparatus Owner Database: stores information about the owners of BIA devices.

ID Issuer Database: identifies issuing banks that participate with the system.

AID Authorized Individual Database: stores the list of individuals allowed to use personal or issuer BIA devices.

RMD Remote Merchant Database: stores information necessary to process transactions with telephone and cable television merchants.

EDD Electronic Document Database: stores electronic documents, such as faxes and electronic mail, for retrieval by authorized individuals.

ESD Electronic Signature Database: stores electronic document signatures for verification by a third party.

1.5.1.3. Software

MPM Message Processing Module: handles the processing of each message by coordinating with the other software modules and databases required to perform the message's task.

SNM Sequence Number Module: handles DUKPT sequence number processing.

MACM Message Authentication Code Module: handles MAC validation and generation.

MDM Message Decrypt Module: handles encrypting and decrypting of BIA requests and responses.

PGL PIC Group List: handles the lookup of PIC groups by PIC and the configuration of database elements that depend on the list of PIC groups.

IBD Machine List: handles the lookup of the main and backup database machines dedicated to holding IBD records for a given PIC group.

1.5.1.4. Terminology

When defining database schema, the following terminology is used for describing field types:

Int<X> an integral type using <X> bytes of storage
char<X> a character array of <X> bytes
text a variable length character array
<type>[X] a length <X> array of the specified type.
time a type used for storing time and date
biometric a binary data type used for storing the biometric
fax a binary data type used for storing fax images When describing database storage requirements, the term "expected" means the expected condition of a fully loaded system.

1.5.2. Protocol Description

Terminals accomplish their tasks by sending request packets to a DPC site. The DPC site sends back a reply packet containing the status on the success or failure of the request.

Communication is via a logical or a physical connection-oriented message delivery mechanism such as X.25 connections, TCP/IP connections, or a telephone call to a modem bank. Each session holds the connection to the terminal open until the DPC sends its response back to the terminal.

The request packet contains a BIA message part and a terminal message part:

BIA message part
protocol version number
message type
4-byte BIA Identification
4-byte sequence number
<message specific data>
Message Authentication Code (MAC)
Terminal message part
<terminal specific data>

The BIA message part is constructed by an BIA device. It includes one or two biometrics, a PIC, authorization mounts, and the contents of the general registers which are set by the terminal. Note: the MAC in the BIA message part only applies to the BIA part and not to the terminal part.

A terminal may place additional data for the request message in the terminal message part. The BIA provides a message key to allow the terminal to secure the terminal part data. The BLA automatically includes the message key in the packet's encrypted biometric-PIC block when necessary. The terminal performs the message key encryption itself, however.

The response packet contains a standard header and two optional free-form message parts: one with a MAC and one without:

Standard Header
protocol version number
message type
Optional Free-form message part with MAC
<message specific data>
MAC
Optional Free-form message part without MAC
<additional message specific data>

The message part with a MAC is sent to the BIA so that it may validate that this part of the response has not been tampered with and to display the individual's private code. The message part without a MAC is used for transmitting large amounts of data, such as fax images, that are not sent to the BIA for MAC validation as the BIA to terminal connection may be of limited bandwidth.

1.5.3. Processing Packets

In an embodiment of the invention with multiple DPC sites, a terminal need only send its request to one of the DPC sites, typically the closest, because that site automatically handles updating the others by running distributed transactions as necessary.

When one of the DPC's Firewall Machines receives a packet, it forwards it to one of the GM Machines for the actual processing. Each GM has a Message Processing Module that handles the coordination between the DPC components required to process the request and sends the response back to the sender.

1.5.4. Validating and Decrypting Packets

All packets the DPC receives, with the exception of those not constructed by an BIA, contain an BIA hardware identification code (the BIA Identification of the packet), a sequence number, and a Message Authentication Code (MAC). The GM asks the MAC Module to validate the packet's MAC and then checks the sequence number with the Sequence Number Module. If both check out, the GM passes the packet to the Message Decrypt Module for decryption. If any one of the checks fail, the GM logs a warning, terminates processing for the packet, and returns an error message to the BIA device.

Currently, the only message types that are not constructed by an BIA is the Secure Fax Data request and Electronic Document Data request.

1.5.5. Reply Packets

Each packet the DPC receives may contain an optional response key stored in the encrypted biometric-PIC block of the packet. Before the DPC replies to a request that includes a response key, it encrypts the reply packet with the response key. It also generates a Message Authentication Code and appends it to the packet.

The only exception to encrypting response packets applies to error messages. Errors are never encrypted and never include confidential information. However, most response packets include a status or reply code that can indicate whether the request succeeded or not. For example, when the DPC declines a credit authorization, it does not return an error packet, it returns a normal transaction response packet with a reply code set to "failed".

1.5.6. DPC Procedures

The DPC has two procedures commonly used while processing requests.

1.5.6.1. Individual Identification Procedure

For requests that require the DPC to identify an individual, the DPC executes the following procedure: using the PIC code, the DPC searches the IBD Machine List for the main and backup IBD machines responsible for handling identifications for the given PIC code. Next, the DPC sends the identification request to either the main or backup machines depending on which is the least loaded. The IBD machine responds with the IBD record for the individual or an "individual not found" error.

The IBD machine retrieves all the IBD records for the given PIC. Using a proprietary biometric hardware device, the IBD machine compares each record's primary biometric with the individual's biometric arriving at a comparison score indicating the similarity of the two biometrics. If no biometric has a close enough comparison score, the comparisons are repeated using the secondary biometrics. If none of the secondary biometrics have a close enough comparison score, then the IBD machine returns an "individual not found" error. Otherwise, the IBD machine returns the full IBD record of the individual, from which such fields such as the private code, account numbers, titles, and so on may be obtained.

1.5.6.2. Emergency Response Procedure

For requests that include an account index, the DPC handles the case where the individual chooses his or her emergency account index. The GM processing the request immediately notifies the DPC customer support staff, logs a warning, and if the response packet has a reply code, sets it to "emergency". It is the responsibility of the owner of the BIA device that submitted the request to watch for an "emergency" reply code and provide further assistance, such as the false screen mechanism described in the ATM terminal section. The DPC also increments the emergency use count of the individual's IBD record whenever the emergency account index gets accessed.

1.5.7. Protocol Requests

The following sections describe each protocol request/response and the actions the DPC takes to perform them.

The list of protocol packets are:
Individual Identification
Transaction Authorization
Registration
Account Access
Issuer Batch
Secure Fax Submit
Secure Fax Data
Secure Fax Tracking
Secure Fax Retrieve
Secure Fax Reject
Secure Fax Archive
Secure Fax Contract Accept
Secure Fax Contract Reject
Secure Fax Organization Change
Electronic Document Submit
Electronic Document Data
Electronic Document Tracking
Electronic Document Retrieve
Electronic Document Reject
Electronic Document Archive
Electronic Document Archive Retrieve
Electronic Signature
Electronic Signature Verify
Network Credential 1.5.7.1. Individual Identification
Individual Identification Request
BIA Part:
4-byte BIA Identification
4-byte sequence number
encrypted(DUKPT key) Biometric-PIC block:
300-byte authorization biometric
4–12 digit PIC
56-bit response key
MAC
Terminal Part: (not used)
Individual Identification Response
encrypted(response key):
private code text
individual name
biometric identification code
MAC The Individual Identification request includes a biometric-PIC block which the DPC uses with the individual identification procedure to identify the individual. If the individual is identified, then the DPC responds with the individual's name, biometric identification, and private code. Otherwise, the DPC responds with an "unknown individual" error.

1.5.7.2. Transaction Authorization
Transaction Authorization Request
BIA Part:
4-byte BIA Identification
4-byte sequence number
encrypted(DUKPT key) Biometric-PIC block:
300-byte authorization biometric
4–12 digit PIC
56-bit response key
[optional 56-bit message key]
account index
price
merchant Identification
[optional free-format product information]
[optional merchant code (phone#, channel#+time, hostname)]
[optional send-address request]
MAC
Terminal Part: (not used)
Transaction Authorization Response
encrypted(response key):
private code text
authorization response
authorization detail (autho code, transaction identification, etc)
[optional individual address information]
reply code (fail, ok, emergency)
MAC There are two basic transaction authorization subtypes: retail and remote.

For retail authorizations, the DPC identifies the purchasing individual by the biometric-PIC block of the request. If the individual cannot be identified, the DPC replies with an "unknown individual" error.

Next, the DPC sends an external authorization request (crediting the asset account of the BIA device's owner and debiting the individual's asset account) to one of several existing financial authorization services depending on the type of asset accounts involved (such as Visa.TM. or American Express.TM.). If the external financial authorization service approves the transaction, the DPC returns the external authorization codes and an "ok" reply code to the BIA device. Otherwise, the DPC returns the reason why the authorization was denied and sets the reply code to "failed". In either case, the DPC includes the individual's private code in the response.

When the DPC looks up the individual's asset account using the account index of the request, the chosen account may be the "emergency" account. If this happens, the DPC follows the emergency response procedure. The external authorization still takes place, however.

Remote authorization are generated by telephone, mail-order, or cable television merchants. The DPC handles remote authorizations the same way it does a retail authorization but with the following exceptions:

i) Remote authorizations include a remote merchant code which the DPC checks against the Remote Merchant Database to validate whether the packer's merchant Identification matches the one stored in the database. Furthermore, the asset account credited is the remote merchant's account, not the account of the BIA device's owner.

ii) Additionally, BIA devices that generate the remote authorizations tend to be personal BIA devices. The DPC checks the biometric Identification of the identified individual against the Authorized Individual Database's list of individuals allowed to use the BIA device. If the individual is not authorized to use the device, then the DPC denies the authorization request.

iii) Finally, the authorization packet may contain a "send-address" indicator. This indicator informs the DPC to include the individual's address in the reply packet and is usually used only for mail order purchases.

1.5.7.3. Registration
Registration Request
BIA Part:
4-byte BIA Identification
4-byte sequence number
encrypted(DUKPT key) Biometric-PIC block:
1000-byte primary biometric
1000-byte secondary biometric
4–12 digit PIC
56-bit response key
56-bit message key
MAC
Terminal Part:
encrypted(message key):
name
address
zipcode
private code
asset account list (account index code, account #)
emergency account (account index code, account #)
title list (title index code, title name)
Registration Response
status code
encrypted(response key):
private code text
PIC
biometric Identification code
list of DPC chosen PICs (if original choice of PIC is rejected)
status code (ok, rejected)
MAC Individuals register with the DPC via a Biometric Registration Terminal (BRT). The BRT sends the DPC a registration packet containing primary and secondary biometrics and personal identification code, along with ancillary data such as the individual's name, address, a list of financial asset accounts, the private code, and the emergency account. Optionally, the individual may include an electronic mail address, and a title list including titles and the title index code, as well as an Social Security Number (or "SSN"). The individual may choose his or her own PIC code or allow the system to choose it. In a modification step any previously entered data can be modified or deleted.

At any given moment, only one DPC site acts as the registration site, for implementation simplicity. Registration request packets received by non-registration DPC sites are forwarded to the current registration site. The registration DPC site performs the entire registration check, assigning of IBD records to IBD machines, and the distributed transaction required to update all other DPC sites.

The registration DPC site selects the PIC code for registration requests that don't specify one, stores the IBD record on the main and backup IBD machines (as specified in the PIC Group Lilt), and checks the PIC and biometric suitability of the registration packet before running the distributed transaction to update the other DPC sites.

The DPC runs a personal identification code and biometric sample duplication check step wherein the biometrics and personal identification code gathered during the registration step is checked against all previously registered biometrics currently associated with the identical personal identification code. The DPC may reject the registration for the following reasons: the PIC code is too popular, or the biometrics are too similar to other biometrics stored under the chosen PIC. To aid the individual in choosing an acceptable PIC, the DPC generates a short list of PIC codes for which the registration will be guaranteed that it reserves for a period of time. The BRT then prompts the individual for a new PIC which may be chosen from the good PIC list.

1.5.7.4. Account Access
Account Access Request
BIA Part:
4-byte BIA Identification
4-byte sequence number
encrypted(DUKPT key) Biometric-PIC block:
300-byte authorization biometric
4–12 digit PIC
56-bit response key
[optional 56-bit message key]
account index
MAC
Terminal Part: (not used)
Account Access Response
encrypted(response key):
private code text
[optional PIC]
asset account number
reply code (fail, ok, emergency)
MAC The account access request allows BIA-equipped Automated Teller Machines to provide a safer and more convenient way for individuals to identify themselves to the ATM.

The GM identifies the individual by the packet's biometric-PIC and uses the specified account index to choose which asset account number to retrieve.

When the GM looks up the individual's asset account using the account index of the request, the chosen account may be the "emergency" account. If this happens, the GM follows the emergency response procedure.

1.5.7.5. Issuer Batch
Issuer Batch Request
BIA Part:
4-byte BIA Identification
4-byte sequence number
encrypted(DUKPT key) Biometric-PIC block:
300-byte authorization biometric
4–12 digit PIC
56-bit response key
56-bit message key
issuer code
MAC
Terminal Part:
encrypted(message key) batch list:
add <biometric Id> <account index> <asset account> [<emergency flag>]
remove <biometric Id> <account index> <asset account>
Issuer Batch Response
encrypted(response key):
private code text
reply code (fail, ok, emergency)
MAC
encrypted(message key) failed list:
failed <command> <code>
. . .

The Issuer Batch request allows an issuing bank or other authority to perform routine maintenance on the Individual Biometric Database. The DPC logs a security violation warning if it receives any Issuer Batch requests from non-issuer BIA devices, and it also refuses to process the request.

The DPC identifies the individual submitting the batch request by following the individual identification procedure. The DPC then checks that the individual is registered in the Authorized Individual Database to use the BIA device embedded in the sending Issuer Terminal.

The DPC also uses the issuer code in the request to look up the apparatus owner Identification in the Issuer Database and compare it against the apparatus owner Identification stored in the Valid Apparatus Database to ensure that the issuer code is not forged.

The DPC then executes the add and delete commands in the message-key encrypted batch list. The batch list is a newline separated list of commands. Valid commands are:
add <biometric Id> <account index> <asset account> [<emergency flag>]remove <biometric Id> <account index> <asset account>

The add command adds the asset account to the account list at the specified account index. The optional emergency flag indicates whether the particular account index is treated as the individual's emergency account. If the asset account currently stored in the account list does not belong to the issuer, the command fails. This feature prevents one bank from adding or removing asset accounts from other bank's customers without the individual's knowledge or authorization.

The remove command clears the individual's asset account stored at the specified account index in the account list. If the asset account currently stored in the account list does not match the account the issuer is attempting to remove, the command fails.

For each command in the batch that failed to execute correctly, the GM logs a security violation warning and appends an entry to the failed list of the response. The failed entry includes the text for the command and the error code.

1.5.7.6. Secure Fax Submit
Secure Fax Submit Request
BIA Part:
4-byte BIA Identification
4-byte sequence number
encrypted(DUKPT key) Biometric-PIC block:
300-byte authorization biometric
4–12 digit PIC
56-bit response key
56-bit message key
security mode (unsecured, sender-secured, secured, secured-confidential)
sender title index code
sender fax number
sender fax extension
recipient list
[optional archive fax indicator]
[optional contract/agreement indicator]
Terminal Part: (not used)
Secure Fax Submit Response
encrypted(response key):
private code text
fax tracking number
MAC When the DPC receives a Secure Fax Submit request, it identifies the individual from the request's biometric-PIC by following the individual identification procedure. This identification, along with the individual's title described by the title index code, is presented to the recipients so that the sender of the fax is always reliably identified.

The DPC generates a tracking number for tracking purposes and stores it, the sender's biometric Identification, the security mode, and the message key in a newly created EDD Document record. For each recipient in the recipient list, the DPC also creates a Recipient record. The DPC then waits for the sending fax machine to transmit the fax data encrypted under the message key.

If the request includes an "archive fax" or "contract/agreement" indicator, the EDD places a copy of the Document and Recipient records in the archive database. Any subsequent updates to these records are also made to the archived versions.

The fax data is sent in a separate step so that if the sender makes a mistake entering his biometric and PIC, the system notifies him before he wastes any time feeding the document into the fax machine.

1.5.7.7. Secure Fax Data
Secure Fax Data Request
BIA Part: (not used)
Terminal Part:
fax tracking number
encrypted(message key):
fax image data
Secure Fax Data Response
status (incomplete, ok)

The Secure Fax Data request allows a secure fax machine to send the fax image to the DPC for delivery to the previously specified recipient(s). This request does not involve any biometric identification and instead relies upon the secret message key to securely transmit the image.

The fax image data is encrypted by the message key registered by the Secure Fax Submit request. Once the DPC has received the entire fax, it sends a Secure Fax Arrival Notice message to each of the recipient's fax numbers. The DPC retrieves the list of recipients by querying the EDD for all Recipient records containing the fax tracking number. The Recipient record contains the destination fax number and optional extension. After sending the Arrival Notice, the DPC updates each Recipient record's delivery status field to "notified". Note: if the destination fax number is busy, the DPC marks the delivery status field to "busy" and retries sending the notice periodically (i.e., every 10 minutes) until successful and at that time, updates the status field to "notified".

The Arrival Notice is as follows:
Secure Fax Arrival Notice (Fax message)
sender name, company, title, and fax number
fax tracking number
instructions on how to download the fax The DPC only sends the sender a Status Notice via fax after all recipients have either retrieved or rejected the fax. The sender may query the DPC using the Secure Fax Tracking request (see below) to get the current status of all recipients.

The Status Notice is as follows:
Secure Fax Status Notice (Fax message)
sender name, company, title, and fax number
fax tracking number
list of recipients showing:
name, company, title, and fax number
delivery date and status
contract/agreement status The DPC finds each individual's company and title information in the EDD Organization table.

For individuals who are not registered in the system and hence cannot receive secure faxes or for non-recipient secured modes, the DPC does not send them a Secure Fax Arrival Notice. Instead, the DPC sends them the fax directly. If the fax line is busy, the DPC retries every 10 minutes until it succeeds in delivering the fax.

1.5.7.8. Secure Fax Tracking
Secure Fax Tracking Request
BIA Part:
4-byte BIA Identification
4-byte sequence number
encrypted(DUKPT key) Biometric-PIC block:
300-byte authorization biometric
4–12 digit PIC
56-bit response key
56-bit message key
fax tracking number
MAC
Terminal Part: (not used)
Secure Fax Tracking Response
encrypted(response key):
private code text
message digest for tracking response fax image
status code (ok, failed)
MAC
fax image for recipient status list The DPC handles the Secure Fax Tracking request by retrieving all EDD Recipient records for the fax and generating a fax message to display the records. If the individual making the tracking request is not the sender of the fax document, then the DPC sets the status code to failed and puts an empty fax in the response.

The tracking response fax contains information describing the status of the delivery of the fax to each recipient. This fax contains such status information as line busy, fax arrival notice sent, fax sent, fax rejected, contract accepted, and so on.

The Tracking Notice is as follows:
Secure Fax Tracking Notice flax message)
sender name, company, title, and fax number
fax tracking number
list of recipients showing:
name, company, title, and fax number
delivery date and status
contract status 1.5.7.9. Secure Fax Retrieve
Secure Fax Retrieve Request
BIA Part:
4-byte BIA Identification
4-byte sequence number
encrypted(DUKPT key) Biometric-PIC block:
300-byte authorization biometric
4–12 digit PIC
56-bit response key
fax tracking number
MAC
Terminal Part: (not used)
Secure Fax Retrieve Response
encrypted(response key):
private code
56-bit message key
status (incomplete, ok, invalid recipient)
message digest for fax image
MAC
encrypted(message key):
fax image The DPC uses the biometric-PIC to identify the individual making the retrieve request by following the individual identification procedure. If no EDD Recipient record exists for the individual and for the specified fax, then the DPC responds with an "invalid recipient" status.

The DPC retrieves the encrypted fax image from the EDD Document record with the correct fax tracking number and biometric Identification which it returns to the requester.

The fax image includes a cover page that displays whether the fax is a contract/agreement and the sender's name, company, title, fax number, and extension.

When the last recipient has either received or rejected the fax, the DPC sends a Status Notice via fax (see Secure Fax Data, above) to the fax's sender and then schedules to remove the Document and Recipient records from the EDD within a configurable time period. The time period is intended to allow the recipients sufficient time to decide whether or not to archive the fax.

1.5.7.10. Secure Fax Reject
Secure Fax Reject Request
BIA Part:
4-byte BIA Identification
4-byte sequence number
encrypted(DUKPT key) Biometric-PIC block:
300-byte authorization biometric
4–12 digit PIC
56-bit response key
fax tracking number
MAC
Terminal Part: (not used)
Secure Fax Reject Response
encrypted(response key).
private code
status code (ok, invalid recipient)
MAC The DPC uses the biometric-PIC to identify the individual making the secure fax reject request. The DPC finds the EDD Recipient record keyed by the request's fax tracking number and the individual's biometric Identification. If the record cannot be found then the request fails with an "invalid recipient" status.

When the last recipient has either received or rejected the fax, the DPC sends a Status Notice via fax (see Secure Fax Data, above) to the fax's sender and then schedules to remove the Fax and Tracking records from the EDD within a configurable time period. The time period is intended to allow the recipients sufficient time to decide whether or not to archive the fax.

1.5.7.11. Secure Fax Archive
Secure Fax Archive Request
BIA Part:
4-byte BIA Identification
4-byte sequence number
encrypted(DUKPT key) Biometric-PIC block:
300-byte authorization biometric
4–12 digit PIC
56-bit response key
fax tracking number
MAC
Terminal Part: (not used)
Secure Fax Archive Response
encrypted(response key):
private code
status code (ok, invalid individual)
MAC The DPC uses the biometric-PIC to identify the individual making the secure fax archive request. The DPC finds the EDD Recipient record keyed by the request's fax tracking number and the individual's biometric Identification. If the record cannot be found and the individual is not the sender or one of the recipients, then the request fails with an "invalid individual" status. Otherwise, the DPC copies the Document and Recipient records into the EDD archive database. Any subsequent changes to these records are also copied to the archived versions.

1.5.7.12. Secure Fax Contract Accept
Secure Fax Contract Accept Request
BIA Part:
4-byte BIA Identification
4-byte sequence number
encrypted(DUKPT key) Biometric-PIC block:
300-byte authorization biometric
4–12 digit PIC
56-bit response key
fax tracking number
MAC
Terminal Part: (not used)
Secure Fax Contract Accept Response
encrypted(response key):
private code
status code (ok, invalid recipient)
MAC The DPC uses the biometric-PIC to identify the individual making the Contract Accept request. The DPC finds the EDD Recipient record keyed by the request's fax tracking number and the individual's biometric Identification. If the record cannot be found then the request fails with an "invalid recipient" status. Otherwise, the DPC updates the Recipient record's contract status field to "accepted" and generates a Status Notice to the fax's sender (see Fax Data, above).

1.5.7.13. Secure Fax Contract Reject
Secure Fax Contract Reject Request
BIA Part:
4-byte BIA Identification
4-byte sequence number
encrypted(DUKPT key) Biometric-PIC block:
300-byte authorization biometric
4–12 digit PIC
56-bit response key
fax tracking number
MAC
Terminal Part: (not used)
Secure Fax Contract Reject Response
encrypted(response key):
private code
status code (ok, invalid individual)
MAC The DPC uses the biometric-PIC to identify the individual making the Contract Reject request. The DPC finds the EDD Recipient record keyed by the request's fax tracking number and the individual's biometric Identification. If the record cannot be found then the request fails with an "invalid recipient" status. Otherwise, the DPC updates the Recipient record's contract status field to "rejected" and generates a Status Notice to the fax's sender (see Fax Data, above).

1.5.7.14. Secure Fax Organization Change
Secure Fax Organization Change (Secure Fax message)
sender name, company, title, and fax number
list of organizational changes Organization changes are submitted to the DPC via a secure fax message. A customer support engineer enters the changes requested in the fax message, verifying that the individual submitting the request is allowed to register individuals for that particular company. Since the fax is a secure fax, the sender's identity has already been ascertained, as has his title.

1.5.7.15. Electronic Document Submit
Electronic Document Submit Request
BIA Part:
4-byte BIA Identification
4-byte sequence number
encrypted(DUKPT key) Biometric-PIC block:
300-byte authorization biometric
4–12 digit PIC
56-bit response key
56-bit message key
recipient list
MAC
Terminal Part: (not used)
Electronic Document Submit Response
encrypted(response key):
private code text
tracking number
status code (ok, invalid recipient)
MAC When the DPC receives an Electronic Document Submit request, it identifies the individual by following the individual identification procedure.

The DPC then creates an EDD Document record and assigns it a unique tracking number. The DPC initializes the record's sender identification code to be the biometric identification code of the identified individual and the message key to be the message key in the request.

Next, the DPC searches the Individual Biometric Database for each recipient and creates an EDD Recipient record for each one. Each record is initialized with the tracking number, the recipient's biometric identification code, and a delivery status of "incomplete". If any of the recipients cannot be found, the DPC replies with an "invalid recipient" status.

1.5.7.16. Electronic Document Data
Electronic Document Data Request
BIA Part: (Not Used)
Terminal Part:
tracking number
command (either abort or data)
[optional message offset]
completion indication
encrypted(message key):
message body
Electronic Document Data Response
status (incomplete, ok)

The Electronic Document Data request allows an individual to send the document text (in one or more parts) to the EDD for delivery to the recipient(s). This request does not involve any biometric identification, instead, it relies upon the secret message key to securely transmit the document text.

The request text is assumed to be encrypted by the message key stored in the EDD document record and is appended to the document text already stored in the record.

When the EDD receives a packet with the "document complete" indicator, it knows that the sender has finished transmitting the document. The EDD now sends an Arrival Notice to all recipients of the document via Internet electronic mail informing them that they have a document waiting. The Arrival Notice is as follows:

Electronic Document Arrival Notice (Internet E-mail message)
sender name, company, title, and e-mail address
tracking number
instructions on how to receive the electronic document The EDD also updates the status of the EDD recipient record to "notified". When all recipients have either retrieved or rejected the electronic document, the DPC sends a Status Notice via Internet electronic mail to the document originator.

The Status Notice is as follows:

Electronic Document Status Notice (Internet E-mail message)
sender name, company, title, and e-mail address
tracking number
list of recipients showing for each
name, company, title, e-mail address
delivery date and status The DPC finds each individual's company and title information in the EDD Organization table.

1.5.7.17. Electronic Document Retrieve
Electronic Document Retrieve Request
BIA Part:
4-byte BIA Identification
4-byte sequence number
encrypted(DUKPT key) Biometric-PIC block:
300-byte authorization biometric
4–12 digit PIC
56-bit response key
tracking number
MAC
Terminal Part: (not used)
Electronic Document Retrieve Response
encrypted(response key):
private code
56-bit message key
status (incomplete, ok, invalid recipient)
MAC
encrypted(message key): document text The DPC uses the biometric-PIC to identify the individual making the electronic document retrieve request by following the individual identification procedure.

The DPC next finds the EDD Recipient record keyed by the tracking number and the individual's biometric Identification.

If the record cannot be found, then the request fails with an "invalid recipient" status. Otherwise, the DPC sends the document's message key and the document (still encrypted by the message key) to the requester.

The EDD then updates the status of the EDD recipient record to "retrieved". When all recipients have either retrieved or rejected the document, the DPC sends a Status Notice via Internet electronic mail to the document originator (see Electronic Document Data, above) and then schedules to remove the Document and Recipient records (see Secure Fax Retrieve, above).

1.5.7.18. Electronic Document Reject
Electronic Document Reject Request
BIA Part:
4-byte BIA Identification
4-byte sequence number
encrypted(DUKPT key) Biometric-PIC block:
300-byte authorization biometric
4–12 digit PIC
56-bit response key
message tracking number
MAC
Terminal Part: (not used)
Electronic Document Reject Response
encrypted(response key):
private code
status code (ok, invalid recipient)
MAC The DPC uses the biometric-PIC to identify the individual making the electronic document reject request. The DPC next finds the EDD Recipient record keyed by the tracking number and the individual's biometric Identification. If the record cannot be found, then the request fails with an "invalid recipient" status.

The EDD updates the status of the EDD recipient record to "rejected". The DPC then follows the same notification and deletion procedure as described in Electronic Document Retrieve, above.

1.5.7.19. Electronic Document Archive
Electronic Document Archive Request
BIA Part:
4-byte BIA Identification
4-byte sequence number
encrypted(DUKPT key) Biometric-PIC block:
300-byte authorization biometric
4–12 digit PIC
56-bit response key
tracking number
MAC
Terminal Part: (not used)
Electronic Document Archive Response
encrypted(response key):
private code
status code (ok, invalid individual)
MAC The DPC uses the biometric-PIC to identify the individual making the electronic document archive request. The DPC finds the EDD Recipient record keyed by the request's tracking number and the individual's biometric Identification. If the record cannot be found and the individual is not the sender or one of the recipients, then the request fails with an "invalid individual" status. Otherwise, the DPC copies the Document and Recipient records into the EDD archive database. Any subsequent changes to these records are also copied to the archived versions.

1.5.7.20. Electronic Document Archive Retrieve
Electronic Document Archive Retrieve Request
BIA Part:
4-byte BIA Identification
4-byte sequence number
encrypted(DUKPT key) Biometric-PIC block:
300-byte authorization biometric
4–12 digit PIC
56-bit response key
optional title index code, sending fax number, and extension
tracking number
MAC
Terminal Part: (not used)
Electronic Document Archive Retrieve Response
encrypted(response key):
private code
status code (ok, invalid individual)
MAC The DPC can receive an Electronic Document Archive Retrieve request from either a Secure Fax Terminal or a Certified Email Terminal. The DPC uses the individual identification procedure to determine the individual submitting the archive retrieve request. The individual must be either the sender or one of the recipients or else the DPC denies the request by setting the status code to "invalid individual". However, if the archived document was a fax sent using a corporate title, the DPC allows additional individuals whose titles are higher in the corporate hierarchy to retrieve the archived document as well.

The EDD maintains an archive database, indexed by the document's original tracking number, stored on off-line media such as CD-ROMs and tape that can take considerable time to search for the archived document. As a result, the DPC does not return the archived document immediately, but instead informs the requesting individual that the DPC has begun the search. At a later date when the DPC finishes the search, it notifies the requester that the archived document is ready to be retrieved through the standard document arrival notification mechanisms—either via fax or email, depending on the format of the original document.

The DPC creates an EDD archive request record to store information about the requester so that when the search completes, the DPC remembers to whom to send the document.

1.5.7.21. Electronic Signature
Electronic Signature Request
BIA Part:
4-byte BIA Identification
4-byte sequence number
encrypted(DUKPT key) Biometric-PIC block:
300-byte authorization biometric
4–12 digit PIC
56-bit response key
document name
document MD5 calculation
MAC
Terminal Part: (not used)
Electronic Signature Response
encrypted(response key):
private code text
signature string
MAC To process the electronic signature request, the DPC first performs a biometric identification using the biometric-PIC. Then, the DPC creates an ESD record, assigns it a unique signature identification code, and sets the record's signature field to the electronic signature in the request. The DPC then returns a signature string that can be submitted for later verification:

"<Dr. Bunsen Honeydew> <Explosions in the Laboratory> May 17, 95 13:00 PST 950517000102"

1.5.7.22. Electronic Signature Verify,
Electronic Signature Verification Request
BIA Part:
4-byte BIA Identification
4-byte sequence number
encrypted(DUKPT key) Biometric-PIC block:
300-byte authorization biometric
4–12 digit PIC
56-bit response key
signature string
MAC
Terminal Part: (not used)
Electronic Signature Verification Response
encrypted(response key):
private code text
signature string
status (verified, failed)
MAC The DPC performs a biometric identification, extracts the signature tracking code from the signature string, retrieves the indicated ESD record, and verifies that it matches the signature string. The DPC returns the private code and the outcome of the signature comparison.

1.5.7.23 Network Credential
Network Credential Request
BIA Part:
4-byte BIA Identification
4-byte sequence number
encrypted (DUKPT key) Biometric-PIC block:
300-byte authorization biometric
4–12 digit PIC
56-bit response key
account index
bank code
bank hostname
terminal.port and bank.port (TCP/IP addresses)
MAC
Network Credential Response
encrypted(response key):
private code
signed(DPC's private key):
credential(time, acct, terminal.port, bank.port)
bank's public key
status code (ok, failed)
MAC The DPC identifies the individual using the request's biometric-PIC and retrieves the individual's asset account stored at the specified index. If the account index is the emergency account, then the network credential response status code is set to "failed" and no credential is generated.

The DPC constructs the credential using the current time, the retrieved asset account, and the TCP/IP addresses of the terminal and the bank. The DPC then uses public key encryption to sign the credential with its private key.

The response also includes the bank's public key, which the DPC retrieves from the Remote Merchant Database.

1.5.8. Customer Support and System Administration Messages

The DPC handles additional message types classified as internal messages. The DPC generally does not accept these messages from non-DPC systems. The messages are database vendor specific. However, the internal network uses DES-encrypted packets to provide additional security.

The Customer Service and System Administration tasks are implemented using the database vendor's query language and application development tools.

1.5.8.1. Customer Service tasks:
IBD: find, activate, deactivate, remove, correct records.
AID: add or remove authorized individuals.
AOD: find, add, remove, correct records.
VAD: find, activate, deactivate, remove, correct records.
RMD: find, add, remove, correct records.
PFD: add, remove, correct records.
1.5.8.2. System Administration Tasks:
Run prior fraud checks.
Modify the Valid Site List.
Summarize log information (warnings, errors, etc.).
Modify the PIC Group List.
Performance monitoring.
Run backups.
Crash recovery procedures.
Time synchronization for the DPC sites.
Change the primary registration site.
Change the secret DES encryption key.
Clean up old document tracking numbers.
Generate a list of BIA hardware identification code, MAC encryption
key, and DUKPT Base Key triples. Store ori an encrypted floppy
for the Key Loading Device.

1.5.9. Firewall Machine

1.5.9.1. Purpose

The FW Machines provide a first line of defense against network viruses and computer hackers. All communication links into or out of the DPC site first pass through a secure FW Machine.

1.5.9.2. Usage

The FW Machine, an internet-localnet router, only handles messages destined for the GM Machines.

BIA-equipped terminals send packets to a single DPC site via modem, X.25, or other communication medium. The DPC relies on a third party to supply the modem banks required to handle the volume of calls and feed the data onto the DPC backbone.

For DPC to DPC communication, primarily for distributed transactions and sequence number updates, the FW Machines send out double-length DES encrypted packets. The DPC LAN component handles the encryption and decryption: the FWs do not have the ability to decrypt the packets.

1.5.9.3. Security

A properly configured network sniffer acts as an intruder detector as backup for the FW. If an anomalous message is detected, the intruding messages are recorded in their entirety, an operator is alerted, and the FW is physically shut down by the sniffer.

The FW disallows any transmissions from the internal network to the rest of the Internet.

1.5.9.4. Message Bandwidth

A transaction authorization request requires about 400 bytes and registration packets require about 2 KB. To handle 1000 transaction authorizations per second and 1 registration packet per second, the FW Machines are able to process about 400 KB per second (all known in the industry).

Each DPC site requires an aggregate bandwidth of nearly three T1 connections to the third party modem bank and the other DPC sites.

1.5. 10. Gateway Machine

1.5.10. 1. Purpose

The GM Machine (GM), through the FW Machines, link the outside world (BIA-equipped terminals and other DPCs) to the internal components of the DPC. The DPC has multiple GMs, typically two.

1.5.10.2. Usage

The GM supervises the processing of each BIA request, communicates with the various DPC components as necessary, and sends the encrypted results of the request back to the sender. The software performing this task is called the Message Processing Module.

The GM logs all requests it receives and any warnings from components it communicates with. For example, the GM logs any emergency account accesses, sequence number gaps, and invalid packets.

Processing a request may require the GM to inform GMs at all other DPCs of a change in the DPC databases. When this happens, the GM runs a distributed transaction to update the remote databases.

Distributed transactions fall into two categories: synchronous and asynchronous. Synchronous distributed transactions require the GM to wait for the distributed transaction to commit before continuing to process the packet. Asynchronous distributed transactions do not require the GM to wait for the commit, and allow it to finish processing the request regardless of whether the distributed transaction commits or not. Asynchronous distributed transactions are only used to update data for which database consistency is not an absolute requirement: sequence numbers and biometric checksum recordings may be performed asynchronously, whereas creating database records, such as Individual Biometric records, may not.

When executing a synchronous distributed transaction, the requesting GM only considers the entire transaction successful if all sites can successfully commit the transaction locally. Otherwise, the GMs back out the changes locally and reject the request due to a transaction error.

The list of valid DPC sites is normally all of the sites. In the case of an extreme site failure, however, a system administrator may manually remove that site from the valid site list. The most likely cause of distributed transaction failures, however, are temporary network failures that are unrelated to any DPC equipment. Requests that require a synchronous distributed transaction cannot be performed until network connectivity is restored or the site is removed from the valid site list. Before a site can be added back to the valid site list, the system administrator brings the site's databases up to date with those of a currently active site.

1.5.10.3. Software Components

Each GM runs the following software components locally for performance reasons:

Message Processing Module
Message Authentication Code Module
Message Decrypt Module
Individual Biometric Database Machine List

1.5.10.4. Message Bandwidth

The message bandwidth required by the GMs is similar to that required by the FW Machines. A FDDI network interface provides 100 MBits per second and easily covers any bandwidth requirements.

1.5.11 DPC LAN

1.5.11.1 Purpose

The DPC Local Area Network (LAN) links the machines of the DPC sites together using a fiber optic token ring. The optic token ring provides both high bandwidth and good physical security.

1.5.11.2 Security

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

1.5.12 Message Processing Module

1.5.12.1 Purpose

The Message Processing Module (MPM) handles the processing for a request packet. It communicates with other components of the DPC as necessary to perform its tasks. The presence of an MPM on a machine brands it as a CM.

1.5.12.2 Usage

The MPM maintains a request context for each request it is currently processing. The request context includes the information necessary to maintain the network connection to the terminal making the request, the BIA device information, the response key, and the response packet.

1.5.13. Message Authentication Code Module

1.5.13.1. Purpose

The Message Authentication Code Module's (MACM) tasks are to validate the Message Authentication Code on inbound packets and to add a Message Authentication Code to outbound packets.

1.5.13.2. Usage

The MACM maintains an in-memory hash table of 112-bit MAC encryption keys keyed by BIA hardware identification code.

When the MACM receives a request from the GM to validate a packet's MAC, it first looks up the packet's hardware identification code in the hash table. If no entry exists, then the MACM replies to the GM with an "invalid hardware identification code" error.

Otherwise, the MACM performs a MAC check on the BIA message part of the packet using the 112-bit MAC encryption key. If the MAC check fails, then the MACM replies to the GM with an "invalid MAC" error. Otherwise, the MACM replies with a "valid MAC" message.

If the packet contains a merchant code, the MACM also checks the merchant code against the owner identification code in the hash table. If the codes don't match, then the MACM replies with an "invalid owner" error.

When the MACM receives a request from the GM to generate a MAC for a packet, it looks up the MAC encryption key using the packet's hardware identification code. With the MAC encryption key, the MACM generates a MAC and adds it to the packet. If the MACM cannot find the hardware identification code in its hash table, it replies with an invalid hardware identification code error instead.

1.5.13.3. Database Schema

The MACM hash table entry contains:
MACM Entry:
hardwareId=int4
ownerId=int4
macEncryptionKey=int16
The table is hashed by hardware identification code.

1.5.13.4. Database Size

Assuming 5 million BIA-equipped devices in service, the hash table requires about 120 MB of storage. For performance reasons, this hash table is cached completely in memory.

1.5.13.5. Dependencies

The MACM only contains records referencing active BIA hardware identification codes and active apparatus owners. Whenever an apparatus or apparatus owner is suspended or deleted from the system, the MACM removes any entries that reference the identification code. When an apparatus is activated, the MACM then adds an entry for it.

The MACM also caches the MAC encryption key from the Valid Apparatus Database. Since the system does not allow the encryption key of an BIA to be changed, the MACM does not need to worry about receiving encryption key updates.

1.5.14. Message Decrypt Module
1.5.14.1. Purpose

The Message Decrypt Module's (MDM) task is to reconstruct the DUKPT transaction key and with it decrypt the biometric-PIC block of the packet. It maintains a list of the DUKPT Base Keys that are required to generate the transaction key.

1.5.14.2. Usage

The MDM constructs the DUKPT transaction key using the packet's sequence number as the DUKPT transaction counter, the upper 22 bits of the BIA hardware identification code as the DUKPT tamper resistant security module (or "TRSM") Identification, and the low 10 bits of the BIA hardware identification code as the DUKPT Key Set Identification.

The DUKPT standard specifies how the transaction key is generated. The Key Set Identification is used to look up a Base Key from the Base Key List. The Base Key is used to transform the TRSM Identification into the initial key via a DES encrypt/decrypt/encrypt cycle. The transaction counter is then applied to the initial key as a series of DES encrypt/decrypt/encrypt cycles to generate the transaction key.

For additional security, two Base Key Lists are maintained, one for low security BIA devices and one for high security devices. The MDM chooses which Base Key List to use depending on the security level of the device.

1.5.14.3. Database Schema

The MDM Base Key List entry contains:
MDM Entry:
baseKey=int16
The Base Key List is indexed by Key Set Identification.

1.5.14.4. Database Size

The MDM maintains an in-memory list of the DUKPT Base Keys. Each key requires 112-bits. The MDM maintains two sets of 1024 keys requiring 32 KB total.

1.5.14.5. Dependencies

The MDM has no direct dependencies on any other DPC component.

1.5.15. PIC Group List
1.5.15.1. Purpose

The PIC Group List (PGL), in conjunction with the Individual Biometric Database Machine List, defines the configuration of the IBD machines. The PGL stores a list of the PIC groups in the system which is used to simplify the management of the PICs. A PIC group is a set of consecutive PIC codes. A PGL exists on each GM Machine (GM).

1.5.15.2. Usage

The PGL, when given a PIC code, searches through its list of PIC groups for the group containing the PIC code. The PGL maintains the list of groups in order and uses a binary search to quickly find the correct group.

The initial configuration for the PGL is one giant PIC group containing all possible PICs. After a threshold number of PICs are assigned, the giant PIC group is split in two. Thereafter, this process is applied to all succeeding PIC groups.

When a PIC group splits, the PGL assigns a new main and backup IBD machine based on available storage on a first-come-first serve basis. The PGL coordinates with the IBD machines to first copy the affected records from the old main and backup machines to the new ones, update the IML record, and last remove the old main and backup copies. Splitting a PIC group is an involved task. The PGL batches split requests to be run when the DPC is lightly loaded, for instance, at night.

The system administrator may also change the main and backup IBD machines for a given PIC group if the machines' free storage falls below a level required for handling the expected mount of new registrations.

1.5.15.3. Database Schema

The schema for the PIC Group records are:
PICGroup:
lowPin=int8
highPin=int8
used=int4

Each PIC group is identified by a unique identifier. For convenience the PIC group identification code is the lowPin code for the group, however the system does not otherwise rely upon this fact.

The PGL is keyed by the lowPin field.

1.5.15.4. Database Size

The PGL is expected to contain about 3000 groups (each PIC group contains about 1000 active PICs, but may span millions of actual PICs). The entire PGL requires about 72 KB of storage and is cached completely in memory.

1.5.15.5. Dependencies

When PIC groups are added, merged, or split up, the PGL is responsible for informing the IBD Machine List of the changes and for directing the movement of IBD records from one IBD machine to another.

1.5.16. Individual Biometric Database Machine List

1.5.16.1. Purpose

The IBD Machine List (IML), in conjunction with the PIC Group List, codifies the configuration of the IBD machines. The IML maps a PIC code to the main and backup IBD machines storing IBD records for the PIC. The IML is actually keyed by PIC Group (a set of consecutive PIC codes) rather than by individual PICs because this greatly reduces the memory required to store the list. An IML exists on each GM Machine (GM).

1.5.16.2. Usage

When a GM processes a request that requires a biometric identification, the GM finds the IML record keyed by the biometric's PIC group. The GM then knows the main and backup IBD machines to use for the biometric identification.

1.5.16.3. Database Schema

The schema for the IML list entries are:
MachinePair:
pinGroup=int8
main=int2,
backup=int2
The IML is keyed by pinGroup.

1.5.16.4. Database Size

The IML is expected to contain about 3000 entries (the number of PIC Groups). Each MachinePair record is 12 bytes requiring about 36 KB of storage and is cached completely in memory.

1.5.16.5. Dependencies

Any changes in the configuration of the IBD machines are be reflected in the IML. In addition, the IML uses PIC groups for its keys so when the PIC Group List gets modified, the IML are also updated.

1.5.17. Sequence Number Module

1.5.17.1. Purpose

The Sequence Number Module's (SNM) primary function is to prevent replay attacks by validating packet sequence numbers. Its secondary task is to minimize the effects of a resubmission attack by informing other SNMs in remote DPC sites of sequence number updates and to periodically update the sequence numbers in the Valid Apparatus Database.

The SNM maintains an in-memory hash table of sequence numbers keyed by BIA hardware identification code codes to allow quick validation of packet sequence numbers.

1.5.17.2. Usage

When the SNM receives a validate request from the GM for a given hardware identification code and sequence number, it looks up the hardware identification code in the hash table. If no entry exists, then the SNM replies to the GM with an "invalid hardware identification code" error.

Otherwise, the SNM checks the given sequence number against the sequence number stored Ln the hash table entry. If the sequence number is less than or equal to the stored sequence number, the SNM replies with an "invalid sequence number" error. Otherwise, the SNM sets the sequence number in the hash table entry to the given sequence number and replies with a "valid sequence number" message.

From time to time, the SNM may observe a sequence number gap. A sequence number gap occurs when the SNM receives a sequence number that is more than one greater than the sequence number stored in the hash table entry. In other words, a sequence number was skipped. When the SNM discovers a sequence number gap, it replies with a "sequence number gap" message to the GM instead of a "valid sequence number" message. The GM treats the packet as valid, but it also logs a "sequence number gap" warning.

Sequence number gaps usually occur when network connectivity is lost: packets are dropped or can't be sent until the network is restored to working order. However, sequence number gaps occur for fraudulent reasons as well: malicious parties could intercept packets preventing them from arriving at the DPC or they could even attempt to counterfeit packets (with a large sequence number so that it isn't immediately rejected).

The SNM's secondary function is to inform other DPCs of the updated sequence numbers. Quickly updating sequence numbers at all DPC sites thwarts resubmission attacks wherein a malicious entity monitors packets whose destination is for one DPC site and immediately sends a copy to a different DPC site in the hope of exploiting the transmission delay of sequence number updates from one DPC site to another resulting in both sites accepting the packet as valid, when only the first site should accept the packet.

The SNMs send update messages to each other whenever they receive a valid sequence number. If an SNM receives an update message for a sequence number that is less than or equal to the sequence number currently stored in its hash table, that SNM logs a sequence number resubmission warning. All resubmission attacks are detected in this manner.

A simpler way to thwart resubmission attacks completely, is to have only one SNM validate packets. Under this scheme, there is no update transmission delay window to exploit with a resubmission attack. Alternately, multiple SNMs can be active at the same time provided none of them handle sequence number validation for the same BIA-equipped device.

1.5.17.3. Sequence Number Maintenance

When the SNM boots up, it loads the sequence number hash table from the sequence numbers for active BIA stored in the VAD.

Once per day, the SNM downloads the current sequence numbers to the local Valid Apparatus Database (VAD).

The VAD is responsible for sending add-entry and remove-entry messages to the SNMs for any BIA-equipped devices that are activated or deactivated to keep the SNM hash table up-to-date.

1.5.17.4. Database Schema

The SNM hash table entry contains:
SNM Entry:
hardwareId=int4
sequenceNumber=int4
The hash table is keyed by hardwareId.

1.5.17.5. Database Size

Assuming about 5 million BIA-equipped devices in service requires the hash table to be about 40 MB.

1.5.17.6. Dependencies

The SNM depends on the Valid Apparatus Database. When an apparatus is suspended or removed from the database, the SNM removes the corresponding entry. When an apparatus is activated, the SNM creates an entry for it.

1.5.17.7. Message Bandwidth

The SNMs require a transmission bandwidth of about 8 KB per second to handle 1000 update sequence number messages per second. The update sequence number messages is buffered and sent out once per second to minimize the number of actual messages sent.

1.5.18. Apparatus Owner Database

1.5.18.1. Purpose

The Apparatus Owner Database (AOD) stores information on individuals or organizations that own one or more BIA-equipped devices. This information is used to double check that the BIA devices are used only by their rightful owners, to provide asset account information for financial credit and debit transactions, and to allow identification of all BIAs owned by a specific individual or organization.

1.5.18.2. Usage

Each AOD record includes an asset account to credit or debit the owner when the DPC processes a financial transaction submitted by one of the owner's BIA-equipped devices. For instance, transactions submitted from BIA attached to a retail point of sale terminal involves credits to the asset account, while certified electronic mail transmissions results in debits to the asset account.

1.5.18.3. Database Schema

The schema for the Apparatus Owner record is:

ApparatusOwner:
ownerId=int4
name=char50
address=char50
zipCode=char9
assetAccount=char16
status=int1

The status field is one of:
0: suspended
1: active

The Apparatus Owner Database is keyed by ownerId.

1.5.18.4. Database size

The AOD is expected to store about 2 million Apparatus Owner records. Each entry is 130 bytes requiring about 260 MB of storage. The AOD is stored as a hashed file keyed by owner identification code. A copy of the AOD is stored on each GM.

1.5.18.5. Dependencies

When entries are removed or suspended from the AOD, any Valid Apparatus Database records that reference those apparatus owners are marked as suspended. In addition, the MAC Module and the Sequence Number Module remove their entries for the suspended apparatuses.

1.5.19. Valid Apparatus Database

1.5.19.1. Purpose

The Valid Apparatus Database (VAD) is a collection of records representing all of the BIAs that have been manufactured to date. The VAD record contains the Message Authentication Code encryption key for each BIA, as well as an indication of whether an BIA is active, awaiting shipment, or marked as destroyed. In order for a message from an BIA to be decrypted, the BIA must exist and have an active record in the VAD.

1.5.19.2. Usage

When manufactured, each BIA has a unique public identification code and a unique MAC encryption key, both of which are entered into the VAD record prior to BIA deployment.

When an BIA is first constructed, it is given a unique hardware identification code. When an BIA is placed in service, its hardware identification code is registered with the system. First, the owner or responsible party of the BIA is entered into the Apparatus Owner Database (AOD). Then, the VAD record is pointed to the AOD record, and the BIA is then set active. Requests from that BIA are accepted by the DPC.

When an BIA is removed from service, it is marked as inactive, and the link to the AOD record is broken. No communications from that BIA are accepted.

Each BIA type and model has a security level assigned to it that indicates its level of physical security. When the DPC processes requests from that BIA, it uses the BIA's security level to gauge what kind of actions are allowed. The DPC also provides the security level to external financial transaction authorization services.

For example, a financial transaction authorization service can decide to deny any request for over $300 from low security BIA, requiring individuals to use higher security BIA to authorize such sums. The authorization service can also use the security level as a guide on how much to charge for the transaction, based on risk.

The security levels and the actions that they allow are determined operationally. Basically, the cost to defraud the system must be higher than the potential gain, so the security level is related to the cost to compromise the device.

1.5.19.3. Database Schema

The schema for the Valid Apparatus record is:

Valid Apparatus:
hardwareId=int4
macEncryptionKey=int16
ownerId=int8
mfgDate=time
inServiceDate=time
securityLevel=int2
status=int1
type=int1
use=int1

Possible values for the status field are:
0: suspended
1: active
2: destroyed

Possible values for the type field are (one for each type of terminal):
0: ATM
1: BRT
2: CET
3: CPT
4: CST
5: EST
6: IPT
7: IT
8: ITT
9: PPT
10: RPT
11: SFT Possible values for the use field are:
0: retail
1: personal
2: issuer
3: remote The Valid Apparatus Database is keyed by hardware identification code.

1.5.19.4. Database Size

The VAD handles about 5 million retail, issuer, and remote Valid Apparatus entries. Each entry is 51 bytes requiring about 255 MB total. The VAD is stored as a hashed file keyed by hardware identification code. A copy of the VAD is stored on each GM.

The number of personal Valid Apparatus entries number in the range of 30 million requiring another 1.5 GB of storage.

1.5.19.5. Dependencies

When a VAD record changes status, the MAC Modules and Sequence Number Modules are informed of its change in status. For instance, when an apparatus becomes active, the MACP and SNM adds an entry for the newly active apparatus. When an apparatus becomes inactive, the MACP and SNM remove their entry for the apparatus.

1.5.20. Individual Biometric Database

1.5.20.1. Purpose

Individual Biometric Database (IBD) records store information on individuals, including their primary and secondary biometrics, PIC code, list of financial asset accounts, private code, emergency account, address, and phone number. The individual may optionally include their SSN and electronic mail address. This information is necessary for identifying an individual either by biometric or personal information, for accessing account information, or for providing an address or phone number to remote merchants for additional verification.

1.5.20.2. Usage

Individuals are added to the system during the individual enrollment process at registered Biometric Registration Terminals located in retail banking establishments worldwide, or in local system offices. During enrollment, individuals select their personal identification numbers, and add financial asset accounts to their biometric and PIG combination.

Individuals may be removed from the database due to fraudulent activity reported by any issuing member. If this occurs, the individual's account information is moved from the IBD to the Prior Fraud Database (PFD) by an authorized internal systems representative. The biometric Ids for records in the PFD may not be used for records in the IBD.

The IBD exists on multiple machines, each of which is responsible for a subset of the IBD records with a copy of each record stored on two different machines, both for redundancy and for load-sharing. The IBD Machine List, stored on the GM, maintains which machines hold which PICs.

1.5.20.3. Database Schema

The schema for the Individual Biometric record is:
IndividualBiometric:
primaryBiometric=biometric
secondaryBiometric=biometric
biometricId—int4
PIC=char10
phoneNumber=char12
lastName=char24
firstName=char24
middleInitial=char2
SSN=char9
privateCode=char40
address=char50
zipCode=char9
publicKey=char64
checksums=int4[10]
accountLinks=char30[10]
emergencyIndex=char1
emergencyLink=char1
privs=char10
enroller=int8
emergencyUseCount=int4
status=int1
The status field is one of:
0: suspended
1: active
2: priorFraud
The IBD is keyed by PIC.

1.5.20.4. Database Indexes

Each IBD machine has additional indexes on the individual's Social Security Number, biometric identification code, last name, first name, and phone number to facilitate access to the IBD database.

1.5.20.5. Database Size

Each IBD machine has 40 GB of secondary storage provided by one or more RAID devices. Each IBD record is 2658 bytes (assuming the biometrics are 1K apiece) allowing up to 15 million records per machine. The IBD records are stored using a (perhaps clustered) secondary index on the PIC. The index is stored in memory and requires no more than 64 MB (a 64 MB index handles about 16 million entries). To store records for 300 million individuals, the DPC needs at least 40 IBD machines: 20 IBD machines for main storage and another 20 for backup. The number of IBD machines is easily scaled up or down depending on the number of registered individuals.

1.5.20.6. Dependencies

The IBD machines, PIC Group List, and the IBD Machine List remain up-to-date in terms of which PICs are on which machine. When a PIC group is reconfigured or main and backup machines for PIC groups are changed, the IBD machines update their databases and indexes appropriately.

1.5.21. Authorized Individual Database

1.5.21.1. Purpose

For each issuer or personal BIA-equipped device, the Authorized Individual Database (AID) maintains a list of individuals who are authorized, by the owner of the device, to use it.

The AID exists for two reasons. The first is that it provides restricted access to a terminal. For example, the Issuer Terminal can only be used by an authorized bank representative. The second reason for the AID is to prevent criminals from secretly replacing the BIA in a retail point of sale terminal with that of a personal BIA from a phone Terminal and thus routing all purchases to a remote merchant account set up by the criminals.

1.5.21.2. Database Schema

The schema for the Authorized Individual record is:
Authorized Individual:
hardwareId=int4
biometricId=int4
The hardwareId refers to a record in the Valid Apparatus Database and the biometricId refers to a record in the Individual Biometric Database. Whenever the DPC needs to check whether an individual is authorized to use a personal or issuer BIA device, the DPC checks for the existence of an Authorized Individual record with the correct hardwareId and biometricid.

Personal BIA devices are identified by a use field set to 1 (personal) in the Valid Apparatus Database. Issuer BIA devices are identified by a use field set to 2 (issuer) in the Valid Apparatus Database.

1.5.21.3. Database Size

Assuming each issuer terminal has 10 individuals authorized to use it and an each personal device has 2 additional authorized individuals with 1,000,000 personal devices in the server, the AID stores about:

10*100,000+2*1,000,000=3,000,000 entries

The entire database requires about 24 MB of storage.

1.5.21.4. Dependencies

When Authorized Owner Database records or Valid Apparatus Database records are removed, all Authorized Individual records referencing them are removed.

1.5.22. Prior Fraud Database

1.5.22.1. Purpose

The Prior Fraud Database (PFD) is a collection of records representing individuals who have defrauded member issuers at some point in the past. The PFD also runs background transactions during periods of low system activity to weed out individuals in the IBD who have matching records in the PFD.

The system does not automatically put individuals in the PFD, unless it detects that they are attempting to register again. Placing an individual in the PFD is a sensitive policy matter which is outside the scope of this document.

1.5.22.2. Usage

Before a new IBD record is marked as active, the individual's primary and secondary biometrics are checked against each and every biometric in the PFD using the same biometric comparison techniques as those used in the individual identification procedure. If a match is found for the new IBD record, the IBD record's status is set to "prior fraud". If the prior fraud check was executed as part of a registration request, the GM logs a "registering individual with prior fraud" warning.

It is assumed that the PFD will remain relatively small. The cost to run the PFD is expensive, as it is an involuntary biometric search, so it is important to add only those individuals to the PFD who have imposed a significant cost to the system.

1.5.22.3. Database Schema

The schema for the Prior Fraud record is:

Prior Fraud:
primaryBiometric=biometric
secondaryBiometric=biometric
biometricId=int4
PIC=char10
phoneNumber=char12
lastName=char24
firstName=char24
middleInitial=char2
SSN=char9
privateSignal=char40
address=char50
zipCode=char9
publicKey=char64
checksums=int4[10]
accountLinks=char30[10]
emergencyIndex=char1
emergencyLink=char1
privs=char10
enroller=int8
emergencyUseCount=int4
status=int1

The status field is one of:
0: suspended
1: active
2: prior fraud

The PFD is keyed by biometric identification code.

1.5.22.4. Database Size

The PFD record is the same as the IBD record. Fortunately, the DPC needs to store a lot less of them so only two database machines are required to store the entire database, of which one is the backup.

1.5.22.5. Dependencies

The PFD does not have any direct dependencies on any other DPC component.

1.5.23. Issuer Database

1.5.23.1. Purpose

The Issuer Database (ID) stores information on banks and other financial institutions that allow their asset accounts to be accessed through the system. The issuing institutions are the only entities that can add or remove their asset account numbers to a given individual's IBD record.

1.5.23.2. Usage

The DPC uses the ID to validate requests from Issuer Terminals by searching the ID for a record containing the Issuer Terminal's issuer code. The owner Identification stored in the record must match up with the owner stored in the Valid Apparatus Database for the BIA stored in the Issuer Terminal.

The schema for the Issuer record is:

Issuer Record:
issuerCode=int6
ownerId=int4
name=char50
phoneNumber=char12
address=char50
zipCode=char9

The Issuer Database is keyed by issuerCode.

1.5.23.3. Database Size

The Issuer Database handles about 100,000 entries. Each entry is 127 bytes requiring less than 2 MB. A copy of the ID is stored on each GM.

1.5.23.4. Dependencies

The Issuer Database does not have any direct dependencies on any other DPC component.

1.5.24. Electronic Document Database

1.5.24.1. Purpose

The Electronic Document Database (EDD) stores and tracks electronic documents such as fax images and electronic mail messages destined for specified individuals. It also maintains corporate organizational charts to provide the official titles of both sender and receiver. The EDD also archives the documents at the sender or receiver's request and provides a neutral, third-party verification of contract agreements submitted through the system.

1.5.24.2. Usage

When the DPC receives a fax or other electronic document from an individual, it creates an EDD Document record to store the document until it is picked up by the authorized recipients.

For fax documents, the recipients are specified by fax number and extension. For other electronic documents, the recipients are specified by electronic mail address. The DPC looks up an Organization record for each recipient by fax number and extension or e-mail address. If the record cannot be found, then the DPC looks in the Individual Biometric Database but only if the recipient is specified by e-mail address. For each recipient, the DPC creates a Recipient record that references both the Document and the recipient's biometric Identification specified by the Organization or IBD record if found. The DPC allows recipients who are not registered in the system, but it cannot then ensure delivery or confidentiality for those recipients.

The EDD is flexible enough to allow fax documents to be sent to an individual's e-mail address and e-mail messages sent to a fax machine.

While no electronic signature is placed on the document by the system, the system does guarantee through encryption that the message as received (and decrypted) by the Certified Email or Secure Fax terminal was sent by the individual.

Duly authorized officers of the organization can submit secure faxes or electronic messages to the DPC to assign title and fax extensions to new members, to update a member's title or fax extension, or to remove terminated members.

When an individual is removed from the organization tree, the DPC retires the extension number for a period of one year. This retirement period allows the individual sufficient time to inform confidants that he can no longer receive confidential faxes at that extension and so that the organization cannot mistakenly activate someone else at the extension who might then otherwise receive faxes not intended for him or her.

The EDD maintains an archive database which contains copies of Document and Recipient records when requested by the sender or one of the recipients of the document. The archive database is periodically moved onto CD-ROM.

1.5.24.3. Database Schema

The EDD has three record types:
Document Record:
documentNumber=int8
senderId=int4
documentFax=fax
documentText=text
messageKey=int8
status=int1
Recipient Record:
documentNumber=int8
recipientId=int4
recipientFaxNumber=char12
recipientFaxExtension=char8
recipientEmailAddr=text
receivedBy=int4
lastModified=time
deliveryStatus=int1
contractStatus=int1
Archive Request Record:
biometricId=int4
documentNumber=int8
requestorFaxNumber=char12
requestorFaxExtension=char8
requestorEmailAddr=text
Organization Record:
biometricId=int4
registeredBy=int4
company=text
title=text
faxNumber=char12
faxExtension=char8
emailAddr=text
activeDate=time
privs=int2
status=int1
The Document record status field is one of:
0: incomplete
1: ok
The Recipient record delivery status field is one of:
0: incomplete
1: notified
2: rejected
3: retrieved
4: retrieved unsecured
5: busy
The Recipient record contract status field is one of:
0: none
1: accepted
2: rejected
The Organization record status field is one of:
0: active
1: suspended
The Organization record privs** field is used to indicate what privileges the DPC allows that individual:
0: registration The Document, Recipient, and Archive Retrieve records are keyed by documentNumber. The Organization records are keyed by biometricId. The EDD maintains secondary indexes on the Document senderId field, the Recipient recipientId field, and the Organization company name and title fields.

1.5.24.4. Database Size

The EDD's storage requirements depend primarily on the number of fax pages it will have to store since e-mail messages are relatively small compared to fax pages. Each fax page requires about 110 KB of storage. Assuming 4 pages per fax, 2 faxes per person per day, and 30 million fax machines, the EDD requires 24 GB of storage to spool one day's worth of faxes.

1.5.24.5. Security

Documents are sent to and from the system encrypted using the BIA encryption mechanism. However, the encryption key is stored in the same database as the document. The document is left in its encrypted form to prevent casual disclosure, but individuals concerned about security of documents stored on the system should make some arrangement for additional encryption themselves.

1.5.24.6. Message Bandwidth

Each fax page requires about 110 KB which means that a T1 connection, with a throughput of 1.54 MBits/second, can handle about 1.75 fax pages per second.

1.5.25. Electronic Signature Database 1.5.25.1. Purpose

The Electronic Signature Database (ESD) authenticates and tracks all electronic signatures created by the system.

1.5.25.2. Usage

Individuals who are members of the system submit a 16-byte "message digest" for the document along with biometric-PICs and obtain a "digital signature" which remains on file with the system in perpetuity. This digital signature encodes the individual's name, biometric identification code, the authorized signature record number, document title, along with the timestamp at which the document was signed.

To verify a signature, a message digest for the document are first calculated (using RSA's MD5 for instance) and sent along with the document's signature tags. The ESD looks up the signature tags and validates the just recently calculated message digest against the message digest stored in the database.

1.5.25.3. Database Schema

The schema for the Electronic Signature record is:
Electronic Signature:
signatureNumber=int8
signer=int4
documentName=text
checksum=int16
date=time
The signer is the biometric identification code for the individual signing the document. The electronic signature record is hashed by signatureNumber.

1.5.25.4. Database Size

For each 1 GB of secondary storage, the Electronic Signature Database stores 27 million records (each record is about 32 bytes).

1.5.25.5. Dependencies

The ESD has dependencies on the signer's biometric Identification. Since these signatures remain valid essentially forever, ESD records are not removed when the system deletes the signer's Individual Biometric Database record. Note that this requires the IBD to never reuse a biometric Identification.

1.5.26. Remote Merchant Database 1.5.26.1. Purpose

The Remote Merchant Database (RMD) stores information on merchants that provide goods or services over telephones, cable television networks, or the Internet. Each order sent by an individual using a properly-equipped terminal is routed through the merchant's order terminal to the system.

1.5.26.2. Usage

Once an individual's remote transaction authorization is received and the MAC validated by the DPC, the merchant code is compared against the merchant code in the RMD. The merchant code, be it phone number, merchant-product credential, or internet address, exists in the RMD record under the correct merchant identification code or the DPC terminates the request and returns an invalid merchant code error to the sending BIA terminal device.

1.5.26.3. Database Schema

The schema for the Remote Merchant record is:
Remote Merchant:
merchantId=int4
merchantCode=char16
merchantType=int1
publicKey=int16

The Remote Merchant merchantType is one of:
0: telephone
1: CATV
2: Internet

The merchantId and merchantCode are both primary keys. No two RMD records have the same merchantId and merchantCode combination.

1.5.26.4. Database Size

Assuming about 100,000 remote merchants, the RMD requires about 24 bytes per record for a total of about 2.4 MB storage required.

1.5.26.5. Dependencies

The RMD does not have any direct dependencies on any other DPC components.

1.5.27. System Performance

The key performance number is how many financial authorization transactions the DPC handles per second.

In GM:
1. MACM checks the MAC (local)
2. SNM checks the sequence number (network message)
3. MDM decrypts the biometric-PIC block (local)
4. Find IBD machine (local)
5. Send identify request to the IBD machine (network message)

In IBD machine:
6. Retrieve all IBD records for the PIC (x seeks and x reads, where x is the number of pages required to store the biometric records).
7. For each record, compare against its primary biometric (y/2 ms where y is the number of records retrieved).
8. If no reasonable match, repeat step 9 but compare against the secondary biometric (z*y/2 ms, where y is the number of records retrieved and z is the probability no match is found).
9. Update the best matching IBD record's checksum queue and check for possible replay attacks (1 seek, 1 read, and 1 write).
10. Return the best matching IBD record or an error if the match is not close enough (network message).

In GM:
11. Authorize request with an external processor (network message)
12. GM encrypts and MACs the response (local).
13. Sends response packet back (network message).

$$x*(s+r) + y/2*(1+z) + g + r + w + 5*n$$

$$= (x+1)*(x+r) + y/2*(1+z) + w + 5*n$$

[assume $x$ is 20, $y$ is 30, $z$ is 5%;

$s = 10$ ms, $r = 0$ ms, $w = 0$ ms, $n = 0$ ms]

$= 21*10$ ms $+ 15*1.05$ ms $= 226$ ms $= 4.4\ TPS$

[assume $x$ is 10, $y$ is 15, $z$ is 5%;

$s = 10$ ms, $r = 0$ ms, $w = 0$ ms, $n = 0$ ms]

$= 11*10$ ms $+ 7.5*1.05$ ms $= 118$ ms $= 8.4\ TPS$

[assume $x$ is 1, $y$ is 1, $z$ is 5%;

$s = 10$ ms, $r = 0$ ms, $w = 0$ ms, $n = 0$ ms]

$= 2*10$ ms $+ 1/2*1.05$ ms $= 21$ ms $= 47\ TPS$

The backup IBD machine also processes requests doubling effective TPS.

Worst case (with 2 machines in use):

| Individuals per PIC | TPS |
|---|---|
| 30 | 8 |
| 15 | 16 |
| 1 | 94 |
| Average case (with 20 machines in use): | |
| 30 | 88 |
| 15 | 168 |
| 1 | 940 |
| Best case (with 40 machines in use): | |
| 30 | 176 |
| 15 | 336 |
| 1 | 1880 |

The above is just an example of one configuration of the system as it could be implemented in a commercially viable manner. However, it is anticipated that this invention can be configured in many other ways which could incorporate the use of faster computers, more computers and other such changes.

1.6. Terminal Protocol Flowchart

The following set of protocol flows describe interactions between specific terminals, the DPC, the attached BIA, and other parties such as the credit/debit processor, and so on.

1.6.1. Retail Point of Sale Terminal

In this case, an RPT communicates with a retail BIA and the DPC to authorize a transaction. The transaction mount is 452.33, the individual's account is 4024-2256-5521-1212 merchant code is 123456, and the individual's private code is "I am fully persuaded of it."

RPT→BIA Set Language <English>
BIA→RPT Ok

RPT→BIA Get Biometric <20>
BIA/LCD:<Please place finger on lighted panel>
Individual places finger on scanner
BIA→RPT Ok
RPT→BIA Get Pin <40>
BIA/LCD: <Please enter your PIC, then press <enter>>
Individual enters PIC, then <enter>
BIA→RPT Ok
RPT→BIA Get Account Number <40>
BIA/LCD: <Now enter your account index code, then press <enter>>
Individual enters code, then <enter>
BIA→RPT Ok
RPT→BIA Validate Amount <452.33> <40>
BIA/LCD: <Amount 452.33 OK?>
Individual enters OK
BIA→RPT Ok
RPT→BIA Assign Register <1> <123456>
BIA→RPT Ok
RPT→Form Message <transaction>
BIA→RPT<Transaction Request Message>
BIA→RPT OK
BIA/LCD: <I'm talking to DPC Central>
RPT→DPC <Transaction Request Message>
DPC: validate biometric, retrieve account number→4024-2256-5521-1212
DPC→VISA <authorize 4024-2256-5521-1212 452.33 123456>
VISA→DPC <ok 4024-2256-5521-1212 452.33 123456 autho-code>
DPC: get private code
DPC→RPT <Transaction Response Message>
RPT→BIA Show Response <Transaction Response Message> <8>
BIA/LCD: <Transaction ok: I am fully persuaded of it>
BIA→RPT <Ok <autho-code>>
RPT: prints receipt with autho-code on it 1.6.2. Internet Point of Sale Terminal In this case, an IPT communicates with a standard BIA and the DPC to authorize a transaction. The transaction mount is 452.33, the individual's account is 4024-2256-5521-1212, the Internet merchant is located at merchant.com, his merchant code is 123456, and the individual's private code is "I am fully persuaded of it."

IPT→merchant.com <send me merchant code if resources available>
merchant.com→IPT <ok 123456 merchant.com-public-key>
IPT generates session key, encrypted with merchant.com-public-key
IPT→merchant.com <session key>
All subsequent communications with merchant are encrypted with session key. merchant.com→IPT <price and product information>
IPT/Screen: displays price and product information
Individual: selects item "fruitcake, price 45.33"
IPT→BIA Set Language <English>
BIA→IPT Ok
IPT→BIA Get Biometric <20>
BIA/LCD: <Please place finger on lighted panel>
Individual places finger on scanner
BIA→IPT Ok
IPT→BIA Get Pin <40>
BIA/LCD: <Please enter your PIC, then press <enter>>
Individual enters PIC, then <enter>
BIA→RPT Ok
IPT/BIA Get Account Number <40>
BIA/LCD: <Now enter your account index code, then press <enter>>
Individual enters code, then <enter>
BIA→IPT Ok
IPT→BIA Validate Amount <45.33> <40>
BIA/LCD: <Amount 45.33 OK?>
Individual enters OK
BIA→PT Ok
IPT→BIA Assign Register <1> <123456>
BIA→IPT Ok
IPT→BIA Assign Register <2> <merchant.com>
BIA→IPT Ok
IPT→BIA Assign Register <3> <fruitcake>
BIA→IPT Ok
IPT→BIA Form Message <remote transaction>
BIA→IPT <Remote Transaction Request Message>
BIA→IPT OK
BIA/LCD: <I'm talking to DPC Central>
IPT→merchant.com <Remote Transaction Request Message>
merchant.com→secure-connect to DPC using DPC public key
merchant.com→DPC <Remote Transaction Request Message>
DPC: validate biometric, retrieve account numbers→4024-2256-5521-1212
DPC: validate interact merchant.com with code 123456
DPC→VISA <authorize 4024-2256-5521-1212 45.33 123456>
VISA→DPC <ok 4024-2256-5521-1212 45.33 123456 autho- code>
DPC: get private code
DPC→merchant.com <Transaction Response Message>
merchant.com stores autho code
merchant.com→IPT <Transaction Response Message>
IPT→BIA Show Response <Transaction Response Message> <8>
BIA/LCD: <Transaction ok: I am fully persuaded of it>
BIA→IPT <Transaction ok>

1.6.3. Internet Teller Terminal

In this case, an ITT communicates with a standard B IA, the DPC, and a bank's interact server to perform routine and nonroutine home banking operations. Note that the DPC isn't involved in actually validating any transactions, but is only responsible for creating a valid set of network credentials and securing the communications line to the bank.

ITT→bank.com <send me bank code if resources available>
bank.com→FIT <ok 1200>
ITT→BIA Set Language <English>
BIA→ITT Ok
ITT→BIA Get Biometric <20>
BIA/LCD: <Please place finger on lighted panel>
Individual places finger on scanner
BIA→ITT Ok
ITT→BIA Get Pin <40>
BIA/LCD: <Please enter your PIC, then press <enter>>
Individual enters PIC, then <enter>
BIA→FIT Ok
RPT→BIA Get Account Number <40>
BIA/LCD: <Now enter your account index code, then press <enter>>
Individual enters code, then <enter>
BIA→ITT Ok
ITT→BIA Assign Register <1> <1200>(bank code)
BIA→ITT Ok
ITT→BIA Assign Register <2> <bank.com>

BIA→ITT Ok
ITT→BIA Assign Register <3> <ITT.port, bank.com-
.port>(TCP/IP addresses)
BIA→ITT Ok
ITT→Form Message <net credential>
BIA→ITT <network credential Request>
BIA→ITT Ok
BIA/LCD: <I'm talking to DPC Central>
ITT→DPC <network credential Request>
DPC: validate biometric, create credential(time, acct, bank)
DPC: get private code
DPC→ITT <network credential Response>
ITT→BIA Show Response <network credential Response>
BIA decrypt response, check response
BIA/LCD: <Credential ok: I am fully persuaded of it>
BIA encrypt credential, session key, challenge key with bank's public key
BIA→ITT <Secure Connection Request Message>
BIA→ITT <Session Key>
BIA→ITT Ok
BIA/LCD: <Secure connection to bank.com in progress>
ITT→bank.com <Secure Connection Request Message>
bank.com decrypt with private key, validate credential, use shared key
bank.com→ITT <ok>
Further transactions over the ITT→bank.com connections are all encrypted by the ITT using the ITT/bank session key.
Any transactions that the bank determines are non-routine must be validated by the individual using the BIA's challenge-response mechanism.
The challenge-response mechanism is available only while the BIA remains in the "secure connection" state.
bank.com→ITT <validate <validation request>>
ITT→BIA Validate Private <encrypted validation request>
BIA decrypts challenge section, and displays it
BIA/LCD: <Please OK: transfer of 12,420.00 to 1023-3302-2101-1100>
Individual enters Ok
BIA re-encrypts response using challenge key
BIA /LCD: <Secure connection to bank.com in progress>
BIA→ITT <Ok <encrypted validation response>>
ITT→bank.com <encrypted validation response>
1.6.4. Electronic Signature Terminal
In this case, an EST communicates with a standard BIA and the DPC to construct digital signatures. The individual's private code is "I am fully persuaded of it" and the document to be signed is called "The Letter of Marque."
CET→BIA Set Language <English>
BIA→CET Ok
CET→BIA Get Biometric <20>
BIA/LCD: <Please place finger on lighted panel>
Individual places finger on scanner
BIA→CET Ok
CET→BIA Get Pin <40>
BIA/LCD: <Please enter your PIC, then press <enter>>
Individual enters PIC, then <enter>
BIA→CET Ok
CET→BIA Validate Document <Letter of Marque> <40>
BIA/LCD: <Document "Letter of Marque" OK?>
Individual enters OK
BIA→CET Ok
CET→BIA Assign Register <1> <document MD5 value>
BIA→CET Ok
CET→Form Message <signature submit>
BIA→CET <Electronic Signature Request>
BIA→CET OK
BIA/LCD: <I'm talking to DPC Central>
CET→DPC <Electronic Signature Request>
DPC: validate biometric, create signature, return sig text code
DPC: get private code
DPC→CET <Electronic Signature Response>
CET→BIA Show Response <Electronic Signature Response> <8>
BIA/LCD: <Document ok: I am fully persuaded of it>
BIA→CET <Ok <sig text code>>
1.6.5. Certified Email Terminal
In this case, a CET communicates with a standard BIA and the DPC to transmit certified electronic mail. The individual's private code is "I am fully persuaded of it", and the document name is "Post Captain."
CET→BIA Set Language <English>
BIA→CET Ok
CET→BIA Get Biometric <20>
BIA/LCD: <Please place finger on lighted panel>
Individual places finger on scanner
BIA→CET Ok
CET→BIA Get Pin <40>
BIA/LCD: <Please enter your PIC, then press <enter>>
Individual enters PIC, then <enter>
BIA→CET Ok
CET→BIA Validate Document <Post Captain> <40>
BIA/LCD: <Document "Post Captain" OK?>
Individual enters OK
CET/Screen: <Recipient list?>
Individual enters <fred@telerate.com joe@reuters.com>
CET→BIA Assign Register <1> <fred@telerate.com joe@reuters.com>
BIA→CET Ok
CET→Form Message <document submit>
BIA→CET <Electronic Document Submit Request>
BIA→CET OK
BIA/LCD: <I'm talking to DPC Central>
CET→DPC <Electronic Document Submit Request>
DPC: validate biometric, create message, return message #001234
DPC: get private code
DPC→CET <Electronic Document Submit Response>
CET→BIA Show Response <Electronic Document Submit Response> <8>
BIA/LCD: <Document ok: I am fury persuaded of it>
BIA→CET <Document ok <1234>>
CET→DPC <Electronic Document Data Request, 1234, section 1, incomplete>
DPC→CET <Electronic Document Data Response, incomplete>
CET→DPC <Electronic Document Data Request, 1234, section 2, incomplete>
DPC→CET <Electronic Document Data Response, incomplete>
CET→DPC <Electronic Document Data Request, 1234, section 3, incomplete>
DPC→CET <Electronic Document Data Response, incomplete>
CET→DPC <Electronic Document Data Request, 1234, section 4, done>
DPC→CET <Electronic Document Data Response, track 1234.1 1234.2>
DPC→fred@telerate.com <email 1234.1 message arrived>
DPC→joe@reuters.com <email 1234.2 message arrived> mailer@telerate.com→DPC <received notification email for 1234.1>
DPC→sender@company.com <email 1234.1 recipient notified>
mailer@reuters.com→DPC <received notification email for 1234.2>
DPC→sender@company.com <email 1234.2 recipient notified>
[At Fred's CET: Fred sees the "message arrived" electronic mail message, and decides to go pick up the message]
CET→BIA Set Language <English>
BIA→CET Ok
CET→BIA Get Biometric <20>
BIA/LCD: <Please place finger on lighted panel>
Individual places finger on scanner
BIA→CET Ok
CET→BIA Get Pin <40>BIA/LCD: <Please enter your PIC>
Individual enters PIC, then <enter>
BIA→CET Ok
CET→BIA Assign Register <1> <1234.1>
BIA→CET Ok
CET→Form Message <document retrieve>
BIA→CET <Electronic Document Retrieve Request>
BIA→CET OK
BIA/LCD: <I'm talking to DPC Central>
CET→DPC <Electronic Document Retrieve Request>
DPC validate biometric, lookup 1234.1
DPC get private code
DPC→CET <Electronic Document Retrieve Response>
CET→BIA Show Response <Electronic Document Retrieve Response> <8>
BIA/LCD: <Document ok: I am fully persuaded of it>
BIA→CET <Document ok <message key>>
CET/Screen: decrypt, then show document 1.6.6. Secure Fax Terminal In this case, a SFT communicates with an BIA/catv and the DPC to transmit secure faxes.
SFT→BIA Get Biometric <20>
BIA/CD: <Please place finger on lighted panel>
Individual places finger on scanner
BIA→SFT Ok
BIA/LCD: <Please enter your PIC, then press <enter>>
Individual enters PIC, then <enter>
SFT→BIA Set Pin <40>
BIA/LCD: <Please enter your Title Index, then press <enter>>
Individual enters title index, then <enter>
SFT→BIA Set Title Index Code <40>
BIA→SFT Ok
SFT/Screen: <Recipient? (add * for ext, # at end)>
Individual enters <1 510 944-6300*525#)
SFT/Screen: <Recipient? (add * for ext, # at end)>
Individual enters <1 415-877-7770#>
SFT/Screen: <Recipient? (add * for ext, # at end)>
Individual enters <#>
SFT→BIA Assign Register <1><15 109446300*525 14158777770>
BIA→SFT Ok
SFT→Form Message <document submit>
BIA→SFT <Secure Fax Submit Request>
BIA→SFT OK
BIA/LCD: <I'm talking to DPC Central>
SFT→DPC <Secure Fax Submit Request>
DPC: validate biometric, create message, return message #001234
DPC: get private code
DPC→SFT <Secure Fax Submit Response>
SFT→BIA Show Response <Secure Fax Submit Response> <10>
BIA/LCD: <Document ok: I am fully persuaded of it>
BIA→SFT <Document ok <001234>>
SFT→DPC <Secure Fax Data Request, 1234, section 1, incomplete>
DPC→SIT <Secure Fax Data Response, incomplete>
SFT→DPC <Secure Fax Data Request, 1234, section 2, incomplete>
DPC→SFT <Secure Fax Data Response, incomplete>
SFT→DPC <Secure Fax Data Request, 1234, section 3, incomplete>
DPC→SFT <Secure Fax Data Response, incomplete>
SFT→DPC <Secure Fax Data Request, 1234, section 4, done>
DPC→SFT <Secure Fax Data Response>
DPC→connect-fax 15109446300
DPC→SFT6300 <fax-cover "Sam Spade" from "Fred Jones" 1234.1 4 pages waiting>
DPC→disconnect
DPC→connect-fax 14158777770
DPC→SFT7770 <fax-cover "John Jett" from "Fred Jones" 1234.2 4 pages waiting>
DPC→disconnect
[At Sam's SFT: Sam sees document fax cover arrive from Fred, initiates retrieval of document from DPC using tracking code 1234.1.]
SFT→BIA Get Biometric <20>
BIA/LCD: <Please place finger on lighted panel>
Individual (Sam) places finger on scanner
BIA→SFT Ok
SFT→BIA Get Pin <40>
BIA/LCD: <Please enter your PIC, then press <enter>>
Individual (Sam) enters PIC, then <enter>
BIA→SFT Ok
SFT→BIA Assign Register <1> <1234.1>
BIA→SFT Ok
SFT→Form Message <document retrieve>
BIA→SFT <Secure Fax Retrieve Request>
BIA→SFT OK
BIA/LCD: <I'm talking to DPC Central>
SFT→DPC <Secure Fax Retrieve Request>
DPC: validate biometric, lookup 1234.1, verify biometric-PIC=Sam Spade
DPC: lookup private code in database
DPC→SFT <Secure Fax Retrieve Response>
SFT→BIA Show Response <Secure Fax Retrieve Response> <8>
BIA→SFT <Document ok: I am fully persuaded of it <message key>>
SFT/Screen: <Document ok: I am fully persuaded of it>
SFT/Screen: print fax 1.6.7. Biometric Registration Terminal In this case, a BRT communicates with a registration BIA and the DPC to register an individual with the system.
BRT→BIA Set Language <English>
BIA→BRT Ok
BRT→BIA Get Biometric <20> <primary>
BIA/LCD: <Please place PRIMARY finger on lighted panel>
Individual places primary finger on scanner
BIA→BRT Ok
BRT→BIA Get Biometric <20> <secondary>
BIA/LCD: <Please place SECONDARY finger on lighted panel>

Individual places secondary finger on scanner
BIA→BRT Ok
BRT→BIA Get Pin <40>
BIA/LCD: <Please enter your PIC, then press <enter>>
Individual enters 123456, then <enter>
BIA→BRT Ok
BRT→BIA Get Message Key
BIA→BRT <Ok <message key>>
BIA→<Registration Request Message>
BRT/Screen: <Name:>
Representative enters <Fred G. Shultz>
BRT/Screen: <Address:>
Representative enters <1234 North Main>
BRT/Screen: <Zipcode:>
Representative enters <94042>
BRT/Screen: <Private code:>
Representative queries individual, then enters <I am fully persuaded of it.>
BRT/Screen: <Asset account list:>
Representative enters <2, 1001-2001-1020-2011>(credit card)
Representative enters <3, 1001-1002-0039-2212>(checking account)
BRT/Screen: <Emergency account:>
Representative enters <1, 1001-1002-0039-2212>(emergency, checking account)
BRT→Form Message <registration>
BIA→BRT <Registration Request Message>
BIA→BRT OK
BIA/LCD: <I'm talking to DPC Central>
BRT appends message-key-encrypted personal information to request
BRT→DPC Registration Request Message> <encrypted personal information>
DPC: verify PIC 123456
DPC→BRT <Registration Response Message>
BRT→BIA Show Response <Registration Response Message> <8>
BIA/LCD: <Registration ok: I am fully persuaded of it, 123456>
BIA→BRT <Ok>

1.6.8. Customer Service Terminal

In this case, a CST communicates with a standard BIA and the DPC to verify the identity and the credentials of an individual.
CST→BIA Set Language <English>
BIA→CST Ok
CST→BIA Get Biometric <20>
BIA/LCD: <Please place finger on lighted panel>
Individual places finger on scanner
BIA→CST Ok
CST→BIA Get Pin <40>
BIA/LCD: <Please enter your PIC, then press <enter>>
Individual enters PIC, then <enter>
BIA→CST Ok
CST→BIA Get Message Key
BIA→CST <Ok <message key>>
CST→Form Message <Individual Identity Request>
BIA→CST <Individual Identity Request>
BIA→CST OK
BIA/LCD: <I'm talking to DPC Central>
CST→DPC <Individual Identity Request>
DPC: get private code, individual's priv
DPC→CST <Individual Identity Reply>
CST→BIA Show Response <Individual Identity Reply> <8>
BIA/LCD: <Identity ok: I am fully persuaded of it>
BIA→CST <Ok <individual-name priv>>
CST: check priv to see if sufficient for CST use 1.6.9. Issuer Terminal In this case, an IT communicates with a standard BIA and the DPC to authorize and send a batch of account addition and deletion requests to the DPC. The individual's private code is "I am fully persuaded of it", and the bank code is 1200.
IT→BIA Set Language <English>
BIA→IT Ok
IT→BIA Get Biometric <20>
BIA/LCD: <Please place finger on lighted panel>
Individual places finger on scanner
BIA→IT Ok
IT→BIA Get Pin <40>
BIA/LCD: <Please enter your PIC, then press <enter>>
Individual enters PIC, then <enter>
BIA→IT Ok
IT→BIA Assign Register <1> <1200>
BIA→IT Ok
IT→BIA Get Message Key
BIA→IT <message key>
BIA→IT Ok
IT→BIA Form Message <issuer request>
BIA→IT <Issuer Batch Request>
BIA→IT OK
BIA/LCD: <I'm talking to DPC Central>
IT→DPC <Issuer Batch Request> <message-key-encrypted issuer batch>
DPC: validate biometric, validate bank code 1200 vs. BIA identification
DPC: get private code
DPC: decrypt message using message key, execute issuer batch
DP→IT <Issuer Batch Reply>
IT→BIA Show Response <Issuer Batch Reply> <8>
BIA/LCD: <Batch ok: I am fully persuaded of it>
BIA→IT <Ok>

1.6.10. Automated Teller Machinery

In this case, an ATM communicates with an integrated ATM BIA and the DPC to identify an individual and obtain his bank account number. The individual's account is 2100-0245-3778-1201, bank code is 2100, and the individual's private code is "I am fully persuaded of it."
ATM→BIA Get Biometric <20>
ATM/LCD: <Please place finger on lighted panel>
Individual places finger on scanner
BIA→ATM Ok
ATM/LCD: <Please enter your PIC, then press <enter>>
Individual enters 123456 on ATM keyboard, then <enter>
ATM→BIA Set Pin <123456>
BIA→ATM Ok
ATM/LCD: <Now enter your account index code, then press <enter>>
Individual enters 2, then <enter>
ATM→BIA Set Account Index Code <2>
BIA→ATM Ok
ATM→BIA Assign Register <1> <2100>
BIA→ATM Ok
ATM→Form Message <account access>
BIA→ATM <Account Access Request Message>
BIA→ATM OK
ATM/LED: <I'm talking to DPC Central>
ATM→DPC <Account Access Request Message>
DPC: validate biometric, retrieve account numbers 2100-0245-3778-1201
DPC: get private code DPC→ATM <Account Access Response Message>
ATM→BIA Decrypt Response <Account Access Response Message>
BIA→ATM <2100-0245-3778-1201> <no emergency> <I am fully persuaded of it>
ATM/LCD: <I am fully persuaded of it>

At this point, the ATM has the account number it needs to continue, so it then retrieves the information associated with the account number, and commences interacting with the individual.

1.6.11. Phone Point of sale Terminal

In this case, a PPT communicates with an integrated phone BIA and the telephone merchant to download information and purchase items securely using the telephone. The individual's PIC is 1234, the account index code is 1, the merchant's phone number is 1 800 542-2231, merchant code 123456, and the actual account number is 4024-2256-5521-1212.

Note that the telephone strips the area code (1-800) from the telephone number before handing it to the system.

Individual dials phone 18005422231
PPT→connect merchant 18005422231
PPT→BIA Assign Register 1 <5422231>
Sales rep answers. Individual selects item "fruitcake". Sales rep downloads info.
merchant→PPT <123456 fruitcake 43.54>
PPT→BIA Get Biometric <20>
Phone/LCD: <Please place finger on lighted panel>
Individual places finger on scanner
BIA→PPT Ok
Phone/LCD: <Please enter your PIC, then press #>
Individual enters 1234 on keypad, then # or * (enter)
PPT→BIA Set Pin <1234>
BIA→PPT Ok
Phone/LCD: <Now enter your account index code>
Individual enters 1, then <enter>
RPT→BIA Set Account index code <1>
BIA→PPT Ok
RPT→BIA Assign Register <2> <123456>
BIA→PPT Ok
Phone/LCD: <Press # if amount 45.54 is ok>
Individual enters # (yes)
IPPT→BIA Set Amount <43.54>
BIA→PPT Ok
PPT→Form Message <remote transaction>
BIA→PPT <Remote Transaction Request>
BIA→PPT Ok
Phone/LCD: <I'm talking to DPC Central>
PPT→merchant <Phone Transaction Request>
merchant→DPC secure-connect to DPC using DPC-public-key
merchants→DPC <Phone Transaction Request>
DPC: validate biometric, retrieve account numbers 4024-2256-5521-1212
DPC: validate merchant 5422231 has erode 123456
DPC→VISA <authorize 4024-2256-5521-1212 43.54 123456>
VISA→DPC <ok 4024-2256-5521-1212 43.54 123456 autho-code>
DPC: get private code
DPC→merchant <Transaction Response Message>
merchant examines response code
merchants→PPT <Transaction Response Message>
PPT→BIA Decrypt Message <Transaction Response Message>
BIA→PPT <Ok <I am fully persuaded of it> <autho-code>>
Phone/LCD: <chime>Transaction ok: I am fully persuaded of it 1.6.12. Cable-TV Point of sale Terminal In this case, a CPT communicates with an integrated cable-tv BIA and the Cable television merchant to download information and purchase items securely using the cable television broadband network. The individual's PIC is 1234, the account index code is 1, the channel is 5, the merchant code 123456, and the actual account number is 4024-2256-5521-1212.

Individual turns the television to channel 5.
merchant→CPT <fruitcake 43.54 123456> (broadcast)
Individual hits "buy" on TV Remote
CPT/TV: <Buying fruitcake for $43.54>
CPT→BIA Get Biometric <20>
CPT/TV: <Please place finger on lighted panel>
Individual places finger on scanner
BIA→CPT Ok
CPT/TV: <Please enter your PIC, then press <enter>>
Individual enters 1234 on keypad, then "buy"
CPT→BIA Set Pin <1234>
BIA→CPT Ok
CPT/TV: <Now enter your account index code>
Individual enters 1, then <enter>
RPT→BIA Set Account index code <1>
BIA→CPT Ok
RPT→BIA Assign Register <1> <channel 5, 15:30:20 PST>
BIA→RPT Ok
CPT→BIA Assign Register <2> <123456>
BIA→CPT Ok
CPT/TV: <Press "buy" if amount 45.54 is ok>
Individual enters "buy"
CPT→BIA Set Amount <43.54>
BIA→CPT Ok
CPT→Form Message <CableTV transaction>
BIA→CPT <CableTV Transaction Request>
BIA→CPT Ok
CPT/TV: <I'm talking to DPC Central>
CPT→CTV Center <CableTV Transaction Request>
CTV Center→merchant <CableTV Transaction Request>
merchant→DPC secure-connect to DPC using DPC-public-key
merchant→DPC <CableTV Transaction Request>
DPC: validate biometric, retrieve account number→4024-2256-5521-1212
DPC: validate merchant channel 5, current show has code 123456
DPC→VISA <authorize 4024-2256-5521-1212 43.54 123456>
VISA→DPC <ok 4024-2256-5521-1212 43.54 123456 autho-code>
DPC: get private code, mailing address
DPC→merchant <Transaction Response Message>
merchant examines response code, records mailing address
merchant→CTV Center <Transaction Response Message>
CTV Centers CPT <Transaction Response Message>
CPT→BIA Decrypt Message <Transaction Response Message>
BIA→CPT <Ok <I am fully persuaded of it> <autho-code>>
CPT/TV: <chime>Transaction ok: I am fully persuaded of it From the foregoing, it will be appreciated how the objects and features of the invention are met.

First, the invention provides a computer identification system that eliminates the need for a user to possess and present a physical object, such as a token, in order to initiate a system access request.

Second, the invention provides a computer identification system that is capable of verifying a user's identity, as opposed to verifying possession of proprietary objects and information.

Third, the invention verifies the user's identity based upon one or more unique characteristics physically personal to the user.

Fourth, the invention provides an identification system that is practical, convenient, and easy use.

Fifth, the invention provides a system of secured access to a computer system that is highly resistant to fraudulent access attempts by non-authorized users.

Sixth, the invention provides a computer identification system that enables a user to notify authorities that a particular access request is being coerced by a third party without giving notice to the third party of the notification.

Seventh, the invention provides an identification system that allows for identification of the sender and recipient of an electronic message and/or facsimile.

Although the invention has been described with respect to a particular tokenless identification system and method for its use, it will be appreciated that various modifications of the apparatus and method are possible without departing from the invention, which is defined by the claims set forth below.

5. GLOSSARY

ACCOUNT INDEX CODE

A digit or an alpha-numeric sequence that corresponds to a particular financial asset account

AID:

Authorized Individual Database: contains the list of individuals authorized to use personal and issuer BIA devices.

AOD:

Apparatus Owner Database: central repository containing the geographic and contact information on the owner of each BIA.

ASCII:

American Standard Code for Information Interchange

ATM:

Automated Teller Machinery; uses encoded biometric identity information to obtain access to a financial asset management system, including cash dispensing and account management.

BIA:

Biometric input apparatus; collects biometric identity information, encodes and encrypts it, and makes it available for authorizations. Comes in different hardware models and software versions.

Biometric:

A measurement taken by the system of some aspect of an individual's physical person.

Biometric ID:

An identifier used by the system to uniquely identify an individual's biometric record (IRID—Individual Record ID)

BIO-PIC GROUP:

A collection of algorithmically dissimilar biometric samples linked to the same personal identification code

BRT:

Biometric Registration Terminal; located at retail banking outlets, BRTs combine biometric registration information with an individual-selected PIN and selected personal information to register individuals with the system.

CBC:

Cipher Block Chaining: an encryption mode for the DES.

CCD:

Charged-Coupled Device

CET:

Certified Email Terminal; uses BIA to identify sender, encrypts document, sends to system. System retains, notifies recipient of message arrival in-system Recipient identifies self, and then document is transmitted to recipient. Notification to transmitter once document is sent. Document is verified sent, secured by BIA encryption. Transmitter may inquire as to delivery status. Both participants must be system members.

COMMANDS:

A program or subroutine residing in the DPC that performs a specific task, activated by a request message sent from a BIA-equipped terminal.

CONTRACT ACCEPT/REJECT:

The process by which an individual enters their BIO-PIC and instructs the DPC to register said individual's contractual acceptance or rejection of the terms contained within a document which had been sent by electronic facsimile to that individual.

CPT:

Cable-TV Point-of-Sale Terminal: combines an onscreen display simulcast digital signal informing TV-top cable box of product information with product video, and an BIA controller remote which performs the biometric-pin validation using the CATV communications network. Order/autho/mailing-address/item-id forwarded to merchant. Results of authorization are displayed on the TV.

CST:

Customer Service Terminals; provide system customer service personnel with varying degrees of access (based on access privilege) the ability to retrieve and modify information on individuals in order to help people with account problems.

DATA SEALING STEP:

The conversion of plain text to cipher text (known as "encryption") in combination with the encrypted checksumming of a message that allows information to remain in plain text while at the same time providing a means for detecting any subsequent modification of the message.

DES:

Digital Encryption Standard: a standard for the cryptographic protection of digital data. See standard ANSI X3.92-1981

DETERMINATION:

The status of the command processed during the execution step.

DPC:

A data processing center, namely, the place and the entity where the hardware, software, and personnel are located with the goal of supporting a multigigabyte biometric identity database. A DPC processes electronic messages, most of which involve performing biometric identity checks as a precursor to performing some action, such as a financial transfer, or sending a fax, or sending electronic mail, etc.

DSP:

Digital Signal Processor: a class of integrated circuits that specialize in the mathematical operations required by the signal processing applications.

DUKPT:

Derived Unique Key Per Transaction: See standard ANSI/ABA X9.24-1992

EDD:

Electronic Document Database: central repository containing all pending faxes and electronic messages awaiting pickup by individuals.

EMERGENCY ACCOUNT INDEX:

The alpha-numeric digit or sequence selected by an individual which, when accessed, will result in a transaction being labeled by the system as an emergency transaction, potentially causing the display of false screens and/or the notification of authorities that said individual has been coerced into performing a transmission or transaction.

ESD:

Electronic Signature Database: central repository containing all MD5 and electronic signatures of all documents signed by anybody, referenced by authorization number.

EST:

Electronic Signature Terminal; uses BIA to identify individual, computer calculates checksum on document, sends checksum to system, system validates, timestamps, saves checksum, and returns with sig code. Uses Internet as transport. EST also verifies signatures given a sig code and an MD5 calculation.

FAR (False Accept Rate):

The statistical likelihood that one individual's biometric will be incorrectly identified as the biometric of another individual.

FALSE SCREENS:

Displays of information which has been intentionally pre-determined to be subtly inaccurate such that a coercing party will not illegally obtain accurate data about an individual's financial assets, all the while remaining unaware of the alteration of the information.

FDDI:

Fiber Digital Device Interface: a networking device that utilizes a fiber optic token ring.

FS:

Field Separator

FW:

Firewall Machine: the internet-local net router that regulates traffic into and out of the DPC.

GM:

Gateway Machine: the main processing computers in the DPC; runs most of the software.

IBD:

Individual Biometric Database: central repository for biometric, financial asset, and other personal information. Queries against the biometric database are used to verify identity for transaction authorizations and transmissions.

ID:

Issuer Database: central repository containing the institutions that are allowed to add and delete financial asset account numbers with the system.

IML:

IBD Machine List: a software module in the DPC determines which IBD machines are responsible for which PIN codes.

INTERNET MERCHANT:

A retail account selling services or good to consumers by means of the Internet electronic network

IPT:

Internet Point-of-Sale Terminal: items and merchant code from the internet, BIA biometric-PIN for validation, sent to system using Internet, autho/order/PO # forwarded to merchant. System response using internet as well, displaying results on screen.

ISSUER:

A financial account issuer for financial assets to be registered with the DPC.

ISSUER BATCH:

A collection of "add" and "delete" instructions complete with biometric IDs, financial asset accounts, and account index codes verified and submitted by an issuer to the DPC.

IT

Issuer Terminals; provides a batch connection to the system for issuers to add and remove (their own) financial asset account numbers from specific individual's IBD records.

ITT:

Internet Teller Terminal; authorizes network terminal session using encrypted credential obtained from DPC using biometric ID.

LCD:

Liquid Crystal Display: a technology used for displaying text.

MAC:

Message Authentication Code: an encrypted checksum algorithm, the MAC provides assurance that the contents of a message have not been altered subsequent to the MAC calculation. See standard ANSI X9.9-1986

MACM:

Message Authentication Code Module: a software module in the DPC that handles MAC validation and generation for inbound and outbound packets.

MDM:

Message Decrypt Module: a software module in the DPC that encrypts and decrypts packets from or destined to an BIA device.

MPM:

Message Processing Module: a software module in the DPC that performs the processing of request packets.

NETWORK CREDENTIAL:

Both the individual and the bank are identified by the DPC to create the network credential. The credential includes the individual's identification as well as the context of the connection (i.e., the TCP/IP source and destination ports). DPC creates a network credential using the individual's account id, the time of day, and the bank code. The DPC signs this credential using Public Key Encryption and the DPC's Private Key.

PFD:

Prior Fraud Database: central repository for IBD records which have had prior fraud associated with them. Every new customer's biometrics are checked against all PFD records with the intent of reducing recidivism.

PGL:

PIN Group List: a software module in the DPC that is responsible for maintaining the configuration of the IBD machines.

PIN:

Personal Identification Number; a method for protecting access to an individual's account through secret knowledge, formed from at least one number.

PIC:

Personal Identification Code; a PIN formed from either numbers, symbols, or alphabetic characters.

POS:

Point-Of-Sale; a place where goods are sold.

PPT:

Phone Point-of-Sale Terminal; combines phone number with merchant price and product information to authorize a transaction over a BIA-equipped telephone. Order/authorization/mailing-address/PO forwarded to merchant. Resulting authorization is displayed on phone LCD, or "spoken", along with the individual's private code.

RAM:

Random Access Memory

RF:

Radio Frequency: generally refers to radio frequency energy emitted during the normal operation of electrical devices.

REGISTERS:

Memory reserved for a specific purpose, data set aside on chips and stored operands to instructions

REQUESTS:

Electronic instructions from the BIA to DPC instructing the DPC to identify the individual and thereby process the individual's command in the event the identification is successful

RMD:

Remote Merchant Database: contains all merchant identification codes for merchant telephone and Cable TV order shops; indexed by merchant ID. Contains per-merchant system encryption codes as well.

RPT:

Retail Point-of-Sale Terminal; combines encoded biometric identity information with retail transaction information (possibly from an electronic cash register) and formulates authorization requests of the system using X.25 networks, modems, etc.

SECURE TRANSMISSION:

An electronic message or facsimile wherein at least one party has been identified by the DPC.

SFT:

Secured Fax Terminal; uses BIA to identify sender, sends fax either unsecured, sender-secured, secured, or secured-confidential. The latter two require recipients to identify themselves using biometric-PIN. Uses "titles" (specified using a title index digit) to label outbound faxes. Sender may inquire as to delivery status. Both participants must be system members. Either sender or recipient can request that the fax be archived.

SNM:

Sequence Number Module: a software module in the DPC that handles the DUKPT sequence number processing for inbound request packets. Sequence number processing protects against replay attacks.

Terminal:

A device that uses the BIA to collect biometric samples and form request messages that are subsequently sent to the DPC for authorization and execution. Terminals almost always append ancillary information to request messages, identifying counterparties and the like.

TITLE INDEX CODE:

Alpha-numeric sequence uniquely identifying an individual's authorized role or capacity within the context of his employment Token:

An inanimate object conferring a capability.

TRACKING CODE:

An alpha-numeric sequence assigned to data stored in or transmitted by the DPC, such that said sequence may be used to recall the data or obtain a report on the status of the transmission of the data.

TRANSACTION:

An electronic financial exchange

TRANSMISSION:

An electronic message other than an electronic financial exchange

VAD:

Valid Apparatus Database: central repository in which each BIA (with associated unique encryption codes) is identified, along with the owner of the BIA.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. An apparatus for providing automated financial transactions without the use of a card, the apparatus comprising:

a user input device to receive a user identifier from a user;

a biometric device to acquire biometric information of the user;

a communication device to communicate with a remote financial services provider;

a storage device including a database of user information, including stored biometric information on the user;

a processor configured to:

access the database to obtain the stored biometric information on the user, confirm the identity of the user using the acquired biometric information and the stored biometric information on the user and without using information obtained from a card, and transmit a message to the remote financial services provider confirming the identity of the user when the identity of the user is confirmed.

2. An apparatus as recited in claim 1, further comprising a cash dispenser, wherein the processor is further configured to cause the cash dispenser to dispense cash to the user in response to a message received from the remote financial services provider.

3. An apparatus as recited in claim 1, wherein the financial services provider is a banking provider.

4. An apparatus for providing automated financial transactions without the use of a card, the apparatus comprising:

a user input device to receive a user identifier from a user;

a biometric device to acquire biometric information of the user;

a communication device to communicate with a remote banking provider;

a local storage device including a database of user information, including stored biometric information for each of a plurality of users, including said user;

a cash dispenser; and a processor configured to:

use the user identifier to access the database to obtain information on the user, including stored biometric information on the user, without using information obtained from a card, confirm the identity of the user using the acquired biometric information and the stored biometric information on the user and without using information obtained from a card, and transmit a message to the remote banking provider confirming the identity of the user when the identity of the user is confirmed.

5. An apparatus as recited in claim 4, wherein the processor is further configured to cause the cash dispenser to dispense cash to the user in response to a message received from the remote banking provider.

6. An apparatus for providing automated financial transactions without the use of a card, the apparatus comprising:

means for receiving a user identifier from a user;

means for acquiring biometric information of the user;

means for communicating with a remote financial services provider;

means for locally storing a database of user information, including stored biometric information on the user;

means for accessing the database to obtain the stored biometric information on the user, means for confirming the identity of the user using the acquired biometric information and the stored biometric information on the user and without using information obtained from a card, and means for transmitting a message to the remote financial services provider confirming the identity of the user when the identity of the user is confirmed.

7. An apparatus as recited in claim 6, further comprising:

cash dispensing means for dispensing cash to the user; and means for causing the cash dispensing means to dispense cash to the user in response to a message received from the remote financial services provider.

8. An apparatus as recited in claim 7, wherein the financial services provider is a banking provider.

9. A method of providing automated financial transactions without the use of a card, the apparatus comprising:

receiving a user identifier from a user;

acquiring biometric information of the user;

communicating with a remote financial services provider;

storing locally a database of user information, including stored biometric information on the user;

accessing the database to obtain the stored biometric information on the user, confirming the identity of the user using the acquired biometric information and the stored biometric information on the user and without using information obtained from a card, and transmitting a message to the remote financial services provider confirming the identity of the user when the identity of the user is confirmed.

10. A method as recited in claim 9, further comprising dispensing cash to the user in response to a message received from the remote financial services provider.

11. A method as recited in claim 10, wherein the financial services provider is a banking provider.

* * * * *

UNITED STATES PATENT AND TRADEMARK OFFICE
CERTIFICATE OF CORRECTION

PATENT NO. : 7,152,045 B2  Page 1 of 1
APPLICATION NO. : 10/241374
DATED : December 19, 2006
INVENTOR(S) : Ned Hoffman It is certified that error appears in the above-identified patent and that said Letters Patent is hereby corrected as shown below:

Column 69, line 44, the word "–int4" should read -- =int4 --;
Column 74, line 3, the word "biometricld" should read -- biometricid --;
Column 77, line 66, the word "RPT" should read -- IPT --;
Column 77, line 67, the word "IPT/BIA" should read -- IPT→BIA --;
Column 78, line 8, the word "PT" should read -- IPT --;
Column 78, lines 25-26, the word "numbers" should read -- number --;
Column 84, line 35, the word "DP" should read -- DPC --;
Column 85, line 43, the word "IPPT" should read -- PPT --.

Signed and Sealed this

Thirtieth Day of December, 2008

JON W. DUDAS
*Director of the United States Patent and Trademark Office*